US012686193B2

(12) United States Patent
Goodrich

(10) Patent No.: US 12,686,193 B2
(45) Date of Patent: Jul. 21, 2026

(54) SLIT-SHEET-PAPER EXPANSION SYSTEMS AND METHODS USING FRICTION BRUSH(ES) AND/OR OTHER FRICTION MEMBER(S)

(71) Applicant: David Paul Goodrich, Sedona, AZ (US)

(72) Inventor: David Paul Goodrich, Sedona, AZ (US)

(73) Assignee: HexcelPack, LLC, Sedona, AZ (US)

( * ) Notice: Subject to any disclaimer, the term of this patent is extended or adjusted under 35 U.S.C. 154(b) by 0 days.

(21) Appl. No.: 18/586,916

(22) Filed: Feb. 26, 2024

(65) Prior Publication Data

US 2024/0286372 A1 Aug. 29, 2024

Related U.S. Application Data

(60) Provisional application No. 63/448,335, filed on Feb. 26, 2023.

(51) Int. Cl.
*B31D 5/00* (2017.01)
*B65H 20/02* (2006.01)

(52) U.S. Cl.
CPC ........... *B31D 5/0065* (2013.01); *B65H 20/02* (2013.01); *B31D 2205/0023* (2013.01); *B31D 2205/0047* (2013.01); *B65H 2701/1944* (2013.01)

(58) Field of Classification Search
CPC .......... B31D 5/0065; B31D 2205/0023; B31D 2205/0047; B65H 20/02; B65H 2701/1944
See application file for complete search history.

(56) References Cited

U.S. PATENT DOCUMENTS

| | | | | |
|---|---|---|---|---|
| 5,782,735 A * | 7/1998 | Goodrich | B31D 1/0031 | 83/175 |
| 8,486,507 B2 * | 7/2013 | De Luca | B29C 44/5654 | 428/137 |
| 8,550,971 B2 * | 10/2013 | Chan | B31D 5/0047 | 493/464 |
| 2017/0203866 A1 * | 7/2017 | Goodrich | B31D 5/0069 | |
| 2021/0101356 A1 * | 4/2021 | Cheich | B31D 5/0065 | |
| 2023/0271396 A1 * | 8/2023 | Corrigan | B65H 16/005 | 242/419 |

(Continued)

FOREIGN PATENT DOCUMENTS

| | | |
|---|---|---|
| WO | 96/01731 A1 | 1/1996 |
| WO | 2017/074535 A1 | 5/2017 |

OTHER PUBLICATIONS

International Search Report issued in PCT/US2024/017205; mailed Jun. 27, 2024.

*Primary Examiner* — Andrew M Tecco
*Assistant Examiner* — Nicholas E Igbokwe
(74) *Attorney, Agent, or Firm* — Studebaker Brackett PC

(57) ABSTRACT

According to some embodiments, an expansion system for expanding expandable slit sheet paper is provided that includes: a roll of expandable slit sheet paper, and a friction member for applying friction along a lateral side of said expandable slit sheet paper. In some examples, the friction member includes a brush including a plurality of elongated bristles or fibers. In some examples, the friction member imparts sufficient resistance to an expandable slit sheet paper that is pulled past said friction member such that said expandable slit sheet paper expands to form fully opened cells.

23 Claims, 25 Drawing Sheets

(56) References Cited

U.S. PATENT DOCUMENTS

| | | | | |
|---|---|---|---|---|
| 2023/0278778 | A1* | 9/2023 | Goodrich ................. | B65D 5/02<br>53/410 |
| 2024/0270529 | A1* | 8/2024 | Stam ...................... | B65H 23/08 |

* cited by examiner

FIG. 8C

Corrosion-Resistant Tight-Seal Brushes

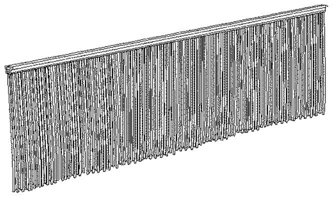

These brushes have a stainless steel backing for corrosive environments. Use them to dust, stop, and separate items on a conveyor or to keep heat, sprayed liquids, and chips contained. A binding wire holds the bristles in place. The larger the bristle diameter, the stiffer the bristles. Use wire-cutting pliers to cut brushes to size.

| Overall Ht. | Bristle Dia. | Bristle Color | Max. Temp., °F | Brush Lengths, ft. | | Per Ft. |
|---|---|---|---|---|---|---|
| **Nylon Plastic Bristles** | | | | | | |
| **1/8" Wd. x 1/8" Ht. Stainless Steel Backing** | | | | | | |
| 3/4" | 0.006" | Black | 225° | 1, 2, 3, 4, 5, 6, 7, 8 | 74715T1 | $3.62 |
| 1" | 0.008" | Black | 225° | 1, 2, 3, 4, 5, 6, 7, 8 | 74715T2 | 3.62 |
| 2" | 0.010" | Black | 225° | 1, 2, 3, 4, 5, 6, 7, 8 | 74715T3 | 3.80 |
| 3" | 0.012" | Black | 225° | 1, 2, 3, 4, 5, 6, 7, 8 | 74715T4 | 4.40 |
| **3/16" Wd. x 7/32" Ht. Stainless Steel Backing** | | | | | | |
| 1" | 0.010" | Black | 225° | 1, 2, 3, 4, 5, 6, 7, 8 | 74715T5 | 4.82 |
| 2" | 0.014" | Black | 225° | 1, 2, 3, 4, 5, 6, 7, 8 | 74715T6 | 5.10 |
| 3" | 0.014" | Black | 225° | 1, 2, 3, 4, 5, 6, 7, 8 | 74715T7 | 5.88 |
| 4" | 0.014" | Black | 225° | 1, 2, 3, 4, 5, 6, 7, 8 | 74715T8 | 7.05 |
| 6" | 0.014" | Black | 225° | 1, 2, 3, 4, 5, 6, 7, 8 | 74715T9 | 8.42 |
| **5/16" Wd. x 5/16" Ht. Stainless Steel Backing** | | | | | | |
| 1" | 0.010" | Black | 225° | 1, 2, 3, 4, 5, 6, 7, 8 | 74715T11 | 7.20 |
| 2" | 0.014" | Black | 225° | 1, 2, 3, 4, 5, 6, 7, 8 | 74715T12 | 7.22 |
| 2" | 0.020" | Black | 225° | 1, 2, 3, 4, 5, 6, 7, 8 | 74715T13 | 7.22 |
| 3" | 0.014" | Black | 225° | 1, 2, 3, 4, 5, 6, 7, 8 | 74715T14 | 8.15 |
| 3" | 0.020" | Black | 225° | 1, 2, 3, 4, 5, 6, 7, 8 | 74715T15 | 8.15 |
| 3" | 0.030" | Black | 225° | 1, 2, 3, 4, 5, 6, 7, 8 | 74715T16 | 8.82 |
| 4" | 0.020" | Black | 225° | 1, 2, 3, 4, 5, 6, 7, 8 | 74715T17 | 9.53 |
| 4" | 0.030" | Black | 225° | 1, 2, 3, 4, 5, 6, 7, 8 | 74715T18 | 9.53 |
| 6" | 0.020" | Black | 225° | 1, 2, 3, 4, 5, 6, 7, 8 | 74715T19 | 12.28 |
| 6" | 0.045" | Black | 225° | 1, 2, 3, 4, 5, 6, 7, 8 | 74715T21 | 12.28 |
| 8" | 0.045" | Black | 225° | 1, 2, 3, 4, 5, 6, 7, 8 | 74715T22 | 15.97 |
| 10" | 0.045" | Black | 225° | 1, 2, 3, 4, 5, 6, 7, 8 | 74715T23 | 18.95 |
| **Stainless Steel Bristles** | | | | | | |
| **3/16" Wd. x 7/32" Ht. Stainless Steel Backing** | | | | | | |
| 1" | 0.004" | — | 800° | 1, 2, 3, 4, 5, 6, 7, 8 | 63595T1 | 31.02 |
| 2" | 0.006" | — | 800° | 1, 2, 3, 4, 5, 6, 7, 8 | 63595T2 | 33.95 |
| 3" | 0.008" | — | 800° | 1, 2, 3, 4, 5, 6, 7, 8 | 63595T3 | 38.55 |
| 4" | 0.006" | — | 800° | 1, 2, 3, 4, 5, 6, 7, 8 | 63595T4 | 42.85 |
| 6" | 0.008" | — | 800° | 1, 2, 3, 4, 5, 6, 7, 8 | 63595T5 | 59.32 |
| **5/16" Wd. x 5/16" Ht. Stainless Steel Backing** | | | | | | |
| 1" | 0.006" | — | 800° | 1, 2, 3, 4, 5, 6, 7, 8 | 63595T6 | 35.90 |
| 2" | 0.010" | — | 800° | 1, 2, 3, 4, 5, 6, 7, 8 | 63595T7 | 44.05 |
| 3" | 0.014" | — | 800° | 1, 2, 3, 4, 5, 6, 7, 8 | 63595T8 | 46.90 |
| 4" | 0.010" | — | 800° | 1, 2, 3, 4, 5, 6, 7, 8 | 63595T9 | 50.72 |
| 6" | 0.014" | — | 800° | 1, 2, 3, 4, 5, 6, 7, 8 | 63595T11 | 59.25 |

FIG. 8D

High-Temperature PTFE Tight-Seal Brushes

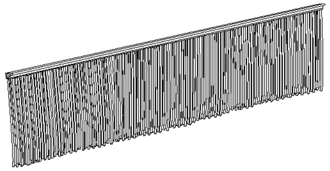

Brushes have PTFE bristles for nonstick applications and temperatures up to 500°. Use them to dust, stop, and separate items on a conveyor or to keep heat, sprayed liquids, and chips contained. A binding wire holds the bristles in place. Use wire-cutting pliers to cut brushes to size.

| Overall Ht. | Bristle Dia. | Bristle Color | Max. Temp., °F | Brush Lengths, ft. | | Per Ft. |
|---|---|---|---|---|---|---|
| **PTFE Plastic Bristles** | | | | | | |
| **5/16" Wd. x 5/16" Ht. Galvanized Steel Backing** | | | | | | |
| 1" | 0.035" | Off-White | 500° | 1, 2, 3, 4, 5, 6 | 7028T1 | $55.72 |
| 2" | 0.035" | Off-White | 500° | 1, 2, 3, 4, 5, 6 | 7028T2 | 108.68 |
| 3" | 0.035" | Off-White | 500° | 1, 2, 3, 4, 5, 6 | 7028T3 | 153.60 |

FIG. 8E

Direct-Mount Strip Brushes

To simplify installation, bristles come stapled into a holder. Use brushes to clean conveyor belts as well as to contain dust, sprayed liquids, heat, and chips. The larger the bristle diameter, the stiffer the bristles.

Bolt-on holders can be drilled for mounting. Push-on holders have a top channel that grips the mounting surface.

Nylon bristles are abrasion resistant. Horsehair bristles are good for picking up dust and fine powders in finishing and cleaning applications.

Flexible holders can be cut to size with a utility knife. Rigid holders can be cut to size with a hacksaw.

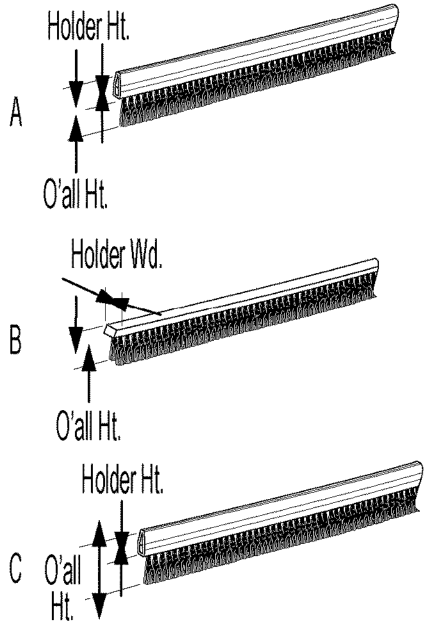

| | O'all Ht. | Bristle Dia. | Bristle Color | Holder Wd. | Holder Ht. | Holder Color | For Max. Edge Thick. | Mounting Flange Wd. | Mounting Flange Ht. | Mounting Flange Thick. | Max. Temp., °F |
|---|---|---|---|---|---|---|---|---|---|---|---|
| **Bolt On** | | | | | | | | | | | |
| **Nylon Plastic Bristles with Flexible PVC Plastic Holder** | | | | | | | | | | | |
| A | 2" | 0.008" | Black | 5/16" | 1" | Black | — | — | 5/8" | 1/16" | 150° |
| A | 3" | 0.012" | Black | 5/16" | 1" | Black | — | — | 5/8" | 1/16" | 150° |
| A | 4" | 0.020" | Black | 5/16" | 1" | Black | — | — | 5/8" | 1/16" | 150° |
| B | 1 7/16" | 0.008" | Black | 1" | 7/16" | Black | — | 13/16" | — | 1/16" | 150° |
| B | 2 7/16" | 0.012" | Black | 1" | 7/16" | Black | — | 13/16" | — | 1/16" | 150° |
| B | 3 7/16" | 0.020" | Black | 1" | 7/16" | Black | — | 13/16" | — | 1/16" | 150° |
| **Nylon Plastic Bristles with Rigid PVC Plastic Holder** | | | | | | | | | | | |
| A | 3" | 0.008" | Black | 9/16" | 2" | Gray | — | — | 1 7/16" | 1/8" | 150° |
| A | 4" | 0.012" | Black | 9/16" | 2" | Gray | — | — | 1 7/16" | 1/8" | 150° |
| A | 5" | 0.020" | Black | 9/16" | 2" | Gray | — | — | 1 7/16" | 1/8" | 150° |
| B | 1 9/16" | 0.008" | Black | 2" | 9/16" | Gray | — | 1 7/16" | — | 1/8" | 150° |
| B | 2 9/16" | 0.012" | Black | 2" | 9/16" | Gray | — | 1 7/16" | — | 1/8" | 150° |
| B | 3 9/16" | 0.020" | Black | 2" | 9/16" | Gray | — | 1 7/16" | — | 1/8" | 150° |
| **Horsehair Bristles with Rigid PVC Plastic Holder** | | | | | | | | | | | |
| A | 3" | 0.008" | Black | 9/16" | 2" | Gray | — | — | 1 7/16" | 1/8" | 300° |
| A | 4" | 0.008" | Black | 9/16" | 2" | Gray | — | — | 1 7/16" | 1/8" | 300° |
| A | 5" | 0.008" | Black | 9/16" | 2" | Gray | — | — | 1 7/16" | 1/8" | 300° |
| B | 1 9/16" | 0.008" | Black | 2" | 9/16" | Gray | — | 1 7/16" | — | 1/8" | 300° |
| B | 2 9/16" | 0.008" | Black | 2" | 9/16" | Gray | — | 1 7/16" | — | 1/8" | 300° |
| B | 3 9/16" | 0.008" | Black | 2" | 9/16" | Gray | — | 1 7/16" | — | 1/8" | 300° |
| **Push On** | | | | | | | | | | | |
| **Nylon Plastic Bristles with Flexible PVC Plastic Holder** | | | | | | | | | | | |
| C | 1 7/8" | 0.008" | Black | 3/8" | 7/8" | Black | 1/16" | — | 1/2" | — | 150° |
| C | 2 7/8" | 0.012" | Black | 3/8" | 7/8" | Black | 1/16" | — | 1/2" | — | 150° |
| C | 3 7/8" | 0.020" | Black | 3/8" | 7/8" | Black | 1/16" | — | 1/2" | — | 150° |

FIG. 8F

Tight-Seal Strip Brushes

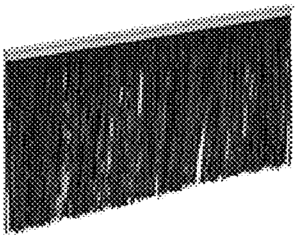

Brushes have dense bristles that can dust, stop, and separate items on a conveyor as well as keep heat, sprayed liquids, and chips contained. Bristles are held in place by a binding wire. Use wire-cutting pliers to cut brushes to size. The larger the bristle diameter, the stiffer the bristles.

Nylon bristles are abrasion resistant. Horsehair bristles are good for picking up dust and fine powders in finishing and cleaning applications.

| Overall Ht. | Bristle Dia. | Bristle Color | Max. Temp., °F | Brush Lengths, ft. | | Per Ft. |
|---|---|---|---|---|---|---|
| **Nylon Plastic Bristles** | | | | | | |
| **1/8" Wd. × 1/8" Ht. Galvanized Steel Backing** | | | | | | |
| 3/4" | 0.006" | Black | 225° | 1, 2, 3, 4, 5, 6, 7, 8 | 74405T1 | $2.60 |
| 1" | 0.008" | Black | 225° | 1, 2, 3, 4, 5, 6, 7, 8 | 74405T2 | 2.68 |
| 2" | 0.010" | Black | 225° | 1, 2, 3, 4, 5, 6, 7, 8 | 74405T3 | 3.58 |
| 3" | 0.012" | Black | 225° | 1, 2, 3, 4, 5, 6, 7, 8 | 74405T4 | 4.23 |
| **3/16" Wd. × 7/32" Ht. Galvanized Steel Backing** | | | | | | |
| 1" | 0.010" | Black | 225° | 1, 2, 3, 4, 5, 6, 7, 8 | 74405T5 | 2.07 |
| 2" | 0.010" | Black | 225° | 1, 2, 3, 4, 5, 6, 7, 8 | 74405T6 | 2.42 |
| 2" | 0.014" | Black | 225° | 1, 2, 3, 4, 5, 6, 7, 8 | 74405T7 | 2.21 |
| 3" | 0.014" | Black | 225° | 1, 2, 3, 4, 5, 6, 7, 8 | 74405T8 | 2.83 |
| 4" | 0.014" | Black | 225° | 1, 2, 3, 4, 5, 6, 7, 8 | 74405T9 | 2.93 |
| 6" | 0.014" | Black | 225° | 1, 2, 3, 4, 5, 6, 7, 8 | 74405T11 | 3.64 |
| **5/16" Wd. × 5/16" Ht. Galvanized Steel Backing** | | | | | | |
| 1" | 0.010" | Black | 225° | 1, 2, 3, 4, 5, 6, 7, 8 | 74405T12 | 2.79 |
| 2" | 0.014" | Black | 225° | 1, 2, 3, 4, 5, 6, 7, 8 | 74405T13 | 3.06 |
| 2" | 0.020" | Black | 225° | 1, 2, 3, 4, 5, 6, 7, 8 | 74405T14 | 3.18 |
| 3" | 0.014" | Black | 225° | 1, 2, 3, 4, 5, 6, 7, 8 | 74405T15 | 3.61 |
| 3" | 0.020" | Black | 225° | 1, 2, 3, 4, 5, 6, 7, 8 | 74405T16 | 3.84 |
| 3" | 0.030" | Black | 225° | 1, 2, 3, 4, 5, 6, 7, 8 | 74405T17 | 3.87 |
| 4" | 0.020" | Black | 225° | 1, 2, 3, 4, 5, 6, 7, 8 | 74405T18 | 4.60 |
| 4" | 0.030" | Black | 225° | 1, 2, 3, 4, 5, 6, 7, 8 | 74405T19 | 4.42 |
| 6" | 0.020" | Black | 225° | 1, 2, 3, 4, 5, 6, 7, 8 | 74405T21 | 5.58 |
| 6" | 0.045" | Black | 225° | 1, 2, 3, 4, 5, 6, 7, 8 | 74405T22 | 6.66 |
| 8" | 0.045" | Black | 225° | 1, 2, 3, 4, 5, 6, 7, 8 | 74405T23 | 10.51 |
| 10" | 0.045" | Black | 225° | 1, 2, 3, 4, 5, 6, 7, 8 | 74405T24 | 10.81 |
| **7/16" Wd. × 7/16" Ht. Galvanized Steel Backing** | | | | | | |
| 2" | 0.014" | Black | 225° | 1, 2, 3, 4, 5, 6, 7, 8 | 74405T25 | 5.80 |
| 3" | 0.020" | Black | 225° | 1, 2, 3, 4, 5, 6, 7, 8 | 74405T26 | 7.22 |
| 4" | 0.020" | Black | 225° | 1, 2, 3, 4, 5, 6, 7, 8 | 74405T27 | 8.39 |
| 6" | 0.045" | Black | 225° | 1, 2, 3, 4, 5, 6, 7, 8 | 74405T28 | 10.56 |
| 8" | 0.045" | Black | 225° | 1, 2, 3, 4, 5, 6, 7, 8 | 74405T29 | 15.61 |
| 10" | 0.045" | Black | 225° | 1, 2, 3, 4, 5, 6, 7, 8 | 74405T31 | 20.15 |
| **Horsehair Bristles** | | | | | | |
| **3/16" Wd. × 7/32" Ht. Galvanized Steel Backing** | | | | | | |
| 1" | 0.008" | Brown | 300° | 1, 2, 3, 4, 5, 6, 7, 8 | 8801T1 | 7.43 |
| 2" | 0.008" | Brown | 300° | 1, 2, 3, 4, 5, 6, 7, 8 | 8801T2 | 12.32 |
| 3" | 0.008" | Brown | 300° | 1, 2, 3, 4, 5, 6, 7, 8 | 8801T3 | 15.11 |
| **5/16" Wd. × 5/16" Ht. Galvanized Steel Backing** | | | | | | |
| 1" | 0.008" | Brown | 300° | 1, 2, 3, 4, 5, 6, 7, 8 | 8801T4 | 8.17 |
| 2" | 0.008" | Brown | 300° | 1, 2, 3, 4, 5, 6, 7, 8 | 8801T5 | 13.56 |
| 3" | 0.008" | Brown | 300° | 1, 2, 3, 4, 5, 6, 7, 8 | 8801T6 | 16.60 |

FIG. 8F-1

Tight-Seal Strip Brushes

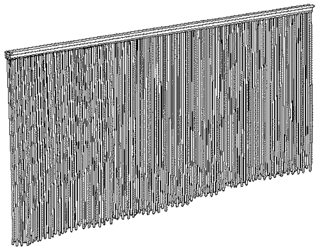

Brushes have dense bristles that can dust, stop, and separate items on a conveyor as well as keep heat, sprayed liquids, and chips contained. Bristles are held in place by a binding wire. Use wire-cutting pliers to cut brushes to size. The larger the bristle diameter, the stiffer the bristles

Nylon bristles are abrasion resistant. Horsehair bristles are good for picking up dust and fine powders in finishing and cleaning applications.

| Overall Ht. | Bristle Dia. | Bristle Color | Max. Temp., °F | Brush Lengths, ft. | | Per Ft. |
|---|---|---|---|---|---|---|
| **Nylon Plastic Bristles** | | | | | | |
| **1/8" Wd. x 1/8" Ht. Galvanized Steel Backing** | | | | | | |
| 3/4" | 0.006" | Black | 225° | 1, 2, 3, 4, 5, 6, 7, 8 | 74405T1 | $2.60 |
| 1" | 0.008" | Black | 225° | 1, 2, 3, 4, 5, 6, 7, 8 | 74405T2 | 2.68 |
| 2" | 0.010" | Black | 225° | 1, 2, 3, 4, 5, 6, 7, 8 | 74405T3 | 3.58 |
| 3" | 0.012" | Black | 225° | 1, 2, 3, 4, 5, 6, 7, 8 | 74405T4 | 4.23 |
| **3/16" Wd. x 7/32" Ht. Galvanized Steel Backing** | | | | | | |
| 1" | 0.010" | Black | 225° | 1, 2, 3, 4, 5, 6, 7, 8 | 74405T5 | 2.07 |
| 2" | 0.010" | Black | 225° | 1, 2, 3, 4, 5, 6, 7, 8 | 74405T6 | 2.42 |
| 2" | 0.014" | Black | 225° | 1, 2, 3, 4, 5, 6, 7, 8 | 74405T7 | 2.21 |
| 3" | 0.014" | Black | 225° | 1, 2, 3, 4, 5, 6, 7, 8 | **74405T8** | 2.83 |
| 4" | 0.014" | Black | 225° | 1, 2, 3, 4, 5, 6, 7, 8 | 74405T9 | 2.93 |
| 6" | 0.014" | Black | 225° | 1, 2, 3, 4, 5, 6, 7, 8 | 74405T11 | 3.64 |
| **5/16" Wd. x 5/16" Ht. Galvanized Steel Backing** | | | | | | |
| 1" | 0.010" | Black | 225° | 1, 2, 3, 4, 5, 6, 7, 8 | 74405T12 | 2.79 |
| 2" | 0.014" | Black | 225° | 1, 2, 3, 4, 5, 6, 7, 8 | 74405T13 | 3.06 |
| 2" | 0.020" | Black | 225° | 1, 2, 3, 4, 5, 6, 7, 8 | 74405T14 | 3.18 |
| 3" | 0.014" | Black | 225° | 1, 2, 3, 4, 5, 6, 7, 8 | 74405T15 | 3.61 |
| 3" | 0.020" | Black | 225° | 1, 2, 3, 4, 5, 6, 7, 8 | 74405T16 | 3.84 |
| 3" | 0.030" | Black | 225° | 1, 2, 3, 4, 5, 6, 7, 8 | 74405T17 | 3.87 |
| 4" | 0.020" | Black | 225° | 1, 2, 3, 4, 5, 6, 7, 8 | 74405T18 | 4.60 |
| 4" | 0.030" | Black | 225° | 1, 2, 3, 4, 5, 6, 7, 8 | 74405T19 | 4.42 |
| 6" | 0.020" | Black | 225° | 1, 2, 3, 4, 5, 6, 7, 8 | 74405T21 | 5.58 |
| 6" | 0.045" | Black | 225° | 1, 2, 3, 4, 5, 6, 7, 8 | 74405T22 | 6.66 |
| 8" | 0.045" | Black | 225° | 1, 2, 3, 4, 5, 6, 7, 8 | 74405T23 | 10.51 |
| 10" | 0.045" | Black | 225° | 1, 2, 3, 4, 5, 6, 7, 8 | 74405T24 | 10.81 |

FIG. 8F-2

| Overall Ht. | Bristle Dia. | Bristle Color | Max. Temp., °F | Brush Lengths, ft. | | Per Ft. |
|---|---|---|---|---|---|---|
| **Nylon Plastic Bristles** | | | | | | |
| **7/16" Wd. x 7/16" Ht. Galvanized Steel Backing** | | | | | | |
| 2" | 0.014" | Black | 225° | 1, 2, 3, 4, 5, 6, 7, 8 | 74405T25 | 5.80 |
| 3" | 0.020" | Black | 225° | 1, 2, 3, 4, 5, 6, 7, 8 | 74405T26 | 7.22 |
| 4" | 0.020" | Black | 225° | 1, 2, 3, 4, 5, 6, 7, 8 | 74405T27 | 8.39 |
| 6" | 0.045" | Black | 225° | 1, 2, 3, 4, 5, 6, 7, 8 | 74405T28 | 10.56 |
| 8" | 0.045" | Black | 225° | 1, 2, 3, 4, 5, 6, 7, 8 | 74405T29 | 15.61 |
| 10" | 0.045" | Black | 225° | 1, 2, 3, 4, 5, 6, 7, 8 | 74405T31 | 20.15 |
| **Horsehair Bristles** | | | | | | |
| **3/16" Wd. x 7/32" Ht. Galvanized Steel Backing** | | | | | | |
| 1" | 0.008" | Brown | 300° | 1, 2, 3, 4, 5, 6, 7, 8 | 8801T1 | 7.43 |
| 2" | 0.008 | Brown | 300° | 1, 2, 3, 4, 5, 6, 7, 8 | 8801T2 | 12.32 |
| 3" | 0.008" | Brown | 300° | 1, 2, 3, 4, 5, 6, 7, 8 | 8801T3 | 15.11 |
| **5/16" Wd. x 5/16" Ht. Galvanized Steel Backing** | | | | | | |
| 1" | 0.008" | Brown | 300° | 1, 2, 3, 4, 5, 6, 7, 8 | 8801T4 | 8.17 |
| 2" | 0.008 | Brown | 300° | 1, 2, 3, 4, 5, 6, 7, 8 | 8801T5 | 13.56 |
| 3" | 0.008" | Brown | 300° | 1, 2, 3, 4, 5, 6, 7, 8 | 8801T6 | 16.60 |

FIG. 8G

Static-Control Tight-Seal Strip Brushes

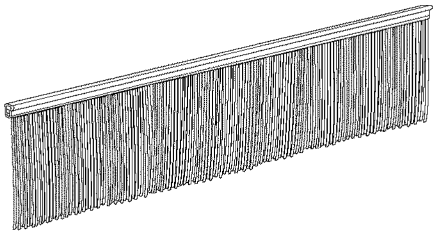

Bristles control static buildup. Use them to dust, stop, and separate items on a conveyor or to keep heat, sprayed liquids, and chips contained. A binding wire holds the bristles in place. The larger the bristle diameter, the stiffer the bristles. Brushes can be cut to size with wire-cutting pliers.

| Overall Ht. | Bristle Dia. | Bristle Color | Electrical Properties | Surface Resistivity | Max. Temp., °F | Brush Lengths, ft. | | Per Ft. |
|---|---|---|---|---|---|---|---|---|
| **Nylon Plastic Bristles** | | | | | | | | |
| **3/16" Wd. x 7/32" Ht. Galvanized Steel Backing** | | | | | | | | |
| 1" | 0.008" | Black | Static Dissipative | $10^9$ cir. mil-ohm/ft. | 200° | 1, 2, 3, 4, 5, 6, 7, 8 | 74405T61 | $13.86 |
| 2" | 0.012" | Black | Static Dissipative | $10^9$ cir. mil-ohm/ft. | 200° | 1, 2, 3, 4, 5, 6, 7, 8 | 74405T62 | 20.46 |
| 3" | 0.020" | Black | Static Dissipative | $10^9$ cir. mil-ohm/ft. | 200° | 1, 2, 3, 4, 5, 6, 7, 8 | 74405T63 | 27.19 |
| **5/16" Wd. x 5/16" Ht. Galvanized Steel Backing** | | | | | | | | |
| 1" | 0.008" | Black | Static Dissipative | $10^9$ cir. mil-ohm/ft. | 200° | 1, 2, 3, 4, 5, 6, 7, 8 | 74405T64 | 16.57 |
| 2" | 0.012" | Black | Static Dissipative | $10^9$ cir. mil-ohm/ft. | 200° | 1, 2, 3, 4, 5, 6, 7, 8 | 74405T65 | 24.91 |
| 3" | 0.020" | Black | Static Dissipative | $10^9$ cir. mil-ohm/ft. | 200° | 1, 2, 3, 4, 5, 6, 7, 8 | 74405T66 | 33.31 |
| **Brass Bristles** | | | | | | | | |
| **3/16" Wd. x 7/32" Ht. Stainless Steel Backing** | | | | | | | | |
| 1" | 0.004" | — | Conductive | — | 500° | 1, 2, 3, 4, 5, 6, 7, 8 | 98295T1 | 23.43 |
| 2" | 0.006" | — | Conductive | — | 500° | 1, 2, 3, 4, 5, 6, 7, 8 | 98295T2 | 27.90 |
| 3" | 0.008" | — | Conductive | — | 500° | 1, 2, 3, 4, 5, 6, 7, 8 | 98295T3 | 31.92 |
| 4" | 0.006" | — | Conductive | — | 500° | 1, 2, 3, 4, 5, 6, 7, 8 | 98295T4 | 36.05 |
| 6" | 0.008" | — | Conductive | — | 500° | 1, 2, 3, 4, 5, 6, 7, 8 | 98295T5 | 42.32 |
| **5/16" Wd. x 5/16" Ht. Stainless Steel Backing** | | | | | | | | |
| 1" | 0.006" | — | Conductive | — | 500° | 1, 2, 3, 4, 5, 6, 7, 8 | 98295T6 | 24.37 |
| 2" | 0.008" | — | Conductive | — | 500° | 1, 2, 3, 4, 5, 6, 7, 8 | 98295T7 | 30.55 |
| 3" | 0.010" | — | Conductive | — | 500° | 1, 2, 3, 4, 5, 6, 7, 8 | 98295T8 | 32.75 |
| 4" | 0.008" | — | Conductive | — | 500° | 1, 2, 3, 4, 5, 6, 7, 8 | 98295T9 | 36.30 |
| 6" | 0.014" | — | Conductive | — | 500° | 1, 2, 3, 4, 5, 6, 7, 8 | 98295T11 | 41.13 |

Food Industry Tight-Seal Strip Brushes

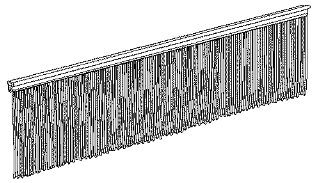

FIG. 8H

| Overall Ht. | Bristle Dia. | Bristle Color | Max. Temp., °F | Specifications Met | Brush Lengths, ft. | | Per Ft. |
|---|---|---|---|---|---|---|---|
| **Polyester Plastic Bristles** | | | | | | | |
| **3/16" Wd. x 7/32" Ht. Stainless Steel Backing** | | | | | | | |
| 1" | 0.008" | White | 200° | FDA Compliant 21 CFR 177.1660 | 1, 2, 3, 4, 5, 6, 7, 8 | 7442T11 | $7.39 |
| 2" | 0.012" | White | 200° | FDA Compliant 21 CFR 177.1660 | 1, 2, 3, 4, 5, 6, 7, 8 | 7442T12 | 8.66 |
| 3" | 0.020" | White | 200° | FDA Compliant 21 CFR 177.1660 | 1, 2, 3, 4, 5, 6, 7, 8 | 7442T13 | 9.97 |
| **5/16" Wd. x 5/16" Ht. Stainless Steel Backing** | | | | | | | |
| 1" | 0.008" | White | 200° | FDA Compliant 21 CFR 177.1660 | 1, 2, 3, 4, 5, 6, 7, 8 | 7442T14 | 10.37 |
| 2" | 0.012" | White | 200° | FDA Compliant 21 CFR 177.1660 | 1, 2, 3, 4, 5, 6, 7, 8 | 7442T15 | 12.77 |
| 3" | 0.020" | White | 200° | FDA Compliant 21 CFR 177.1660 | 1, 2, 3, 4, 5, 6, 7, 8 | 7442T16 | 15.77 |

Metal-Detectable Tight-Seal Strip Brushes

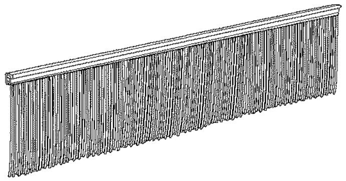

FIG. 8I

| Overall Ht. | Bristle Dia. | Bristle Color | Max. Temp., °F | Specifications Met | Brush Lengths, ft. | | Per Ft. |
|---|---|---|---|---|---|---|---|
| **Polyester Plastic Bristles** | | | | | | | |
| **3/16" Wd. x 7/32" Ht. Galvanized Steel Backing** | | | | | | | |
| 1" | 0.014" | Gray | 200° | FDA Compliant 21 CFR 177.1590 | 1, 2, 3, 4, 5, 6, 7, 8 | 7443T61 | $8.94 |
| 2" | 0.014" | Gray | 200° | FDA Compliant 21 CFR 177.1590 | 1, 2, 3, 4, 5, 6, 7, 8 | 7443T62 | 14.69 |
| 3" | 0.024" | Gray | 200° | FDA Compliant 21 CFR 177.1590 | 1, 2, 3, 4, 5, 6, 7, 8 | 7443T63 | 21.02 |
| **5/16" Wd. x 5/16" Ht. Galvanized Steel Backing** | | | | | | | |
| 1" | 0.014" | Gray | 200° | FDA Compliant 21 CFR 177.1590 | 1, 2, 3, 4, 5, 6, 7, 8 | 7443T64 | 15.80 |
| 2" | 0.014" | Gray | 200° | FDA Compliant 21 CFR 177.1590 | 1, 2, 3, 4, 5, 6, 7, 8 | 7443T65 | 22.78 |
| 3" | 0.024" | Gray | 200° | FDA Compliant 21 CFR 177.1590 | 1, 2, 3, 4, 5, 6, 7, 8 | 7443T66 | 29.64 |

FIG. 9

0.78" Diameter Abrasion-Resistant Conveyor Roller
for 16" Between Frame Width

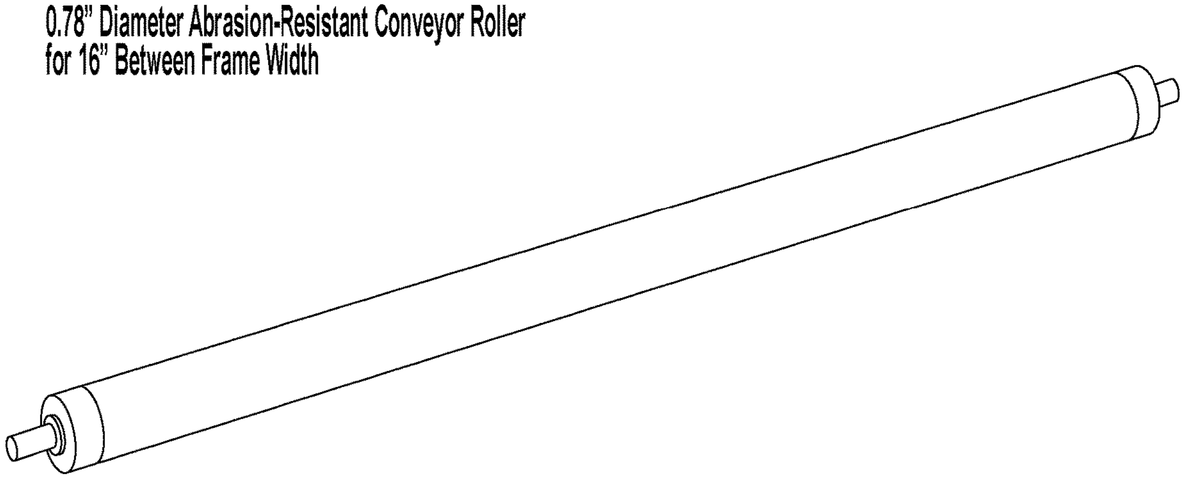

| | |
|---|---|
| Axle Shape | Round |
| Axle Diameter | 1/4" |
| For Between Frame Width | 16" |
| Roller<br>Diameter<br>Width<br>Material<br>Color | <br>0.78"<br>15 1/8"<br>PVC Plastic<br>Gray |
| Capacity | 10 lbs. |
| Overall Width | 17" |
| Motorized | No |
| Axle Grip Type | Spring Loaded |
| Bearing<br>Type<br>Material | <br>Ball<br>Plastic |
| Ball Bearing Material | Stainless Steel |
| Temperature Range | 30° to 150° F |
| RoHS | RoHS 3 (2015/863/EU) Compliant |
| REACH | REACH (EC 1907/2006) (01/17/2022, 223 SVHC) Compliant |
| DFARS | Specialty Metals COTS-Exempt |
| Country of Origin | United States |
| USMCA Qualifying | No |
| Schedule B | 843139.0010 |
| ECCN | EAR99 |

SLIT-SHEET-PAPER EXPANSION SYSTEMS AND METHODS USING FRICTION BRUSH(ES) AND/OR OTHER FRICTION MEMBER(S)

PRIORITY

The present application is a non-provisional of U.S. Patent Application No. 63/448,335, filed, Feb. 26, 2023, entitled "Slit-Sheet-Paper Expansion Systems and Methods Using Friction Brush(es) and/or Other Friction Member(s)", the entire disclosure of which is incorporated herein by reference as if recited herein in full.

INCORPORATION-BY-REFERENCES TO PRIOR-FILED APPLICATIONS OF THE PRESENT INVENTOR

The present application incorporates by reference the subject matter of each of the following prior U.S. applications and patents of the present inventor, the entire disclosures of which are all incorporated herein by reference as if recited herein in full:

1. U.S. Pat. No. 10,669,086 (based on U.S. application Ser. No. 16/018,702, filed Jun. 26, 2020), entitled "Extensible Paper and Its Use in the Production of Expanded Slit Packaging Wrap and Void Fill Products";
2. U.S. patent application Ser. No. 16/929,836 (U.S. Pat. No. 11,401,090), entitled "Expanded Slit Sheet Cushioning Products with Novel Slit Pattern and Paper Properties");
3. U.S. patent application Ser. No. 17/802,012 filed Aug. 24, 2022, entitled "Systems and Methods for Wrapping Pallets and the Like with Expandable Paper";
4. U.S. Pat. No. 11,479,009, entitled "Slit Sheet Tensioning Device";
5. U.S. patent application Ser. No. 15/428,144 (U.S. Publication No. 2018-0222665), entitled "Slit Paper Method of Expansion, Shipment, and Expansion Devices".
6. U.S. Pat. No. 11,220,395, entitled "Slit Paper Expansion Method and Apparatus";
7. U.S. Pat. No. 10,766,690, entitled "Shipping and Dispensing Box for Slit Sheet Material".

BACKGROUND

Various preferred embodiments of the present invention can be implemented in the contexts of the environments of any-and-all of the above-note patents and applications of the present inventor. By way of example, as discussed hereinbelow, some embodiments of the present invention can be used for expanding any of the expandable slit sheet papers set for in any of the foregoing patents and/or applications. Additionally, aspects of the present application can be implemented in the contexts of any of the various dispenser mechanisms described in such patents, such as, e.g., dispensers of expandable slit sheet paper for wrapping products (e.g., for use within packaging), for wrapping pallets or the like, and/or in any other contexts described in such patents and applications.

FIELD

The preferred embodiments of the present invention greatly improve upon and overcome various problems and limitations of the related art.

SUMMARY

The preferred embodiments overcome and improve upon the foregoing and/or other related art.

1. According to some illustrative embodiments of the invention, an expansion system for expanding expandable slit sheet paper is provided that includes:
a friction member for applying friction along a lateral side of said expandable slit sheet paper.
2. According to other illustrative embodiments of the invention, an expansion system for expanding expandable slit sheet paper is provided that includes:
a roll of expandable slit sheet paper;
a friction member for applying friction along a lateral side of said expandable slit sheet paper.
3. In some examples, the embodiments set forth in the above paragraphs 1 or 2 further include wherein said friction member includes a brush.
4. In some examples, the expansion system of any of the preceding paragraphs 1 to 3 include wherein said friction member includes a plurality of elongated members.
5. In some examples, the expansion system of any of the preceding paragraphs 1 to 4 include wherein said friction member includes a plurality of elongated bristles or fibers.
6. In some examples, the expansion system of any of the preceding paragraphs 1 to 5 include wherein said friction member imparts sufficient resistance to an expandable slit sheet paper that is pulled past said friction member such that said expandable slit sheet paper expands to form fully opened cells.
7. In some examples, the expansion system of any of the preceding paragraphs 1 to 5 include wherein said friction member imparts sufficient resistance to an expandable slit sheet paper that is pulled past said friction member such that said expandable slit sheet paper expands to form fully opened cells in a region downstream from the friction member.
8. In some examples, the expansion system of any of the preceding paragraphs 1 to 7 include wherein said expansion system further includes a guide upstream of said friction member.
9. In some examples, the expansion system of any of the preceding paragraphs 1 to 7 include wherein said expansion system further includes a guide upstream of said friction member that is configured to impart sufficient resistance to said expandable slit sheet paper to cause said expandable slit sheet paper to a state of beginning expansion.
10. In some examples, the expansion system of paragraphs 8 or 9 include wherein said guide includes a conveyor roller guide.
11. In some examples, the expansion system of paragraphs 8 or 9 include wherein said guide includes at least one rod, shaft or roller guide.
12. In some examples, the expansion system of paragraph 11 includes wherein said guide includes a rod or shaft that is non-rotatable mounted on said expansion system.
13. In some examples, the expansion system of paragraph 12 includes wherein said friction member is located at a first side of said roll, and said guide includes a rod or shaft located at a second side of said roll.
14. In some examples, the expansion system of paragraph 10 includes wherein said conveyor roller guide includes at least one conveying roller.

15. In some examples, the expansion system of paragraph 14 includes wherein said conveyor roller guide includes a plurality of conveying rollers.
16. In some examples, the expansion system of paragraph 15 includes wherein said plurality of conveying rollers include rollers located on opposite sides of said expandable slit sheet paper.
17. In some examples, the expansion system of any of paragraphs 14 to 16 include wherein said plurality of conveying rollers include three conveying rollers.
18. In some examples, the expansion system of paragraphs 8 or 9 includes wherein said guide includes a friction member.
19. In some examples, the expansion system of paragraph 15 includes wherein said friction member of said guide includes a brush.
20. In some examples, the expansion system of any of the preceding paragraphs 15 to 16, wherein said friction member of said guide includes a plurality of elongated members.
21. In some examples, the expansion system of any of the preceding paragraphs 15 to 17 include wherein said friction member of said guide includes a plurality of elongated bristles or fibers.
22. In some examples, the expansion system of any of the preceding paragraphs 1-21 further including an adjuster for adjusting the position of the friction member.
23. In some examples, the expansion system of paragraph 22 includes wherein said adjuster is configured to adjust a distance of the friction member from an opposing surface and/or the angular orientation of said friction member.
24. In some examples, the expansion system of any of the preceding paragraphs 1-23 include wherein said expansion system is a manual expansion system for manually expanding expandable slit sheet paper.
25. In some examples, the expansion system of any of the preceding paragraphs 1-23 include wherein said expansion system is a manual expansion system for manually expanding expandable slit sheet paper and wrapping the expanded paper around an object or item.
26. In some examples, the expansion system of any of the preceding paragraphs 1-23 include wherein said expansion system is a manual expansion system for manually expanding expandable slit sheet paper and wrapping the expanded paper around an object or item for protection within a package, box or container.
27. In some examples, the expansion system of any of the preceding paragraphs 1-23 include wherein said expansion system is an automated system that automatically expands expandable slit sheet paper.
28. In some examples, a method of using the expansion system of any of the preceding paragraphs includes:

expanding an expandable slit sheet paper with said friction member applying a resistance against a lateral side of said expandable slit sheet paper.

29. In some examples, the method of paragraphs 28 further including said friction member applying a sufficient resistance against the lateral side of said expandable slit sheet paper such that as said expandable slit sheet paper is pulled past said friction member said expandable slit sheet paper expands to form fully opened cells.
30. In some examples, the method of paragraphs 28 or 29 further including providing a guide upstream of said friction member that is configured to impart sufficient resistance to said expandable slit sheet paper to cause said expandable slit sheet paper to assume a state of beginning expansion.
31. In some examples, any of the preceding paragraphs 1-30 include wherein said expandable slit sheet paper is made with a Clupak paper.
32. In some examples, any of the preceding paragraphs 1-31 include wherein said expandable slit sheet paper is made with a paper having an extensibility in a pre-slit configuration of at least 3% in a machine direction, or, in some preferred embodiments, at least 4% in the machine direction, or, some preferred embodiments, at least 5% in the machine direction, or, in some preferred embodiments, at least 6% in the machine direction.
33. In some examples, any of the preceding paragraphs 1-31 include wherein said expandable slit sheet paper is made with a paper having an extensibility in a pre-slit configuration of between 3-20% in a machine direction, or, in some preferred embodiments, between 4-20% in the machine direction, or, in some preferred embodiments, between 5-20% in the machine direction, or, in some preferred embodiments, between 6-20% in the machine direction, or, in some preferred embodiments between 3-15% in a machine direction, or, in some preferred embodiments, between 4-15% in the machine direction, or, in some preferred embodiments, between 5-15% in the machine direction, or, in some preferred embodiments, between 6-15% in the machine direction.
34. In some examples, any of the preceding paragraphs 1-33 include wherein said expandable slit sheet paper is made with a paper that weighs at least 25 (lbs.) per 3,000 square feet (i.e., 25 #paper), or, in some embodiments, at least 30 pounds per 3,000 square feet (i.e., 30 #paper), or, in some embodiments, at least 40 pounds per 3,000 square feet (i.e., 40 #paper), or, in some embodiments, at least 50 pounds per 3,000 square feet (i.e., 50 #paper), or, in some embodiments, at least 60 pounds per 3,000 square feet (i.e., 60 #paper), or, in some embodiments, at least 70 pounds per 3,000 square feet (i.e., 70 #paper), or, in some embodiments, between about 25 pounds per 3,000 square feet to 70 pounds per 3,000 square feet, or, in some embodiments, between about 35 pounds per 3,000 square feet to 60 pounds per 3,000 square feet, or, in some embodiments, between about 40 pounds per 3,000 square feet to 50 pounds per 3,000 square feet.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIG. 5C is a schematic side view showing an interface between a friction brush and an expandable slit sheet paper in some implementations of embodiments of the present invention;

FIG. 8A-8I are views of existing McMaster™ brushes that can be employed in some illustrative embodiments of the invention, and as found at https://www.mcmaster.com/catalog/129/1550/.

FIG. 9 is a view of an existing McMaster™ roller that can be employed in some illustrative embodiments of the as found at invention, and https://www.mcmaster.com/catalog/129/1550/.

DETAILED DESCRIPTION OF THE PREFERRED EMBODIMENTS

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

Introduction to Environment of the Present Invention

Figure 1:
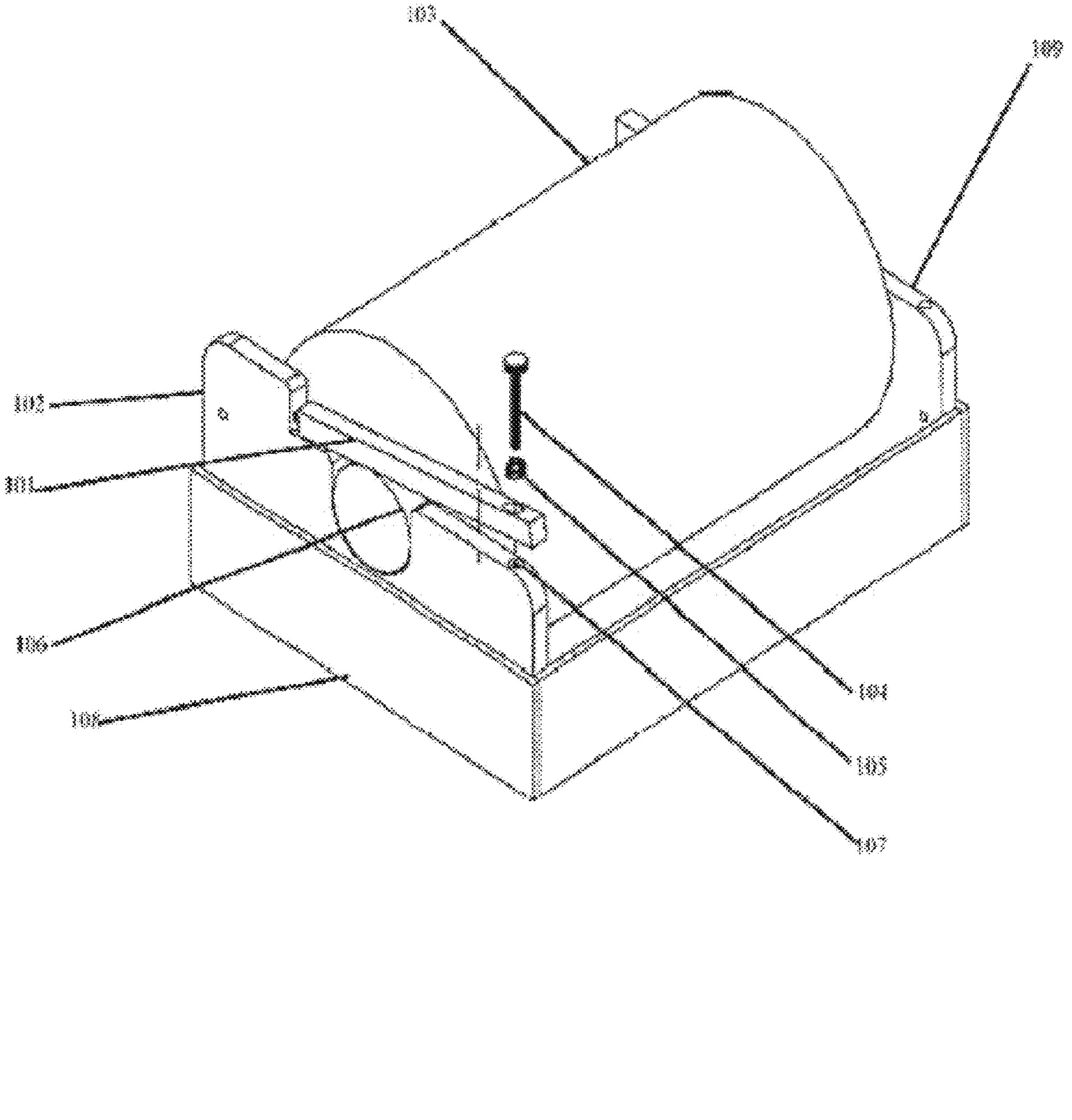
FIG. 1 is a perspective view of an illustrative background manual expander in a ready to use position.

FIG. 1 is the perspective view of an illustrative background expander for expanding expandable slit sheet material. See, e.g., U.S. Pat. No. 10,669,086, the entire disclosure of which is incorporated herein by reference as though recited herein in full. FIG. 1 is similar to FIG. 1 of said U.S. Pat. No. 10,669,086 and shows an illustrative expander that can be employed to expand an expandable slit sheet material that is wound in a roll and supported on the expander. As shown in FIG. 1, element 108 is a corrugated carton frame that houses and is adhered to corrugated yokes 102 and 109 at sides of the carton. The two yokes 102 and 109 have receiving openings that support opposite ends of a cylindrical paper core 106 that supports a roll 103 of unexpanded slit sheet paper that is wound around the core (i.e., having multiple windings or layers around the core). In some preferred embodiments, an optional roll holder or pressure member 101 is mounted to one of the yokes (e.g., yoke 102 as shown) and adapted to apply a clamping force against the outer surface of the paper core 106 through the use of the setscrew 104 that passes through the spring 105 and the roll holder 101 into a threaded fixture 107 of the yoke 102 as described in co-pending non-provisional application Ser. No. 15/428,144 of the present inventor. By adjusting the setscrew 104, the clamping force on the core 106 can be adjusted, whereby the tension force applied to the roll 103 upon pulling of the paper from the roll during operation can be adjusted.

Figure 2:
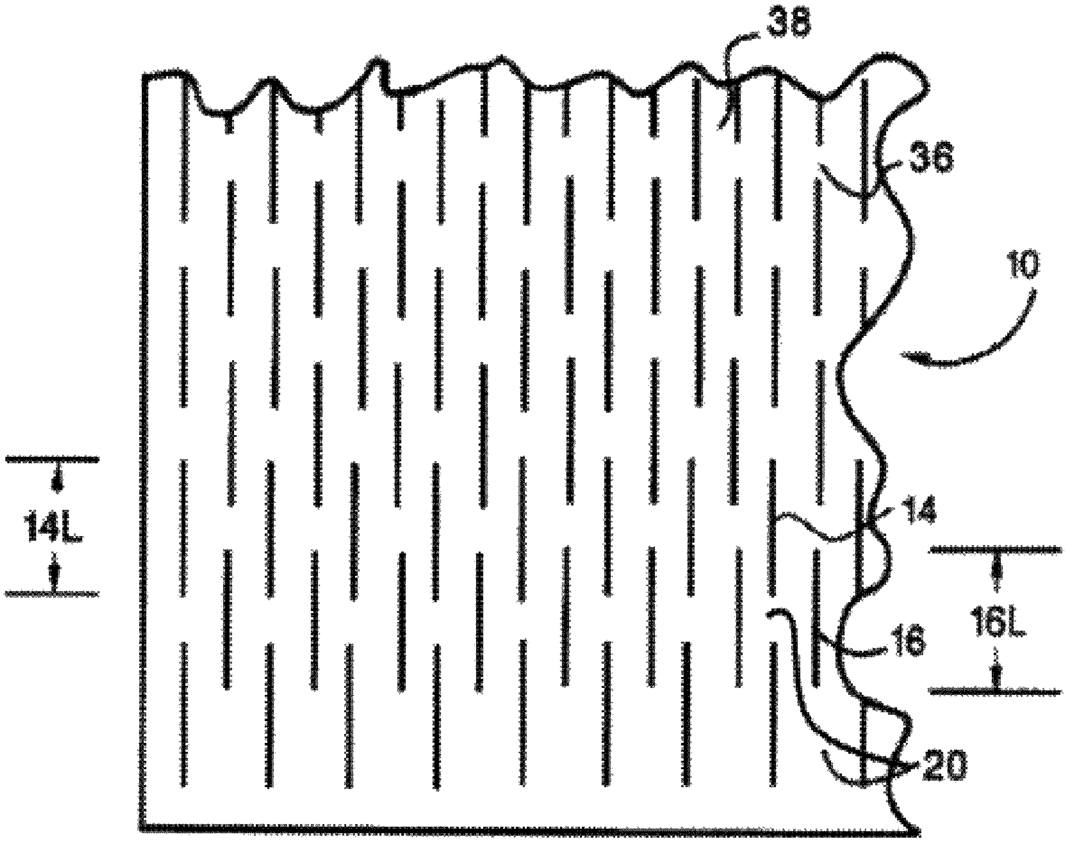
FIG. 2 is a plan view of a section of an illustrative expandable slit sheet paper having a slit pattern for producing an expanded slit sheet paper that can be employed in some embodiments of the present invention.

FIG. 2 is an illustration of an exemplary slit pattern in an illustrative expanded slit sheet. In some preferred embodiments, the expandable slit sheet paper includes a slit pattern similar to that shown in FIG. 2. The expandable slit sheet paper shown in FIG. 2 operates as an expandable cell-forming paper that can be expanded to an expanded state as shown in FIG. 2 (discussed below). FIG. 2 shows an illustrative section of an expandable slit sheet 10 in an unexpanded (unopened) state, with staggered rows of slits 14 and 16 that extend entirely through the width of the sheet 10, and land portions 20 extending between adjacent slits within rows 14 and 16. As shown in FIG. 2, in some preferred embodiments, the slit lengths 14L and 16L are uniform across the face of the sheet 10; similarly, the distance and area of each row spacing 38 (i.e., between adjacent rows) and each slit spacing 36 (i.e., between adjacent slits) are also uniform. Although an expandable slit sheet can be formed with a variety of slit patterns, the illustrative example shown in FIGS. 2 and 3 depicts an illustrative example to scale with illustrative lengths of slits, spacing between slits, proportional relationships of sizes of created hexagonal cells, land portions and leg portions, etc., according to some illustrative examples with such as drawings being to scale in some illustrative and non-limiting embodiments.

Figure 3:
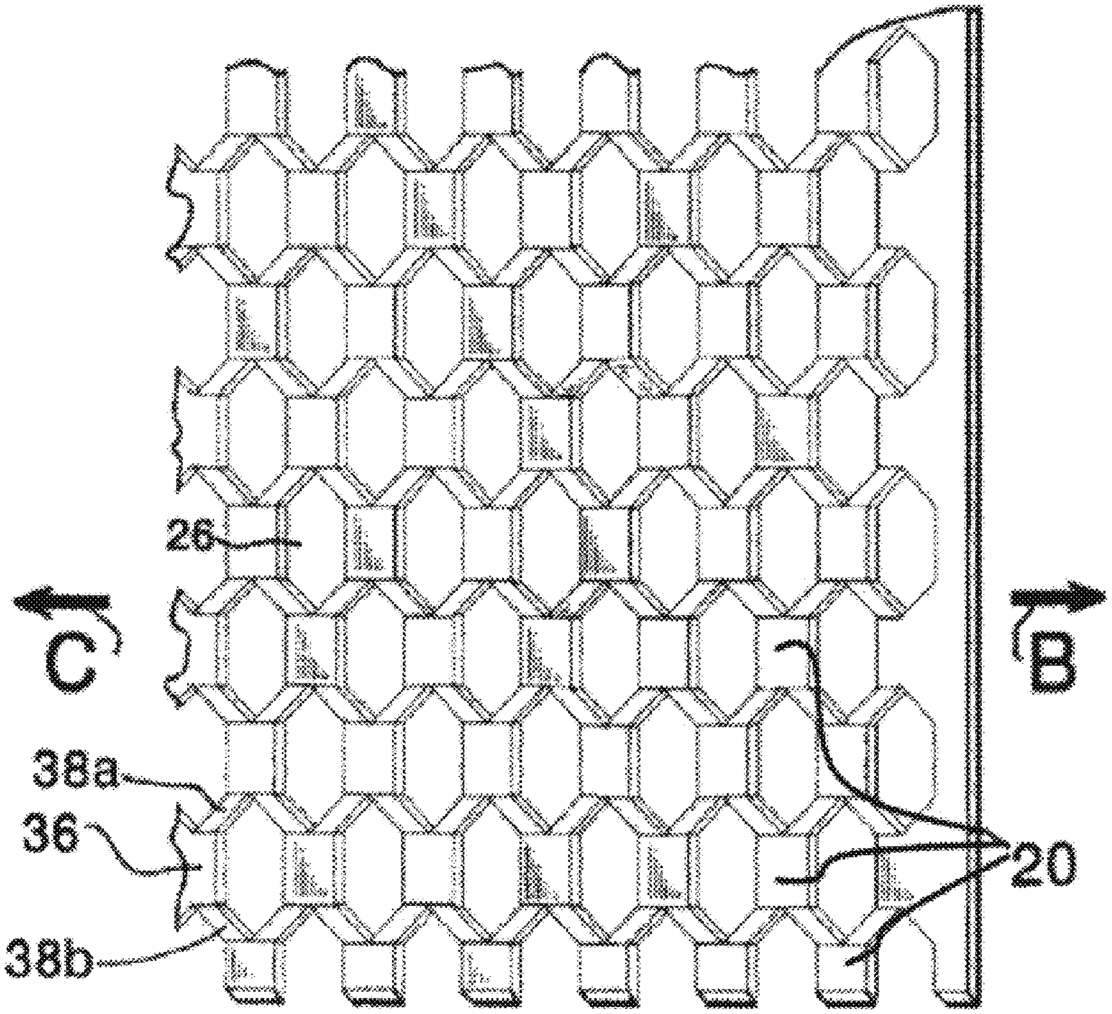
FIG. 3 is a plan view of a section of the expandable slit sheet paper shown in FIG. 2 that has been expanded into an expanded slit sheet paper with expanded cells that can be employed in some embodiments of the present invention.

In FIG. 3, the sheet 10 shown in FIG. 2 has been pulled in the direction of arrows B and C and opened to its optimum cell formation. In that regard, the optimum cell formation results in a substantially hexagonal shaped cells as shown in FIG. 3. In particular, as depicted, the slits 14 and 16 are in an opened state in which the sheet 10 is oriented to have an array of three-dimensional hexagonal cells 26, with substantially rectangular land portions 20 within the slit spacings 36 situated at an inclined angle (i.e., such as to be transverse to the original plane of the sheet 10), and the leg portions 38*a* and 38*b* connecting the land portions between the row spacings having been warped to, e.g., slightly less than a 90° angle to the original plane of the sheet. The leg portions 38*a* and 38*b* are basically mirror images of one another and connect the land portions 20 such as to form the three-dimensional substantially hexagonal cells.

Figure 4:
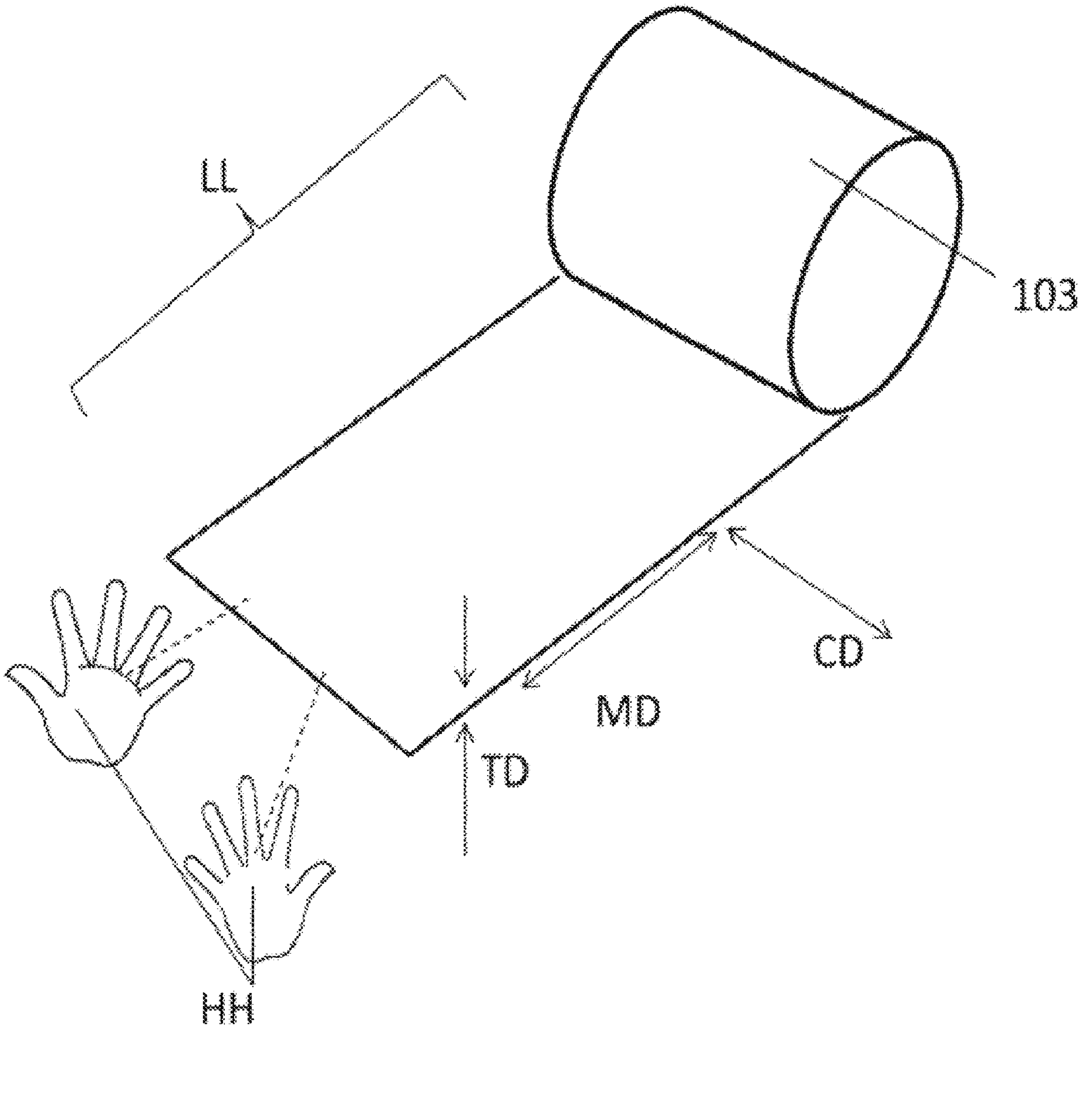
FIG. 4 is an explanatory schematic diagram that illustrates a roll of expandable slit sheet paper, with a length of paper unrolled from the roll according to some illustrative embodiments.

FIG. 4 is a schematic diagram that illustrates a roll 103 of the expandable slit sheet paper, with a length LL of paper unrolled from the roll 103. In this unrolled state, the expandable slit sheet paper is not in an expanded state unless an expanding force has been applied to the paper. Towards that end, in some preferred embodiments, the expanding force is applied by having an operator grasp a forward end of the length LL with the operator's hands HH and pulling the length LL along the longitudinal direction MD (also referred to herein as the machine direction) which extends parallel to the plane of the expandable slit sheet material. In this manner, in the illustrative embodiment shown in FIG. 4, a force will be applied to the sheet in the direction MD due to the opposing forces of pulling by hand and resistance of rotation at the roll 103. Notably, as indicated above, this resistance of rotation in the background example of FIG. 1 is adjusted by the operator to a desired force via the setscrew 104 discussed above. With reference to FIG. 4, the machine direction MD is perpendicular to the transverse direction CD (also referred to herein as the cross direction) which extends perpendicular to the longitudinal direction MD along the plane of the expandable slit sheet material. As also shown in FIG. 4, the machine direction MD and the cross direction CD are both perpendicular to the thickness direction TD which extends substantially vertically in the illustrated example shown in FIG. 4.

Further Discussion of Illustrative Embodiments

As presented herein, in various embodiments of the present invention, systems and methods can be implemented that have substantial advantages over existing systems and methods.

According to some preferred embodiments of the invention, in order to impart a desired resistance to the expandable slit sheet paper that is dispensed from a roll of expandable slit sheet paper for manual wrapping of items, at least one friction member is employed that applies a friction to the expandable slit sheet paper after being unwound from the roll of expandable slit sheet paper.

In some embodiments, the at least one friction member can be provided as an alternative to or in addition to the use of a pressure member, such as, e.g., a pressure member 101 shown in FIG. 1.

In some preferred embodiments, the at least one friction member includes at least one flexible member. In some preferred embodiments, the at least one flexible member includes a flexible brush. In some of the preferred embodiments, the at least one flexible brush is a brush having a plurality of elongated flexible bristles, filaments, wires or other elongated flexible elements. In some preferred embodiments, the flexible brush includes a plurality of elongated flexible elements wherein each elongated flexible element is made of a flexible plastic or polymer, of a flexible metal, of a flexible natural fiber or element, and/or other elongated flexible elements. In some illustrative embodiments, a brush can include bristles made of one or more of aluminum, brass, bronze, copper, steel, stainless steel, plastic, PVC, nylon, synthetic or polymeric fibers, Kevlar™, foam (e.g., polypropylene foam), animal hair (e.g., horse hair, goat hair, etc.), plant fibers (e.g., Ixtle, Tampico fiber, etc.). In some embodiments, bristles can be elongated members with a substantially consistent diameter or width along a length thereof or can have a relatively varied diameter or width along a length thereof. In some embodiments, bristles can have a generally rounded peripheral surface, a generally cylindrical peripheral surface, a generally polygonal (e.g., square, hexagonal, etc.) peripheral surface, an irregular peripheral surface, etc. In some embodiments, the shapes of the bristles can be relatively consistent along lengths thereof, while in some embodiments, the shapes of the bristles can vary along the lengths thereof. In preferred embodiments, the bristles have a substantially consistent structure along the lengths thereof for consistency in qualities, such as, e.g., stiffness and flexibility.

In some illustrative embodiments, bristles can be between about ½ inch to 4 inches long, or, in some preferred embodiments, between about ¾ inch to 3½ inches long, or, in some preferred embodiments, between about 1 inch to 3 inches long, or, in some preferred embodiments, between about 1½ inches to 2½ inches long.

In some illustrative embodiments, bristles can be employed having a width or diameter of less than about 0.2 inches, or, in some preferred embodiments, less than about 0.1 inches, or, in some preferred embodiments, less than about 0.05 inches, or, in some preferred embodiments, less than about 0.04 inches, or, in some preferred embodiments, less than about 0.03 inches, or, in some preferred embodiments, less than about 0.02 inches. In some illustrative embodiments, bristles can have a diameter of between about 0.005 to 0.05 inches, or, in some preferred embodiments, between about 0.0075 to 0.025 inches, or, in some preferred embodiments, between about 0.01 to 0.02 inches.

In some other alternative embodiments, the flexible member or flexible brush can include other types of flexible members, such as, e.g., an elastomeric member, a flexible rubber member, a flexible plastic or polymeric member, a flexible metal member, a flexible sponge and/or another flexible member. In preferred embodiments, the flexible member includes a plurality of independently flexible or substantially independently flexible portions proximate a distal end (e.g., a distal end that is situated to contact the expandable slit sheet paper). In some preferred embodiments, such independently flexible or substantially independently flexible portions contact a single cell in a widthwise direction (e.g., cross direction) across the expandable slit sheet paper, such that forces imparted from a single cell during opening is substantially imparted to such independently flexible or substantially independently flexible portions. For example, in a brush containing flexible bristles or wires, each such flexible bristle or wire is independently flexible or substantially independently flexible. It should be appreciated that in a brush containing numerous bristles, such bristles would not be entirely independently flexibly movable due to their close proximity, such that bristles would necessarily press against one another during use. For example, in some embodiments, a flexible member can include a flexible member, such as, e.g., a flexible rubber member, a flexible plastic or polymeric member, a flexible metal member, or a flexible sponge member having a distal end with depending regions, such as, e.g., depending nubs, or tines, or arms, or elements. In some embodiments, the flexible member can be a flexible rake, with substantially independently movable tines. By way of example, FIG. 5D shows an illustrative embodiment employing a friction member 550 having a plurality of depending portions 551. In some embodiments, the member 550 can be a unitary member, made with a flexible plastic or polymer, a flexible metal, or a flexible sponge. The lengths L, widths W, and depths D of the depending portions 551 can be selected based on the materials employed. In some preferred embodiments, the widths W would be less than or equal to the corresponding widths of the slits of the expandable slit sheet paper, such as, e.g., less than or equal to about ½ inch, or, in some embodiments, less than or equal to ⅓ inch, or, in some embodiments, less than or equal to ¼ inch.

Figure 8A:
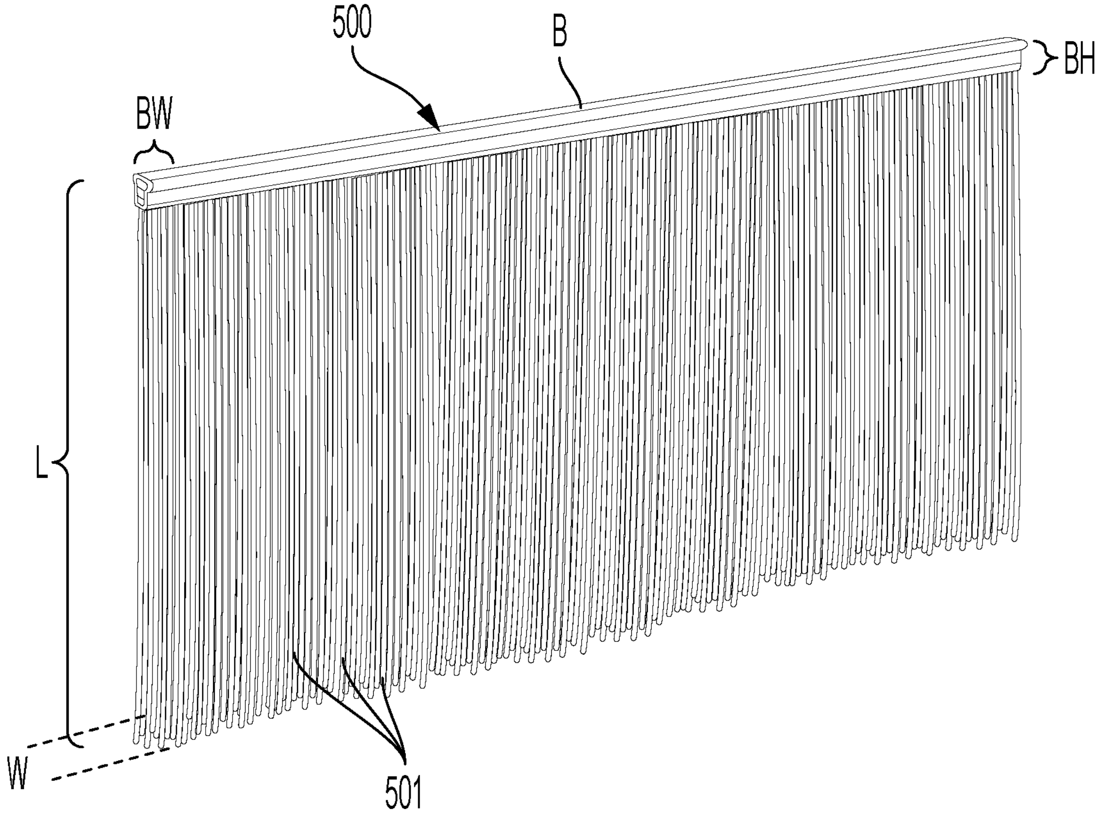
Figure 8B:
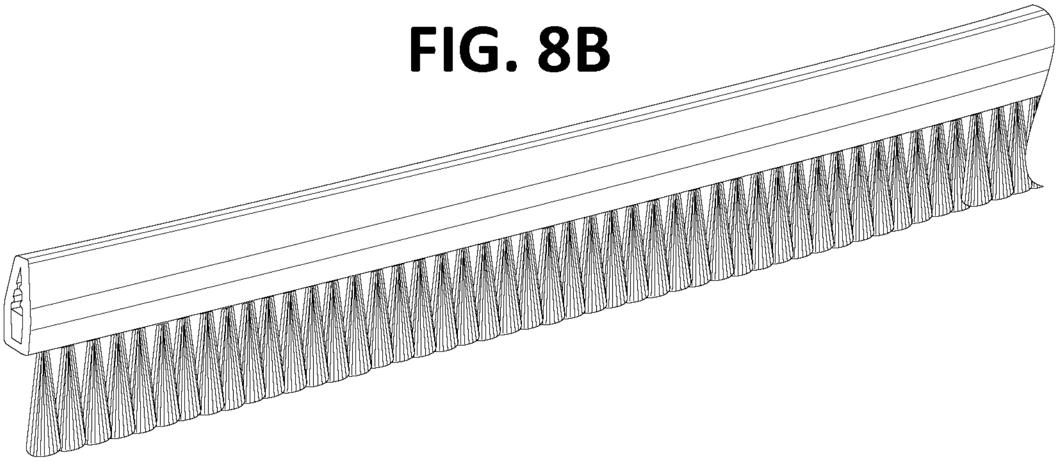

In some illustrative and non-limiting embodiments, brushes employed can include brushes made by McMaster-Carr™ (https://www.mcmaster.com/catalog/129/1550/). By way of example, in some embodiments, as described at the above URL, brushes can include dense bristles that can be held in place by a binding wire. The larger the bristle diameter, the stiffer the bristles. Additionally, the shorter the bristle length, the less lateral flexibility at the distal ends of the bristles. In some embodiments, one or more of the bristles set forth at the above URL, which are inserted in FIGS. 8A to 8I can be employed. In some illustrative preferred embodiments, the bristles employed can be the bristles identified by the red arrow in FIG. 8F, including a "Tight-Seal Strip Brush" with Nylon bristles, supported by a galvanized steel backing that is 3/16 inches wide (see width BW in FIG. 8A) by 7/32 inches high (see height BH in FIG. 8A), with a 0.014 inch bristle diameter, and with an overall bristle length of 2 inches (see length L in FIG. 8A).

Figure 5A:
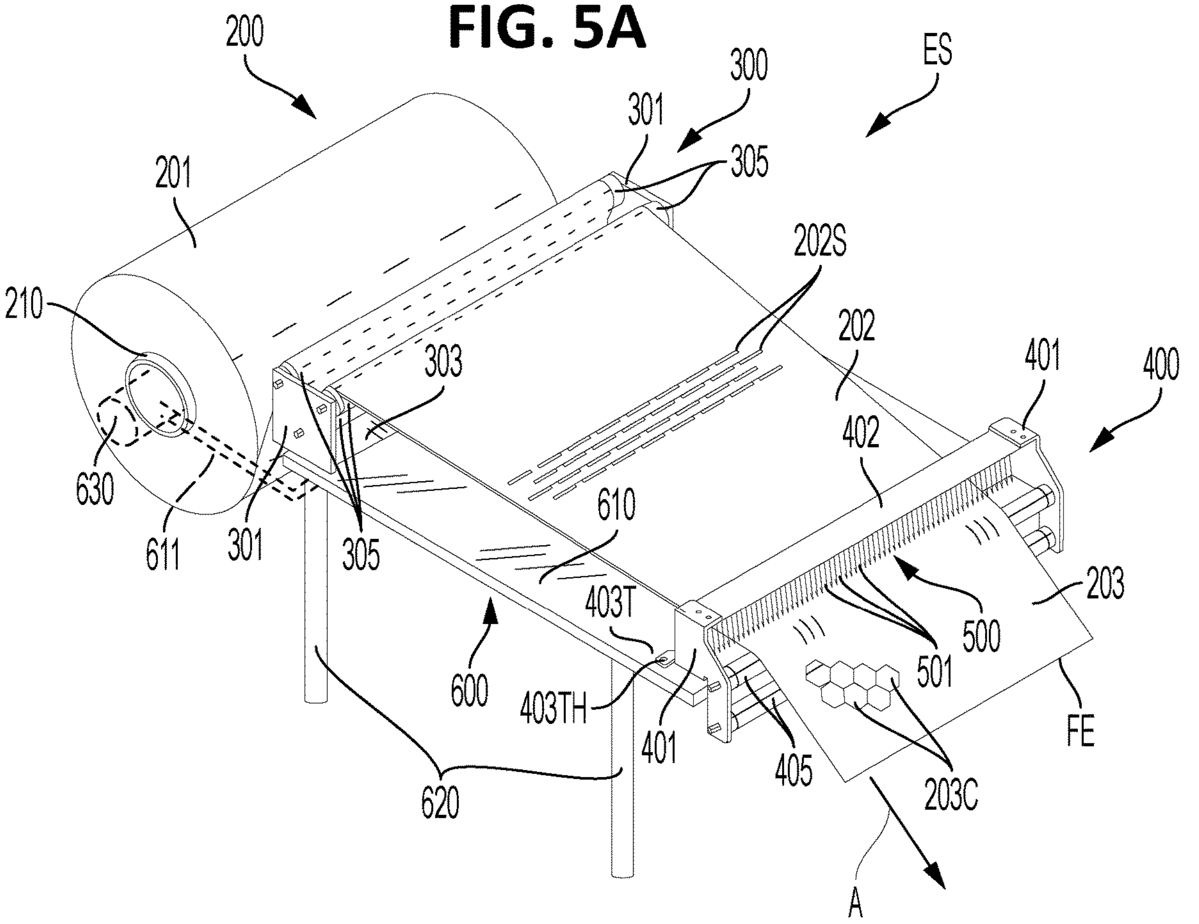
FIG. 5A is a top perspective view of an expansion system for expandable slit sheet paper employing a friction brush according to a first illustrative embodiment of the invention.

With reference to FIG. 5A, FIG. 5A is a top perspective view of an expansion system for expandable slit sheet paper employing a friction brush according to a first illustrative embodiment of the invention. In the illustrate example shown in FIG. 5A, an expansion system ES is provided that includes a brush friction member 500 made with a plurality of bristles 501.

As shown in FIG. 5A, the expansion system ES includes a roll 201 of expandable slit sheet paper 200 that is mounted upon a support member 600. In some embodiments, the support member 600 includes a table or other member having a support surface 610. In some illustrative embodiments, the support surface 610 includes at least one support holder 620 for locating the support surface 610, such as, by way of example, support holding legs or the like (as shown in FIG. 5A). In the illustrated example, the roll 201 of expandable slit sheet paper 200 includes a central core member 210 (such as, e.g., a substantially cylindrical cardboard or corrugated board central core member) around which the expandable slit sheet paper 200 is wound. In the illustrated embodiment, the support member 600 further supports a support shaft 630 which is fixed to the support member 600 via a connecting member or connecting arm 611 (as shown in FIG. 5A). In some preferred embodiments, the support shaft 630 is configured to axially receive the roll 201 of expandable slit sheet paper, which is wound around a central core 210. In some embodiments, the wound roll 201 can be axially slid around the support shaft 630 in a direction of the black arrow shown in FIG. 5E, and retained upon the support shaft via a retaining member, such as, e.g., an enlarged distal flange member 630H (as shown in FIG. 5E). In some embodiments, the enlarged distal flange member has a diameter smaller than an inner diameter of the core 210 to facilitate axially sliding over the support shaft 630.

Figure 5B:
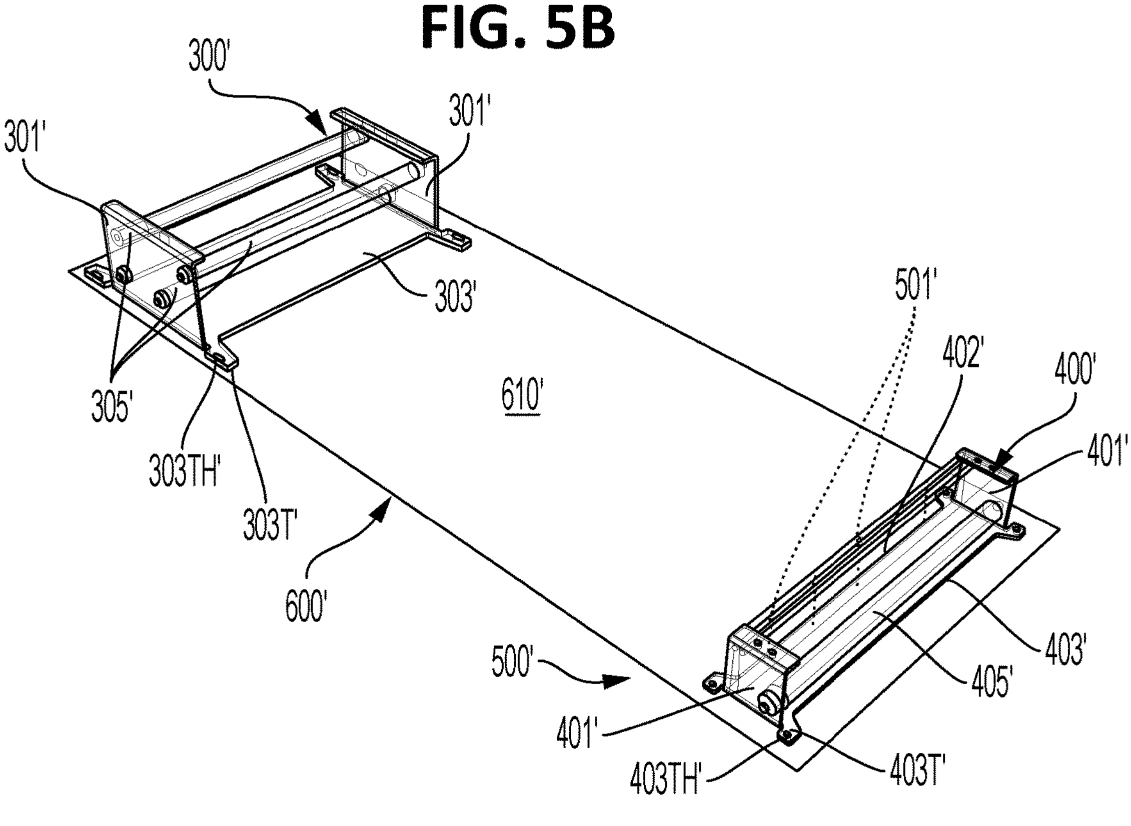
FIG. 5B is a top perspective view of an expansion system for expandable slit sheet paper employing a friction brush according to a second illustrative embodiment of the invention.
Figure 5D:
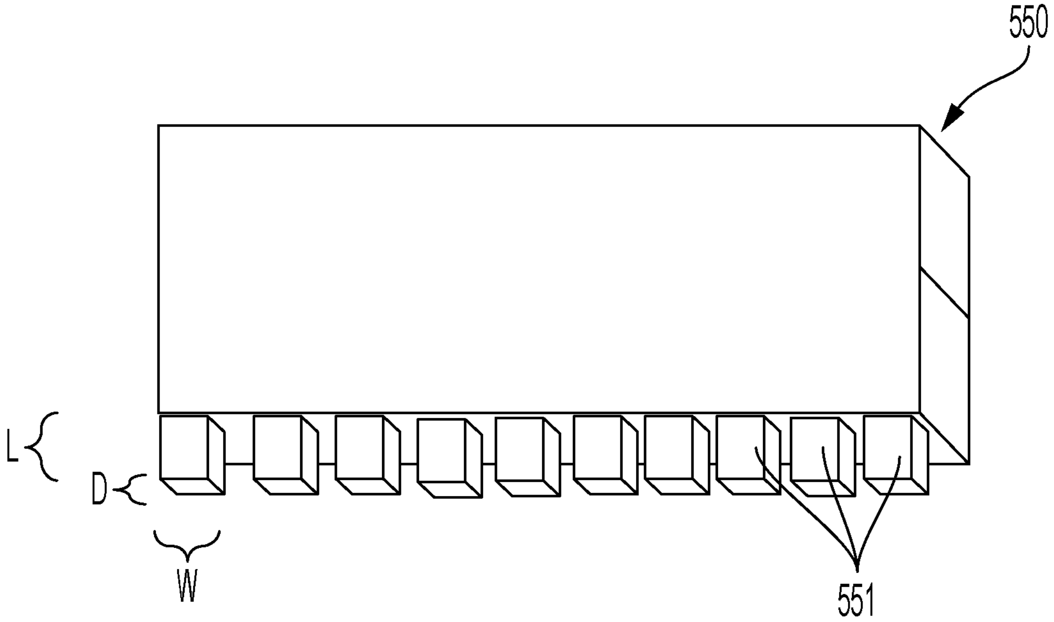
FIG. 5D is a side view showing an illustrative friction member according to some embodiments of the present invention.
Figure 5E:
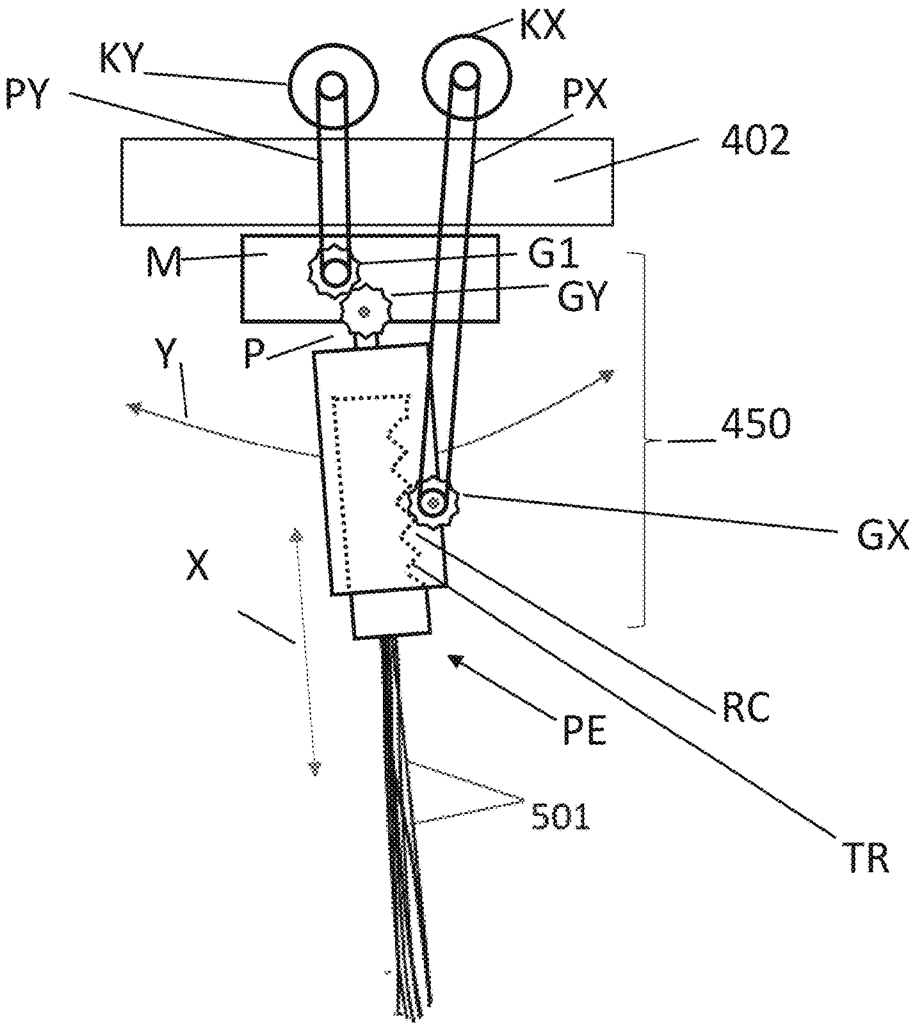
FIG. 5E is a side view showing an illustrative adjustor including an adjustor connector according to some illustrative embodiments of the invention employing an adjustable friction member.

In some embodiments, the support shaft 630 is be made with a metal or other rigid material. In some embodiments, at least one friction member(s) 630F (two shown in the illustrative example depicted in FIG. 5G) is applied to an exterior of the support shaft 630 to inhibit rotation of the roll 201 around the shaft 630. By way of example, in some embodiments the friction member(s) can include hook and loop fastening fabric tape applied around the periphery of the shaft 630. Alternatively, the friction member(s) can include another fabric, another material having an irregular non-smooth surface, a rubber material and/or any other friction material. In the preferred embodiments, the friction member(s) do not apply sufficient resistance to the rotation of the roll 201 on the shaft 630 to cause the expandable slit sheet material to expand to create open cells if manually pulled by a user (e.g., pulled in a manner similar to that shown in FIG. 4). However, if desired, such a friction member can be added to reduce requirements of mechanisms (described below) downstream of the roll within the expansion system for imparting resistance required to expand the expandable slit sheet paper.

As shown in FIG. 5A, in the first illustrated embodiment, the expansion system ES includes a conveying roller guide 300 that guides the expandable slit sheet paper 200 after it separates from the roll 201. In the illustrated embodiment, the conveying roller guide 300 includes lateral conveying roller support walls 301 located at left and right lateral sides of the expansion system ES in a cross direction of the expandable slit sheet material. In some preferred embodiments, the support walls 301 are integrally formed with a lateral floor plate 303 that extends between the support walls, such as to form a U-shaped support bracket member, including the upright walls 301 as seen in FIG. 5A that receive ends of at least one conveying roller(s) 305 and a lateral floor member 303 integrally connected to the upright walls 301 for placement upon and attachment to the support surface 610.

In the preferred embodiments, the conveying rollers each have a smoother outer surface and can be made out of any suitable material, including metals, plastics or polymers and/or other suitable materials. In some preferred embodiments, the conveying rollers include rotary bearings such that the conveying rollers rotate around center axes to facilitate downstream conveyance of the expandable slit sheet paper 200. In some preferred embodiments, the conveying rollers are non-rotatably fixed to the support walls 301 such that the expandable slit sheet paper slides around outer surfaces of the conveying rollers as a user manually grasps and pulls a leading distal end of the expandable slit sheet paper.

In some illustrative and non-limiting embodiments, conveying rollers employed can include rollers made by McMaster-Carr™ (https://www.mcmaster.com/catalog/2297t23/). In some illustrative embodiments, the conveying rollers can be substantially cylindrical members having a diameter of between about ½ inch and 3 inches, or, in some preferred embodiments, between about ¾ inch to 3½ inches long, or, in some preferred embodiments, between about 1 inch to 3 inches long, or, in some preferred embodiments, between about 1½ inches to 2½ inches long. In some illustrative and non-limiting embodiments, the rollers can be about 16 inches long, 0.78 inches diameter, PVC plastic rollers as shown in FIG. 9.

In some preferred embodiments, the conveying roller guide 300 includes three conveying rollers 305, as shown in FIG. 5A. In some other embodiments, the conveying roller guide 300 can include less rollers (e.g., a single roller, or two rollers). In some other embodiments, the conveying roller guide 300 can include more rollers (e.g., four rollers, five rollers, or more).

In the preferred embodiments, the conveying roller guide 300 maintain the expandable slit sheet paper in a flat state. Additionally, in the preferred embodiments, the conveying roller guide 300 also applies some resistance to the expandable slit sheet paper as it is pulled in the direction of the arrow A shown in FIG. 5A. In the preferred embodiments, the applied resistance is not sufficient to fully expand the cells of the expandable slit sheet paper. However, in preferred embodiments the resistance imparted at the conveying roller guide 300 is sufficient to cause the cells of the expandable slit sheet paper to begin expansion, such that the expandable slit sheet paper downstream of the conveying roller guide 300 is not fully flat and is not in a fully unexpanded state.

Preferably, the expandable slit sheet paper within the region 202 that extends from the exit of the conveying roller guide 300 to the friction member unit 400 is in a state of beginning of expansion but prior to a state of full expansion. For example, as shown in FIG. 5C, in some embodiments the expandable slit sheet paper within the region 202 is preferably within a state in which lands (see, e.g., lands 20 shown in FIG. 2) rotate slightly from the original plane of the paper. In this manner, the edges of the lands present a raised edge E that can be caught (e.g., abutted, frictionally engaged) by the ends of the bristles as shown in FIG. 5C. Additionally, during the state of beginning of expansion, the expanded cells have begun to open but have not fully opened, which opening of the cells during the state of beginning expansion increases in amount from the initial fully-unopen state in which the expandable slit sheet paper is substantially flat or planar (such as, e.g., the state upon the roll 201 or directly after exiting the roll) to the state of full expansion (such as, e.g., at the region 203 of the expandable slit sheet paper downstream of the brush as shown in, e.g., FIGS. 5A and 5C) in which the lands are at or substantially at their maximum angle with respect to the original plane of the expandable slit sheet paper and the slits are opened into fully expanded cells.

In some embodiments, the expandable slit sheet paper 200 in the region 202 is in a state of beginning expansion wherein the angle of the lands increases from substantially planar to between 1-50% of the angle of the lands in the state of full expansion, or, in some embodiments, between 2-25% of the angle of the lands in the state of full expansion, or, in some embodiments, between 3-20% of the angle of the lands in the state of full expansion, or, in some embodiments, between 4-15% of the angle of the lands in the state of full expansion, or, in some embodiments, between 5-10% of the angle of the lands in the state of full expansion. It should be appreciated that the angle of the lands in a full state of expansion depends upon the particular slit pattern and nature of the paper employed, including, for example, the lengths of slits, the distance between slits, and the distance between rows of slits, as well as the type of expansion pattern achieved by the expandable slit sheet paper (discussed below).

As shown in FIG. 5A, the expandable slit sheet paper within the region 202 that extends from the exit of the conveying roller guide 300 to the friction member unit 400 in the state of beginning of expansion as described above. Although the embodiment shown in FIG. 5A includes a substantial distance of separation between the conveyor roller guide 300 and the friction member unit 400, the distance can be adjusted as desired. For example, in some embodiments, the conveyor roller guide 300 can be directly adjacent the friction member unit 400. Additionally, in some embodiments, the conveyor roller guide 300 can be integrated with the friction member unit 400; for example, the walls 301 and 401 can be formed as a unitary wall structure with the combined size of the walls shown in FIG. 5B in some embodiments.

In some illustrative embodiments, the friction member unit 400 is configured to be located at or proximate the edge of a support surface, such as, e.g., at the edge of the support surface 610 shown in FIG. 5A. Among other things, such a placement can facilitate manual operation related to pulling of the expandable slit sheet paper without interference from the support surface 610 or the like.

In the first embodiment shown in FIG. 5A, the friction member unit 400 includes two lateral side walls 401 and a top cross-plate 402. As shown in FIG. 5A, the side walls 401 preferably include a flat lower edge that rests upon the surface 610, a depending section that extends downward alongside a front of the surface 610, as well as a horizontal plate region that extends over the top cross-plate 402 and includes holes or the like for inserting a bolt, screw or other connector to connect together the top cross-plate 402 and the respective side wall 401 and a horizontal plate region that extends parallel to and rests upon the surface 610 and includes holes or the like for inserting a bolt, screw or other connector to connect together the surface 610 and the respective side wall 401.

As shown in FIGS. 5A, the friction member unit 400 is configured to support a friction member, such as, e.g., a friction brush 500 in a manner to extend laterally across the width of an expandable slit sheet paper that is pulled in the direction of the arrow A. In some illustrative embodiments, as shown in FIG. 5C, the friction member unit 400 can include an adjuster connector 450 that adjustably attaches the friction member (e.g., friction brush 500) to the friction member unit 400. In the preferred embodiments, the adjuster connector enables the friction member to be fixed to the friction member unit in a desired orientation and position. Preferably, the adjuster connector 450 is configured to enable the friction member to be raised and lowered in the direction of the double-sided arrow X shown in FIG. 5C. Additionally, preferably, the adjuster connector 450 is configured to enable the friction member to be angularly adjusted to a desired angular position in the direction of the double-sided arrow Y shown in FIG. 5C, such as to adjust the angle θ between the brush and the expandable slit sheet paper. In some illustrative embodiments, the adjuster connector 450 is mounted to the underside of the top cross-plate 402 via a mounting plate M that pivotally supports a receiving channel member RC that receives a proximal end PE of the friction brush 500. In some preferred embodiments, the proximal end PE of the friction brush (e.g., which can include, e.g., a backing B for supporting the bristles {such as, e.g., an elongated channel member} as shown in the illustrative examples of FIGS. 8A-8I. In some embodiments, the depth of the backing B supported within the receiving channel member can be fixed employing a fixing bolt or the like which fixes relative positions. In some embodiments, the angular position of the receiving channel RC with respect to the mounting plate M can be fixed employing a fixing bolt or the like which fixes relative positions. In some embodiments, the angular orientation in the direction Y and the raised and lowered position in the direction X can be adjusted and set by rotation of respective dials that mechanically fix relative positions via ratchet mechanisms, friction mechanisms or the like.

In preferred embodiments in which the vertical position (e.g., X direction) and/or the angular orientation (e.g., Y direction) of the friction member or brush 500 can be adjusted, the amount of resistance or force imparted by the friction member or brush 500 to the expandable slit sheet paper can be adjusted or set as desired and/or based on circumstances. For example, in some circumstances an operator can adjust the vertical position and/or the angular orientation to, thus, adjust the resistance applied by the friction member for expanding of an expandable slit sheet paper to a) fine tune the operation, b) adapt to new expandable slit sheet papers (e.g., if new rolls 201 of expandable slit sheet papers are used having different slit patterns, paper qualities or the like), c) re-set the resistance imparted in the event that the friction member (e.g., the bristles 501 of a brush) wear or change over time based on use, and/or d) accommodate a new friction member having different properties from a previously employed friction member. For example, in some embodiments, in the event that bristles of a friction brush wear over time and lose strength and, thus, increase in flexibility, resulting in a decrease in resistance imparted to the expandable slit sheet paper, a user can increase to resistance to a desirable level with the adjustment connector 450 by increasing the angle θ (e.g., to an angle closer to 90 degrees or even beyond 90 degrees) and/or by increasing the distance X such that the distal ends of the bristles extend further downward from the top cross-plate 402 and, thus, increase the resistance or force applied against the expandable slit sheet paper.

With reference to FIG. 5E, FIG. 5E shows an illustrative structure by which the angular orientation in the direction Y and the raised and lowered position in the direction X can be adjusted and set by rotation of respective dials according to some illustrative embodiments. As shown in FIG. 5E, in some embodiments, the top cross plate can include a first rotary dial KY for manually adjusting the angular orientation in the direction Y, and the top cross plate can include a second rotary dial KX for manually adjusting the raised and lowered position in the direction X.

In this illustrative example, rotation of the dial KY, which is fixed to a the top cross-plate 402, imparts rotation of the pulley PY, which results in rotation of the gear G1 which is fixed to the mounting plate M. As shown, the gear G1 has perimeter teeth that engage with perimeter teeth of a second gear GY. The second gear GY is mounted on the mounting plate M in a manner to rotate around a central axis. The second gear GY is also fixedly connected to the receiving channel RC, whereby rotation of the gear causes an angular displacement of the receiving channel RC in the direction Y such that the receiving channel RC pivots around the center axis of the second gear GY as a pivot P. In this manner, by rotating the dial KY to a select position, the angular position of the receiving channel RC and, hence, the angle of the friction member supported thereby can be selectively adjusted. In the preferred embodiments, the position of the dial can be maintained by a) locking the dial KY in a selected position (e.g., with a pin or detent member), b) frictionally retaining the dial in a selected position with a friction element that contacts the dial KY and requires a sufficient force (such as, e.g., by applying a manual rotation force on the dial KY to overcome the force of the friction element, c) or the like.

In this illustrative example of FIG. 5E, rotation of the dial KX, which is also fixed to a the top cross-plate 402, imparts rotation of the pulley PX, which results in rotation of the gear GX which is fixed to the receiving channel RC. As shown, the gear GX has perimeter teeth that engage with a tooth rack TR along a side of the proximal end PE of the brush member 500 (e.g., in some examples, such a tooth rack TR can be formed along a side of a backing B similar to the backings shown in FIGS. 8A-8I). In this manner, by rotating the dial KX to a select position, the vertical position of the friction member 500 can be selectively adjusted. In the preferred embodiments, the position of the dial KX can also be maintained by a) locking the dial KX in a selected position (e.g., with a pin or detent member), b) frictionally retaining the dial in a selected position with a friction element that contacts the dial KX and requires a sufficient force (such as, e.g., by applying a manual rotation force on the dial KX to overcome the force of the friction element, c) or the like.

Figure 5F:
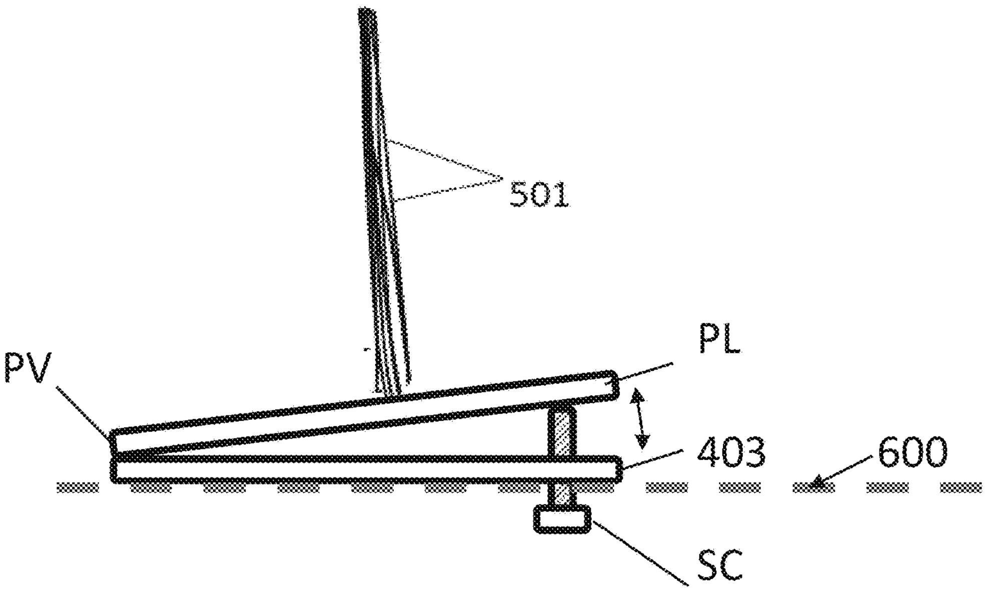
FIG. 5F is a side view showing an illustrative adjustor including an adjustable plate member.
Figure 5G:
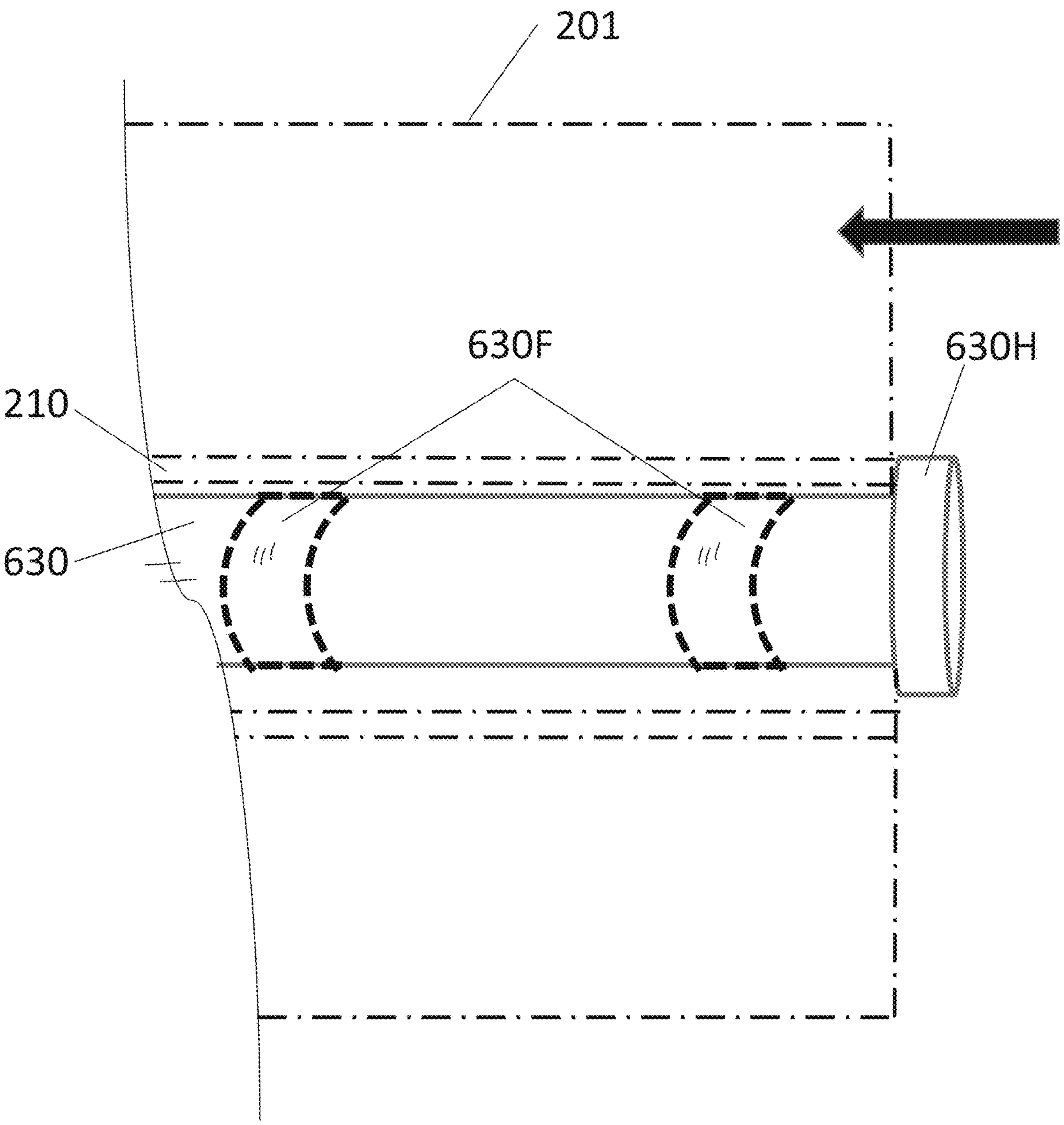
FIG. 5G is a side view showing an illustrative shaft for mounting a roll of expandable slit sheet paper.

In some alternative embodiments, rather than or in addition to having the friction member or brush 500 being made adjustable in the direction Y and/or the direction X as described herein, as shown in FIG. 5F the friction unit 400 can include an adjuster plate PL that is located underneath the friction member or brush 500. In some embodiments, the adjuster plate PL is mounted upon a floor plate 403 that extends between and is connected to the bottom ends of the support walls 401. In some other embodiments, an adjuster plate can be directly mounted upon or supported upon the support member 600. In the example depicted in FIG. 5F, the support plate PL can be raised or lowered such as to move towards or away from the distal end of the brush member or brush 500 via, for example, a pivot connection PV between the support plate PL and the floor plate 403, in conjunction with an adjustor SC, such as, e.g., a bolt or screw or other mechanical mechanism, that can be adjusted to vary the position of the PL in the directions up-and-down depicted by the double-sided arrow shown in FIG. 5F. In some other embodiments, the support plate PL can be mounted in a manner to adjust both the angle at the PV as well as the height towards the friction member 500. In some other embodiments, rather than being pivoted at the pivot PV or the like, the support plate PL can be raised and lowered while in a non-varying angle with respect to the friction or brush member, such as e.g., maintaining a substantially parallel nature with respect to the support member 600.

In summary, in some preferred implementations, in the operation of the first embodiment, at least some of the following steps can be performed:

First, a user places a roll 201 of expandable slit sheet paper upon the a support shaft 630 (such as, e.g., by laterally axially sliding the roll 201 over the end of the support shaft 630.

Second, a user manually pulls the distal free-end (see, e.g., FE in FIG. 5A) of the expandable slit sheet paper 200, an directs the paper over the closest of the three conveying rollers 305, down under the lowest (e.g., middle roller) of the conveying rollers 305, and back over the top side of the third conveying roller 305.

Third, the user manually pulls the free end FE towards the friction member unit 400, and then directs the free end FE underneath the distal end of the friction member or brush 500. In some preferred embodiments, in which the position of the friction member or brush 500 is adjustable (such as, e.g., employing an adjuster connector 450 as described herein), in order to facilitate directing of the free end FE underneath the distal end of the friction member or brush

500, a user can adjust the friction member or brush by raising and/or angularly tilting the friction member or brush 500 such that the distal end of the bristles (or other friction member) are raised and sufficiently separated from the surface 610 to facilitate directing the free end FE of the expandable slit sheet paper 200 underneath the friction member or brush 500 towards a position similar to that shown in FIG. 5A.

Fourth, after the expandable slit sheet paper 200 is located upon the expansion system to a position similar to, e.g., that shown in FIG. 5A, in some preferred embodiments the user can set the position of the friction member or brush 500 to an operating or use position so that the friction member or brush 500 imparts sufficient resistance against the expandable slit sheet paper 200 when a user manually pulls the distal end region in the direction of the arrow A shown in FIG. 5A. For example, in some embodiments, a user can adjust the resistance applied by the friction member or brush 500 employing an adjuster connector 450 or another adjuster that is adapted to enable adjustment of the position (e.g., distance from surface 610 and/or orientation) of the friction member or brush 500.

Fifth, after the expandable slit sheet paper 200 is installed and the expansion system ES is ready for use, a user preferably manually pulls the distal end of the paper and causes some or all of the expandable slit sheet paper 200 in the region 203 downstream from the friction member unit 400 to the free end FE such as to expand the cells to a state of full expansion or substantially a state of full expansion such as to include fully or substantially open cells 203C as shown in FIG. 5A.

Sixth, then a user can wrap the expanded slit sheet paper around an item and tear the expandable slit sheet paper within the region 203 once wrapped around the item or, alternatively, the user can tear off a second of the expanded slit sheet paper within the region 203 and then wrap the expandable slit sheet paper around an item. Although the expansion system shown in FIG. 5A is preferably employed in the context of the wrapping of items, which items can be, e.g., placed within a package, box, container or the like for shipping, storage or the like, in other embodiments the expandable slit sheet paper can be employed for any other desired purposes. For example, in some embodiments, the expanded slit sheet paper can be rolled, bunched or the like and placed within a package, box, container or the like as package fill, rather than and/or in addition to use as a wrap around one or more item. As another example, in some embodiments, the expanded slit sheet paper can be used to wrap and/or support large items and/or to be stretched around or across large surfaces, such as, e.g., for use as a pallet wrap (see, e.g., U.S. patent application Ser. No. 17/802,012, the entire disclosure of which is incorporated herein by reference).

Although the embodiment shown in FIG. 5A depicts the shaft 630 mounting the roll 201, the conveyor roller guide 300, the surface 610 and the friction member unit 400 in a substantially horizontal orientation, various other embodiments can be implemented in which the orientations of some or all of the shaft 630, the conveyor roller guide 300, the surface 610, and the friction member unit 400 can be non-horizontally oriented. For example, in some embodiments, the shaft 630 mounting the roll 201, the conveyor roller guide 300, the surface 610 and the friction member unit 400 can be vertically or substantially vertically oriented (such as, e.g., when a similar expansion system is used to wrap pallets). Additionally, the orientations of the shaft 630 mounting the roll 201, the conveyor roller guide 300, the surface 610 and the friction member unit 400 can be any angle between 0-360 degrees from horizontal. Notably, the device could even be mounted overhead (e.g., upside-down from that shown in FIG. 5A by inverting 180 degrees) whereby a user can access and manually grasp the expandable slit sheet paper from overhead. Among other things, overhead arrangements can be employed for space-saving considerations, ergonomic considerations and/or the like in various implementations.

With further reference to the first embodiment shown in FIG. 5A, in this illustrative embodiment the friction member unit 400 further includes at least one conveyor roller 405 (two shown in the illustrated embodiment) to facilitate smooth and uninhibited pulling of the expandable slit sheet paper 200 after it has been expanded at the friction member unit 400. In the preferred embodiments, the conveyor roller(s) 405 can include any of the same rollers as described herein employed as conveyor rollers 305.

FIGS. 3 and 5D both depict expandable slit sheet papers in a state of full expansion in which the expandable slit sheet paper expands into a common expansion pattern, in which fully expanded cells form open cells with land regions 20 that extend in a like direction with low sides LS and high sides HS of the lands as shown. In this manner, the open cells of this common expansion pattern include low and high sides as shown in FIG. 7A.

Figure 7A:
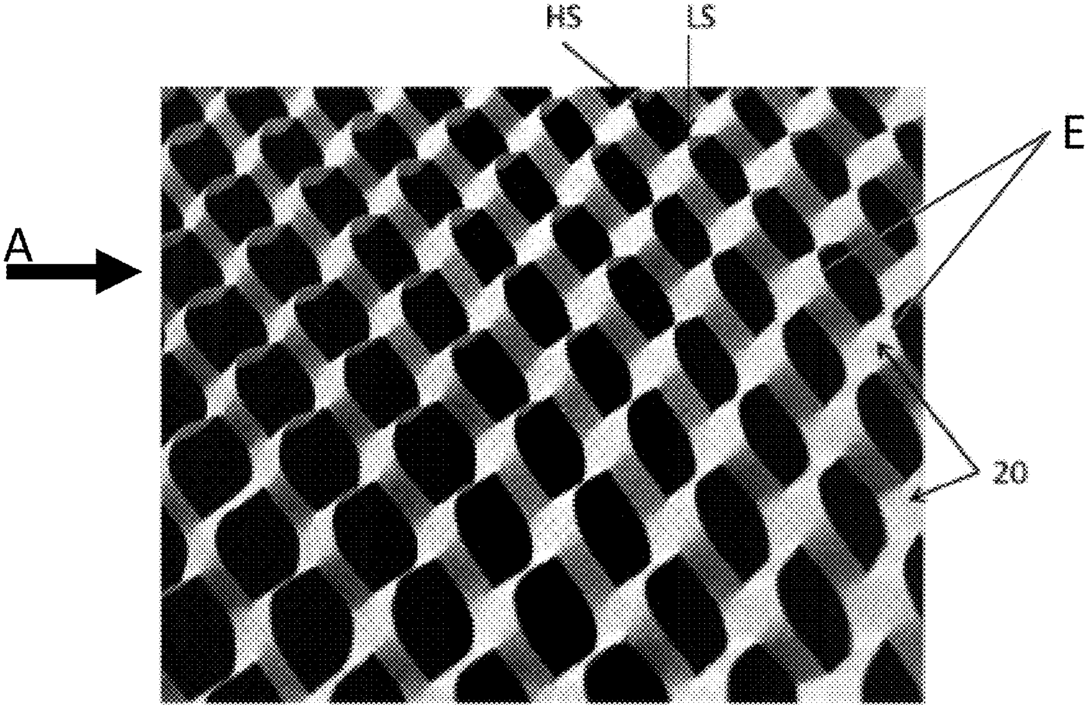
FIG. 7A is a top view of an expandable slit sheet paper employed in some embodiments of the invention having a common expansion pattern.
Figure 7B:
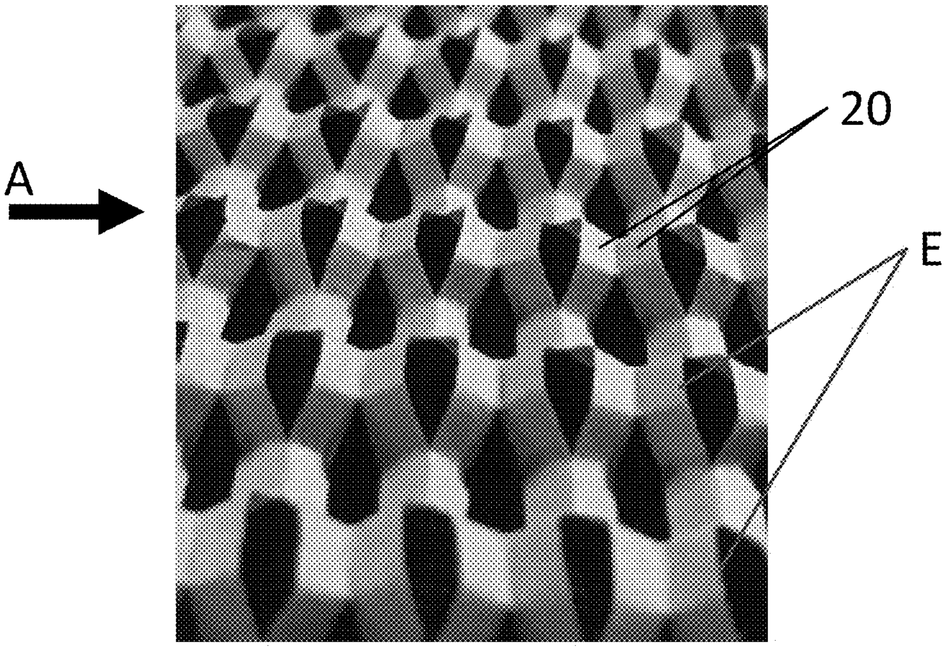
FIG. 7B is a top view of an expandable slit sheet paper employed in some embodiments of the invention having an alternating expansion pattern.

On the other hand, FIG. 7B depicts an expandable slit sheet paper in a state of full expansion in which the expandable slit sheet paper expands into a novel expansion pattern as described in the present inventor's U.S. Pat. No. 11,401,090, in which fully expanded cells form open cells with land regions 20 that are bent into a substantially V-shape with downwardly extending portions and upwardly extending portions connected together. In this manner, the open cells of this novel expansion pattern include opposite sides that are at like levels as shown in FIG. 7B. Additionally, the novel expansion pattern also includes alternating rows in which cells open in opposite directions.

In the preferred embodiments, the friction member, such as, e.g., a friction brush having a plurality of bristles, can frictionally engage the expandable slit sheet papers of FIGS. 7A and 7B, such as, e.g., by engaging the leading or raised edges E of the lands as the expandable slit sheet paper is pulled in the direction of the arrows A shown. Although FIGS. 7A and 7B depict states of full expansion, it should be appreciated that in the state of beginning expansion, the expandable slit sheet paper will twist slightly from the initial fully unexpanded state towards the respective patterns shown in the figures.

In the context of an expandable slit sheet paper that expands into the novel expansion pattern of FIG. 7B, due to the symmetrical nature of the expanded cells (e.g., with similar heights of the cells on forward and rearward sides of the open cells), the operation of the friction member, such as, e.g., a friction brush, will advantageously be the same regardless of the direction of the pulling of the paper shown at arrow A.

In the context of an expandable slit sheet paper that expands into the common expansion pattern of FIG. 7A, due to the asymmetrical nature of the expanded cells (e.g., with high sides and low sides of the cells on forward and rearward sides of the open cells), the operation of the friction member, such as, e.g., a friction brush, will be facilitated when the expansion of the cells is similar in relation to the direction of the pulling of the paper like that shown in FIG. 7A. Nevertheless, in various embodiments, such a friction member can be employed for the expansion into a common expansion pattern regardless of the direction of the arrow A with respect to the angles of the lands. Additionally, in some embodiments, the friction member, such as, e.g., a friction brush, can advantageously initiate expansion of the cells of the expandable slit sheet paper such as to assume an expansion similar to that shown in FIG. 7A in relation to the direction of the arrow A; for example, in some embodiments, the friction member can engage the leading edges E in such a manner as to coax or push the leading edges E in a direction of opening similar to that shown in FIG. 7A.

With reference to FIG. 5B, FIG. 5B is a top perspective view of an expansion system for expandable slit sheet paper employing a friction brush according to a second illustrative embodiment of the invention. The embodiment shown in FIG. 5B is similar to that shown in FIG. 5A. In FIG. 5B, same or similar elements to that shown in FIG. 5A include the same numbers followed by a semi-quote (a). It should be appreciated that some or all aspects or features of these same or similar elements can be the same or similar to that of the corresponding elements within the first embodiment shown in FIG. 5A.

Although not depicted in FIG. 5B, in the second embodiment shown in FIG. 5B, a roll of expandable slit sheet paper is to be included in a similar manner to that shown in FIG. 5A, or, in a similar manner to that shown and/or described in any other embodiment set forth herein. In the embodiment shown in FIG. 5B, the conveyor roller guide 300' is formed and operates substantially similarly to the conveyor roller guide 300, with a U-shaped frame including walls 301' and a connecting floor plate 303', which supports a plurality of conveying rollers 305'.

Furthermore, in the embodiment shown in FIG. 5B, the friction member unit 400' is formed and operates substantially similarly to the friction member unit 400, with a U-shaped frame including walls 401" and a connecting floor plate 403', which further includes a top cross-plate 402', and which further supports a friction member, such as, e.g., a friction brush 500' having bristles 501', as well as at least one conveying roller 405' (one conveying roller being incorporated in the illustrated implementation of this second embodiment).

In the second embodiment shown in FIG. 5B, each of the conveyor roller guide 300' and the friction member unit 400' are configured to be mounted to a support 600', such as, e.g., a table top or other support (which can be horizontal, angled to horizontal, vertical through 360 degrees). Although not shown, in some embodiments the corresponding roll of expandable slit sheet paper can also be mounted upon an L-shape frame that laterally supports a support shaft similar to the support shaft 630, or can be mounted upon a U-shaped frame supports a support shaft similar to the support shaft 630 (for example, when both ends of the support shaft are supported at opposing walls of a U-shaped frame, the ends can be configured to be removably supported on the opposing walls for installation and removal-such as, e.g., upon receiving yokes protruding inward to receive ends of the shaft that extend outward from a center of the roll).

In contrast to the embodiment shown in FIG. 5A, in which the friction member unit 400 is configured to be placed at, e.g., an edge of a surface 610, the friction member unit 400' of the second embodiment of FIG. 5B is configured to be placed at, e.g., any desired position upon a surface 610'. Accordingly, the second embodiment of FIG. 5B can offer additional versatility in adapting to a particular support surface or the like.

In both the first and second embodiments, the conveyor roller guides 300, 300' and the friction member units 400, 400' are preferably fixed to the support 600, such as, e.g., employing any fixing mechanism, such as, e.g., bolts or screws, adhesive, clamps and/or the like. For example, as shown in FIG. 5B, the conveyor roller guides 300' can include a plurality (e.g., four) of tabs 303T' extending from the floor plate 303' which include through holes 303TH' for inserting mounting screws or bolts. Additionally, the friction member unit 400 can include a plurality (e.g., four) of tabs 403T' extending from the floor plate 403' which include through holes 403TH' for inserting mounting screws or bolts. Similarly, with respect to the first embodiment shown in FIG. 5A, the conveyor roller guide 300 can include similar tabs and/or through holes (not shown), and the friction member unit 400 can include a plurality (e.g., two) of similar tabs 403T and through holes 403TH for inserting mounting screws or bolts.

Figure 6A:
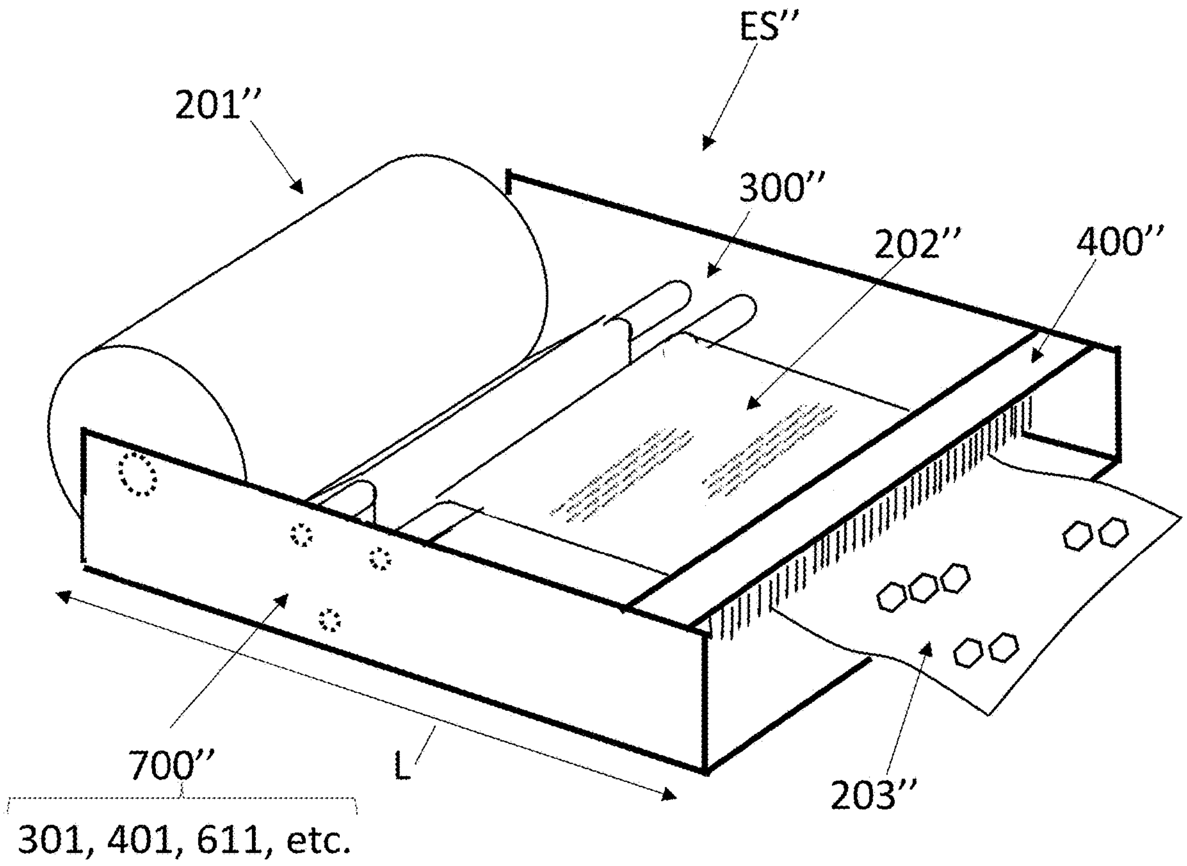
FIG. 6A is a top perspective view of an expansion system for expandable slit sheet paper employing a friction brush according to a third illustrative embodiment of the invention.

With reference to FIG. 6A, FIG. 6A is a top perspective view of an expansion system for expandable slit sheet paper employing a friction brush according to a third illustrative embodiment of the invention. The embodiment shown in FIG. 6A is similar to that shown in FIGS. 5A and 5B. In FIG. 6A, same or similar elements to that shown in FIGS. 5A and 5B include the same numbers followed by a quote (a). It should be appreciated that some or all aspects or features of these same or similar elements can be the same or similar to that of the corresponding elements within the first and second embodiments.

In particular, the embodiment shown in FIG. 6A involves a unitary expansion system ES" that includes a single support or frame 700" for supporting a roll 201" of expandable slit sheet paper, a conveyor roller guide 300", and a friction member unit 400", which are similar to the corresponding structure in the first and second embodiments. For example, as depicted in FIG. 6A, the support or frame 700" can perform supporting functions including that of, e.g., elements 301, 301, 611 etc., shown in FIG. 5A. In the illustrative third embodiment shown in FIG. 6A, the expansion system ES" can be managed and handled as a unitary item with all component parts supported by the same support or frame 700".

In some variations of the embodiment shown in FIG. 6A, the unitary expansion system ES" can be constructed with a shorter length L, such as, e.g., by reducing the length of the region 202", such that the conveyor roller guide 300" and the friction member unit 400" are directly adjacent one another.

In some variations of the embodiment shown in FIG. 6A, the unitary expansion system ES" can be provided without any conveyor roller guide 300", such that the friction member unit 400" is employed for imparting required resistance to enable expansion without such a conveyor roller guide 300". Notably, in some variations of all of the embodiments of expansion systems (e.g., ES, ES', ES", ES'", ES"") disclosed herein, conveyor roller guides (e.g., 300, 300', 300", 300'", 300"") can be omitted.

In the third embodiment shown in FIG. 6A, the expansion system ES" does not include a conveying roller adjacent (e.g., downstream) of the friction member unit 400". However, in alternate embodiments, the expansion system ES" can be adapted to include one or more conveying rollers downstream of the friction member unit 400" similar to that shown and described with reference to other embodiments described herein.

Figure 6B:
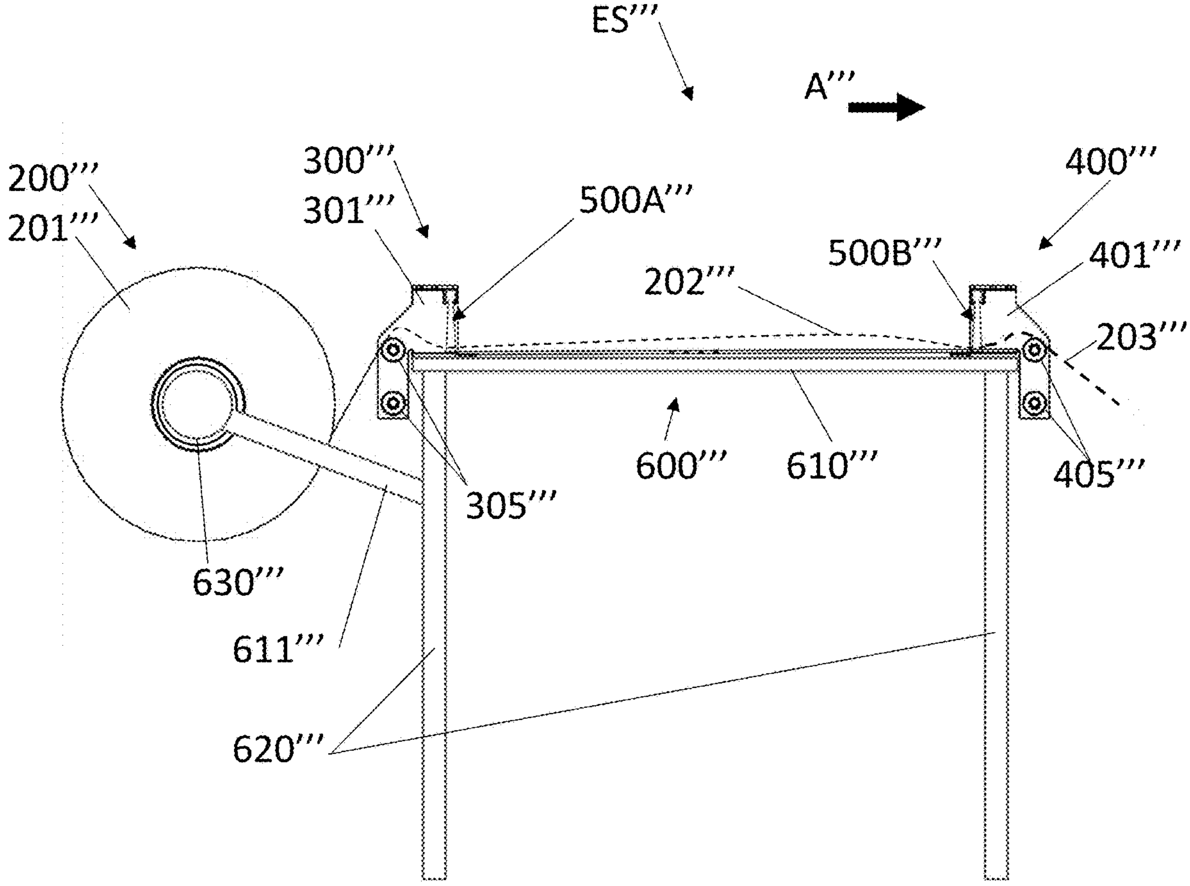
FIG. 6B is a side view of an expansion system for expandable slit sheet paper employing a friction brush according to a fourth illustrative embodiment of the invention.

With reference to FIG. 6B, FIG. 6B is a side view of an expansion system for expandable slit sheet paper employing a friction brush according to a fourth illustrative embodiment of the invention.

In FIG. 6B, same or similar elements to that shown in FIGS. 5A, 5B and 6A include the same numbers followed by a triple-semi-quote (ââx). It should be appreciated that some or all aspects or features of these same or similar elements can be the same or similar to that of the corresponding elements within the first, second and third embodiments.

The fourth embodiment shown in FIG. 6B is similar to the first embodiment shown in FIG. 5A. However, in the fourth embodiment shown in FIG. 6B, the conveyor roller guide 300 of the first embodiment is replaced with a friction member unit guide 300'''. The fourth embodiment also includes a) a roll 201''' of expandable slit sheet paper 200''' that is supported on a support 600''' via a shaft 630''' supported by a connecting arm 611''' fixed to the support 600''' and b) a friction member unit 400''' similar to that shown in FIG. 5A, with side walls 401''', conveying rollers 405''' and other components similar to the friction member unit 400 shown in FIG. 5A. In the illustrative embodiment shown in FIG. 6B, the friction member unit guide 300''' is formed with the same or similar components as that of the friction member unit 400'''. In some variations, however, the friction member 500A''' of the friction member unit guide 300''' can differ from the friction member 500B''' of the friction member unit 400'' by i) having a different structure (e.g., employing a different type of friction member or employing a similar friction member (such as, e.g., a brush having bristles with different qualities or characteristics, such as, e.g., different flexibility, length, diameter, etc.) and/or by ii) adjusting the positioning (e.g., distance from the surface 610''' and/or angular orientation) in a similar manner to that described above with respect to the first embodiment.

In the illustrative embodiment shown in FIG. 6B, the friction member unit guide 300''' and the friction member unit 400''' are each mounted at opposite edges of a support 600''' (such as, e.g., a table). However, in alternative embodiments, the friction member unit guide 300''' and the friction member unit 400''' can include structure similar to that of the friction member unit 400' shown in FIG. 5B, or can include structure similar to that of any friction member unit included in any other embodiment of the invention described herein. Accordingly, for example, in some embodiments, the friction member unit guide 300''' and the friction member unit 400'' can be configured similar to the embodiment shown in FIG. 5B and, thus, be located anywhere upon a support surface in a manner similar to that described above with respect to the second embodiment shown in FIG. 5B.

Additionally, the expansion system ES shown in FIG. 6B can be adapted in a parallel manner to that of various other embodiments described herein, such as, e.g., for example to form a unitary expansion system similar to that shown in FIG. 6A, which includes two friction member units, with a first operating as a friction member unit guide 300''' and a second operating as a friction member unit 400'''.

As with the embodiment shown in FIG. 5A, the friction member unit guide 300''' can be employed to maintain the expandable slit sheet paper in a flat state. Additionally, in the preferred embodiments, the friction member unit 300''' also applies some resistance to the expandable slit sheet paper as it is pulled in the direction of the arrow A''' shown in FIG. 6B. In the preferred embodiments, the applied resistance is not sufficient to fully expand the cells of the expandable slit sheet paper. However, in preferred embodiments the resistance imparted at the friction member unit guide 300''' is sufficient to cause the cells of the expandable slit sheet paper to begin expansion, such that the expandable slit sheet paper downstream of the friction member unit guide 300''' is not fully flat and is not in a fully unexpanded state.

As with the first, second and third embodiments, although the embodiment shown in FIG. 6B includes a substantial distance of separation between the friction member unit guide 300''' and the friction member unit 400''', the distance can be adjusted as desired. Additionally, as with the first, second and third embodiments, the friction member unit guide 300''' can be integrated with the friction member unit 400'''; for example, the walls 301''' and 401''' can be formed as a unitary wall structure.

Preferably, the expandable slit sheet paper within the region 202''' that extends from the exit of the friction member unit guide 300''' to the friction member unit 400''' is in a state of beginning of expansion but prior to a state of full expansion similarly to that described above with respect to the first, second and third embodiments. Additionally, preferably the expandable slit sheet paper within the region 203''' downstream of the friction member unit 400''' is in a state of full expansion in which the lands are at or substantially at their maximum angle with respect to the original plane of the expandable slit sheet paper and the slits are opened into fully expanded cells similarly to that described above with respect to the first, second and third embodiments.

As described above, in the fourth embodiment shown in FIG. 6B, the conveyor roller guide 300 of the first embodiment is replaced with a friction member unit guide 300'''. Similarly, in some further variations, the second embodiment, the third embodiment and all other embodiments described herein can be modified to replace the corresponding conveyor roller guides (e.g., 300, 300', 300'', etc.) with friction member unit guides similar to that of the fourth embodiment shown in FIG. 6B.

In some variations of all of the embodiments described herein, the respective friction member units (e.g., 400, 400', 400'', 400''', 400'') can include multiple friction members or brushes, such as, e.g., two, three or more friction members or brushes.

Figure 6C:
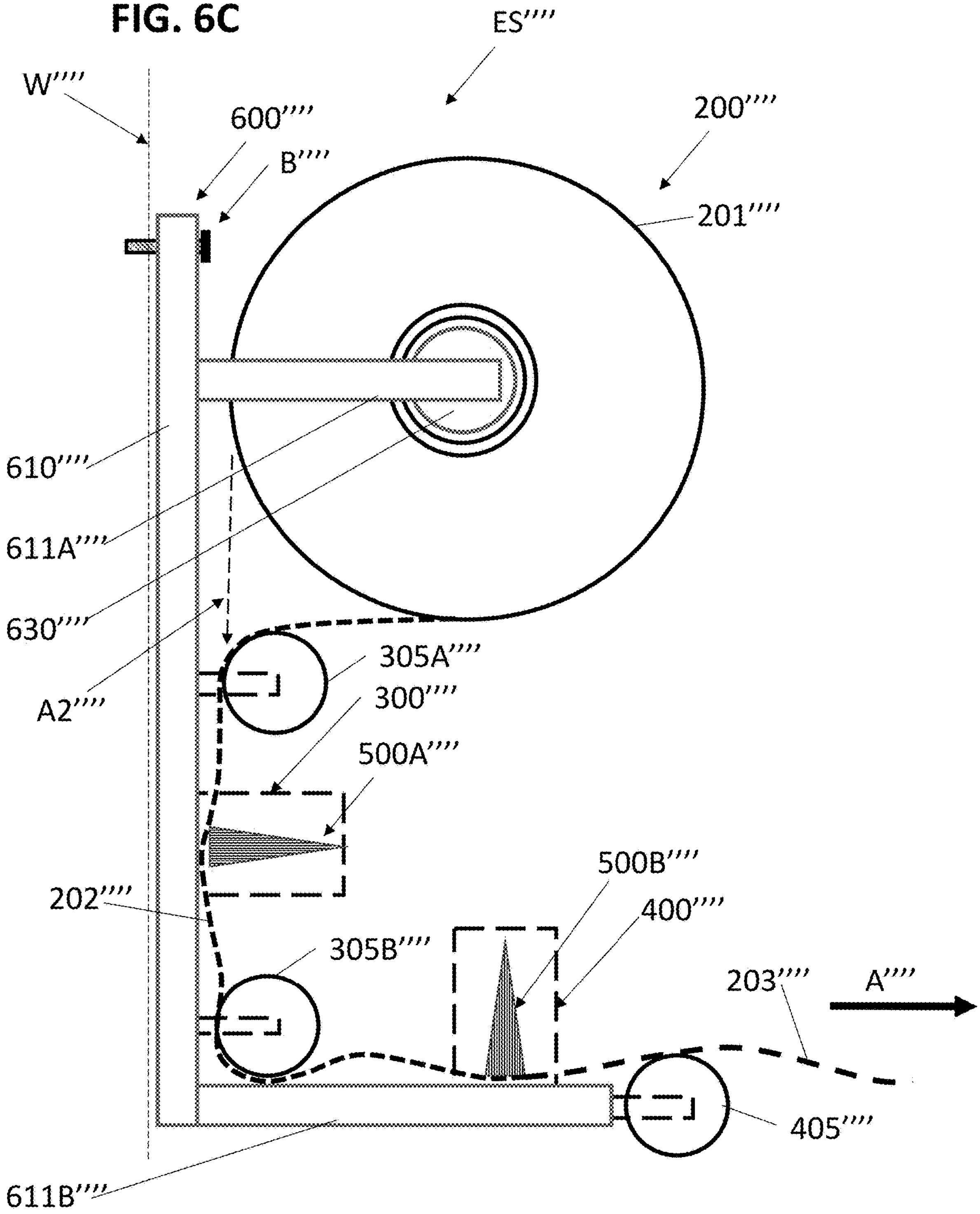
FIG. 6C is a side view of an expansion system for expandable slit sheet paper employing a friction brush according to a fifth illustrative embodiment of the invention.

With reference to FIG. 6C, FIG. 6C is a side view of an expansion system for expandable slit sheet paper employing a friction brush according to a fifth illustrative embodiment of the invention.

In FIG. 6C, same or similar elements to that shown in FIGS. 5A, 5B, 6A and 6B include the same numbers followed by a quadruple-semi-quote (ââ∝). It should be appreciated that some or all aspects or features of these same or similar elements can be the same or similar to that of the corresponding elements within the first, second, third and fourth embodiments.

The fifth embodiment shown in FIG. 6C is generally similar to the fourth embodiment shown in FIG. 6B. However, in the fifth embodiment shown in FIG. 6C, the expansion system is configured for mounting to a non-horizontal surface, such as, e.g., a substantially vertical wall W''''. In the same manner that the embodiment shown in FIG. 6C is adapted to be mounted to a non-horizontal surface, such as, e.g., a wall W'''', all other embodiments of the invention can be similarly adapted to be mounted to a non-horizontal surface, such as, e.g., a wall, employing the same or similar structure to that shown in FIG. 6C.

In the fifth embodiment, similarly to the fourth embodiment shown in FIG. 6B, rather than employing a conveyor roller guide as in the first through third embodiments, a friction member unit guide 300'''' is employed that can be the same or similar in structure to the friction member unit guide 300''' shown in FIG. 6B.

In the fifth embodiment, a support 600"" is provided that is configured for mounting and supporting all of the components of the expansion system ES"" as a unitary expansion system in a general similar manner to the expansion system ES" shown in FIG. 6A. Towards that end, it should be appreciated that both of the expansion systems ES" and ES"" can be carried (e.g., manually), packaged, shipped and/or stored as unitary members or unitary expansion systems (e.g., with or without the corresponding rolls 201" or 201"").

In the illustrated fifth embodiment shown in FIG. 6C, the support 600"" can be mounted to a wall W"" or the like via one or more bolts B"" or other fixing members. As also shown, the support 600"" also preferably includes a connecting arm 611A"" for supporting a shaft 630"" that extends through and supports the roll 201"" of expandable slit sheet paper 200"" (e.g., in a manner similar to that described in the foregoing embodiments).

In the illustrated fifth embodiment, during operation the expandable slit sheet paper a) extends downward from the distal end of the roll 201' from the wall W"", b) then extends around a first conveying roller 305A"" so as to be directed to proceed towards the friction member unit guide 300"" between a contact end of a friction member or brush 500A"" (e.g., along distal ends of bristles or the like), c) then extends around a second conveying roller 305B"" so as to be directed to proceed towards the friction member unit 400"" between a contact end of the friction member or brush 500B"" (e.g., along distal ends of bristles or the like), and c) then extends outward within a region 203"" at which a user can manually grasp or pull the expandable slit sheet paper in the direction of the arrow A"" as shown.

As with other embodiments described herein, in some variations of the fifth embodiment, the friction member unit guide 300"" can be replaced by a conveyor roller guide similar to that of the first, second and/or third embodiments (e.g., 300, 300', 300").

Among other advantages, the fifth embodiment provides a space-saving structure which can take up a reduced horizontal footprint, and can allow table or other horizontal support surfaces to be employed for other purposes.

In some other variations of the fifth embodiment, the expandable slit sheet paper can be withdrawn from the roll 201"" from a proximate side of the roll 201"" adjacent to the wall W"", such as, e.g., to follow a path shown by the broken arrow A2"" in FIG. 6C. In some variations, when the paper follows the path A2"", the conveying roller 305A"" can be omitted due to the path A2"" being directed closer toward the entry location of the friction member unit guide 300"" as shown in FIG. 6C.

In the fifth embodiment shown in FIG. 6C, the support 600"" includes a laterally extending connecting arm 611B"" that extends laterally away from the surface 610"" that extends along the wall W"". The laterally extending connecting arm 611B"" facilitates, e.g., directing of the expandable slit sheet paper 200"" substantially laterally towards a user for manual grasping and pulling of the region 203"" in the direction of the arrow A"".

Figure 6D:
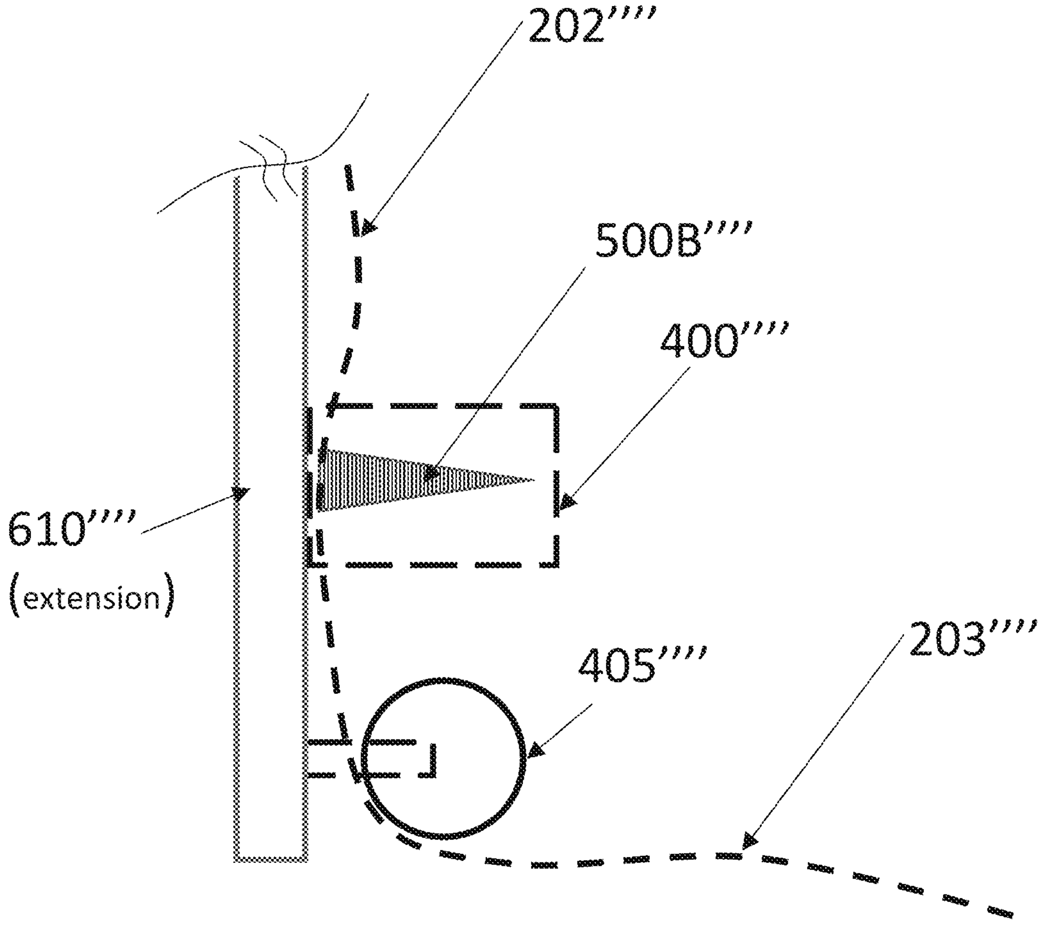
FIG. 6D is a side view of a portion of an expansion system for expandable slit sheet paper employing a friction brush according to a variation of the fifth embodiment shown in FIG. 6C.

In some other variations of the fifth embodiment, the support 600"" can be modified such that the laterally extending connecting arm 611B"" is omitted, but rather the bottom of the surface 610"" is extended further downward (e.g., a distance similar to the length of the arm 611B"" or less in some embodiments) in the same direction as the surface 610"" shown in FIG. 6C, such that the surface 610"" includes an extension that extends further downward that can be configured similarly to that shown in FIG. 6D. In this manner, the expansion system ES"" can be even less intrusive into a floor area of a work environment and can remain closer to the wall W" or other non-horizontal surface (e.g., a beam, a side of a table or other piece of furniture, and/or another vertical and/or non-horizontal surface, etc.) to which the expansion system ES"" is mounted. In such variations which omit the laterally extending connecting arm 611B"", the conveyor roller 305B"" can be omitted due to the paper in the region 202"", thus, being generally parallel to and in line with the entry location of the paper to the friction member unit 400"" Furthermore, in such variations which omit the laterally extending connecting arm 611B"" as shown in FIG. 6D, the conveyor roller 405B"" can be re-positioned to an opposite side of the expandable slit sheet paper within the region 203"" such that a user facilitate re-directing the omitted due to the paper in the region 202"", thus, being directed parallel to and in line with the entry location of the friction member unit 400"".

In other variations, any of the embodiments described herein can be adapted for non-horizontal (e.g., wall mounting or the like) in a similar manner to that of the fifth embodiment and variations thereof shown in FIGS. 6C and 6D.

Figure 6E:
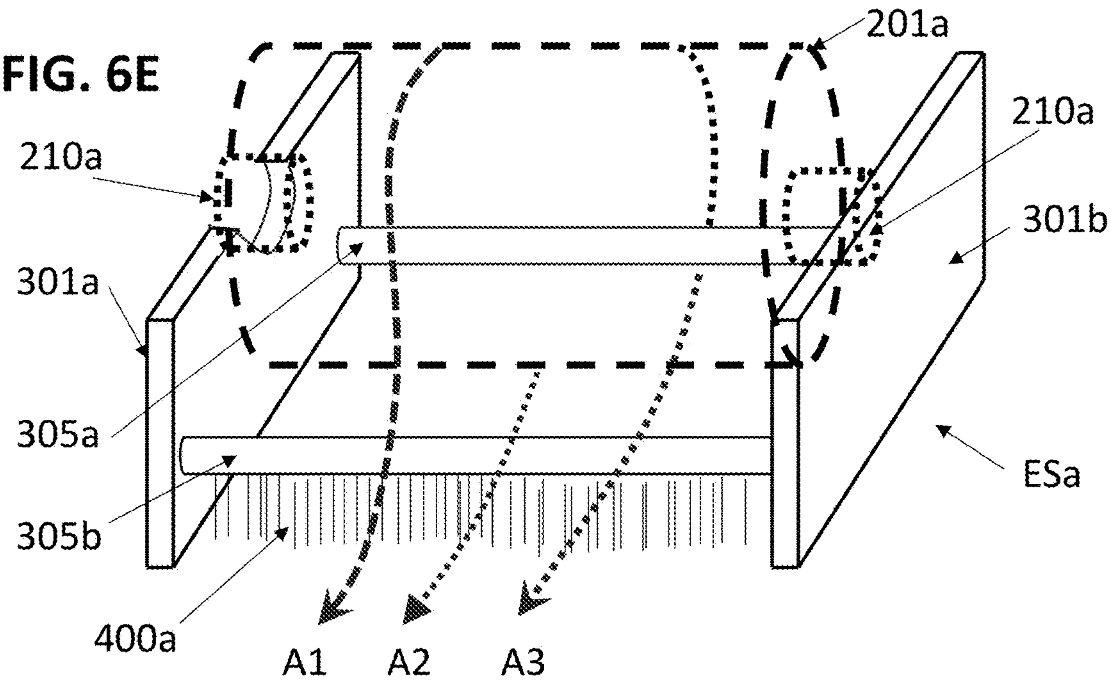
FIGS. 6E-6F and FIG. 6G are perspective views of an expansion system for expandable slit sheet paper employing a friction brush according to other embodiments of the invention.

With respect to FIG. 6E and FIGS. 66F-G, these figures show perspective views of expansion systems for expandable slit sheet paper employing friction brushes according to other embodiments of the invention.

Figure 6F:
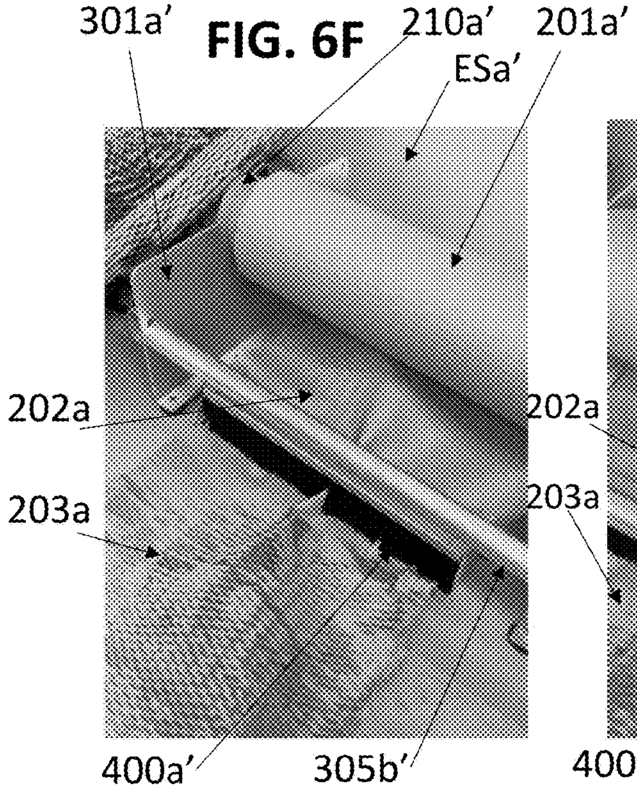
Figure 6G:
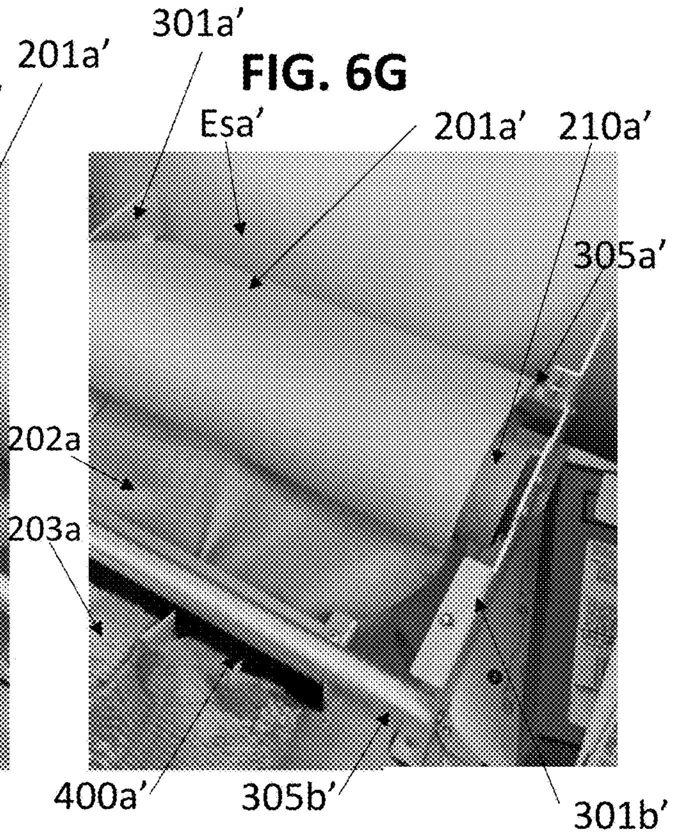
Figure 6G:
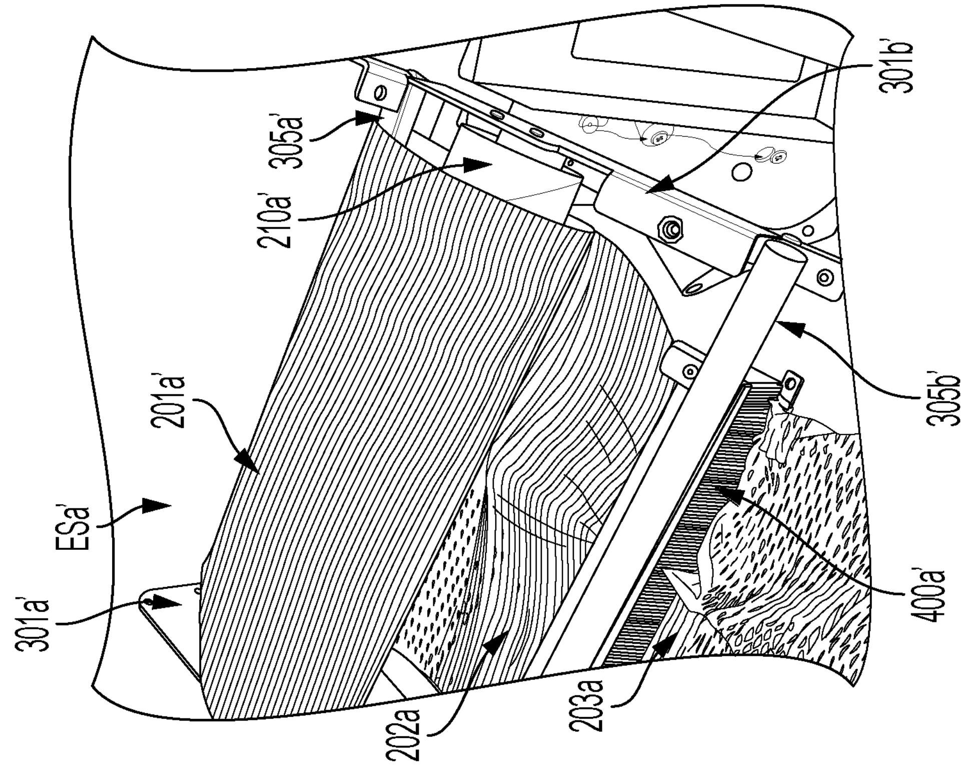
Figure 6F:
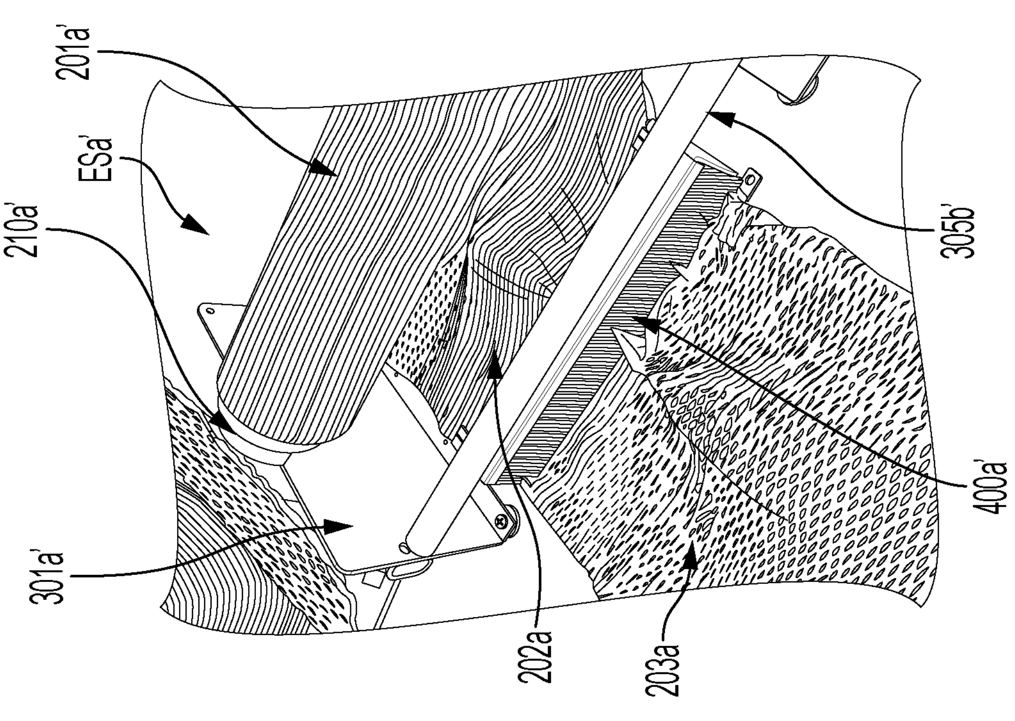

In FIG. 6E and FIGS. 6F-6G, same or similar elements to that shown in the foregoing embodiments include the same numbers followed by an a, a', b, or b'. It should be appreciated that in some implementations some or all aspects or features of these same or similar elements can be the same or similar to that of the corresponding elements within the foregoing embodiments.

The embodiments shown in FIG. 6E and FIGS. 6F-6G are similar to the first embodiment shown in FIG. 5A. The embodiment shown in FIGS. 6F-6G are photographs of an actual expansion system formed in a manner similar to that depicted in the drawing shown in FIG. 6E. Together, FIGS. 6F and 6G show a complete perspective view of the same expansion system. In the embodiments shown in FIG. 6E and FIGS. 6F-6G, an expansion system ESa, ESa' is provided that includes a compact frame structure. In the embodiment shown in FIG. 6E, a frame structure is provided that includes a first side wall 301*a* and a second side wall 302*b* which are connected together with a first rod or shaft 305*a* and a second rod or shaft 305*b*. Similarly, in the embodiment shown in FIGS. 6F-6G, a frame structure is provided that includes a first side wall 301*a*' and a second side wall 301*b*' which are connected together with a first rod or shaft 305*a*' and a second rod or shaft 305*b*'.

In the illustrated embodiments shown in FIG. 6E and FIGS. 6F-6G, the first rod or shaft 305*a*, 305*a*' has a smooth perimeter surface around which the expandable slit sheet paper feeds from a roll 201*a*, 201*a*' of expandable slit sheet paper during use. In the preferred embodiments, the outer perimeter surface of the first rod or shaft 305*a*, 305*a*' is cylindrical or substantially cylindrical (i.e., having a circular or substantially circular cross-sectional shape). In other embodiments, the outer perimeter surface of the first rod or shaft 305*a*, 305*a*' can have other configurations, such as, e.g., square, pentagonal, hexagonal, or another shape. In the preferred embodiments, a region of contact between the first rod or shaft 305*a*, 305*a*' and the expandable slit sheet paper that extends around the first rod or shaft 305*a*, 305*a*' is curved or arcuate such as to present a smooth and continuous guide surface for the expandable slit sheet paper as the expandable slit sheet paper is pulled around the perimeter surface of the first rod or shaft 305_a_, 305_a_'. In the preferred embodiments, the first rod or shaft is non-rotatably fixed to the first and second side walls. However, in some alternative embodiments, the first rod or shaft can be rotatably fixed to the first and second side walls. In the preferred embodiments, the first rod or shaft provides a function similar to the conveyor roller guide(s) and/or the friction member unit guide(s) described above in relation to the foregoing embodiments.

Although the illustrated embodiments shown in FIG. 6E and FIGS. 6F-6G include a single first rod or shaft 305_a_, 305_a_', in various modifications, the expansion systems ESa, ESa' can include multiple first rods or shafts, such as, e.g., two, three or more first rods or shafts in some implementations. For example, in some implementations, three first rods or shafts can be provided in a substantially triangular arrangement similarly to that shown in FIG. 6A. However, in some preferred embodiments, only a single first rod or shaft is provided as shown in FIG. 6E and FIGS. 6F-6G.

Additionally, in other variations of the embodiments shown in FIG. 6E and FIGS. 6F-6G, the first rod or shaft can be omitted. In the latter variation, the expandable slit sheet paper can be fed downstream directly to the brush or friction member without passing around such a first rod or shaft. Similarly, in some embodiments employing a first rod or shaft, in use, rather than feeding the expandable slit sheet paper downstream around the first rod or shaft and then to the brush or friction member, the expandable slit sheet paper can alternatively (i.e., in some alternative implementations or methods of use) be fed from the periphery of the roll of expandable slit sheet paper directly to the brush or friction member.

In various implementations, the roll of expandable slit sheet paper of the embodiments shown in FIG. 6E and FIGS. 6F-6G can be removably mounted to the first and second side walls by employing any of the mounting structures shown in the following U.S. Patents and U.S. Patent Publications, the entire disclosures of which are incorporated herein by reference as if recited herein in full: (1) U.S. Pat. No. 11,220,395, (2) U.S. Pat. No. 11,608,222, (3) U.S. Pat. No. 11,479,009, (4) U.S. Patent Application Publication No. 2021/0315426, and (5) U.S. Patent Application Publication No. 2019/0248092.

By way of example, as shown in FIG. 6E and FIGS. 6F-6G, in some embodiments, the roll of expandable slit sheet paper is mounted upon an elongated central core member having a length greater than a width of the roll such as to extend outwardly from the ends of the roll as shown in FIG. 6E and FIGS. 6F-6G (e.g., ends 210_a_ in FIG. 6E and ends 210_a_' in FIGS. 6F-6G). In some embodiments, the first and second side walls can include cut-out regions or holes (e.g., yokes) for rotatably receiving the extended regions of the core member similarly to that shown in FIG. 6F. In some embodiments, a first of the side walls can include a cut-out region or hole (e.g., yoke) for rotatably receiving one of the extended regions of the core member similarly to that shown in FIG. 6F, and a second of the side walls can include a support projection that extends partly within the other end of the core member similarly to that shown in FIG. 6G, whereby a user can slide the end of the core member over a support projection as shown in FIG. 6G and then rest the opposite end of the core member within a yoke similarly to that shown in FIG. 6F. As indicated above, FIG. 6F and FIG. 6G are views of the same device, with FIG. 6F more completely showing the first support wall 301_a_' and related structure and FIG. 6G more completely showing the second support wall 301_b_' and related structure according to some embodiments.

As shown in FIG. 6E and FIGS. 6F-6G, the expansion systems ESa, ESa' also include a friction member 400_a_, 400_a_' that is similar to the friction members of the foregoing embodiments. In some embodiments, any of the friction members described herein-above related to the foregoing embodiments can be employed in various implementations of the embodiments shown in FIG. 6E and FIGS. 6F-6G. In the illustrative implementation of the embodiments shown in FIG. 6E and FIGS. 6F-6G, the friction member is mounted to the second rod or shaft members 305_b_, 305_b_'. In other embodiments, a friction member can be mounted to the frames via other structures.

In the illustrative embodiments shown in FIG. 6E and FIGS. 6F-6G, the friction member is formed with the same or similar structure to that of any of the friction members described herein above. Similarly, in some variations, the friction member can have i) having a varied structure (e.g., employing a different type of friction member or employing a similar friction member (such as, e.g., a brush having bristles with different qualities or characteristics, such as, e.g., different flexibility, length, diameter, etc.) and/or by ii) adjusting the positioning of the friction member (e.g., distance from the surface and/or angular orientation) in a similar manner to that described above with respect to the foregoing embodiments.

As with some of the foregoing embodiments, in the embodiments shown in FIG. 6E and FIGS. 6F-6G, the rod(s) or shaft(s) 305_a_, 305_a_' can help maintain the expandable slit sheet paper in a flat state. Additionally, in the preferred embodiments, the rod(s) or shaft(s) 305_a_, 305_a_' also apply some resistance to the expandable slit sheet paper as it is pulled in the direction of the arrows A1, A2 or A3 shown in FIG. 6E. In the preferred embodiments, the applied resistance is not sufficient to fully expand the cells of the expandable slit sheet paper. However, in some preferred embodiments the resistance imparted by such rod(s) or shaft(s) 305_a_, 305_a_' is sufficient to cause the cells of the expandable slit sheet paper to begin expansion, such that the expandable slit sheet paper downstream of the rod(s) or shaft(s) 305_a_, 305_a_' is not fully flat and is not in a fully unexpanded state. In some preferred embodiments, the expandable slit sheet paper within the region 202_a_ that extends from the exit of the rod(s) or shaft(s) 305_a_, 305_a_' to the friction member 400_a_, 400_a_' is in a state of beginning of expansion but prior to a state of full expansion similarly to that described above with respect to, e.g., the first, second and third embodiments. Additionally, preferably the expandable slit sheet paper within the region 203_a_ downstream of the friction member 400_a_, 400_a_' is in a state of full expansion in which the lands are at or substantially at their maximum angle with respect to the original plane of the expandable slit sheet paper and the slits are opened into fully expanded cells similarly to that described above with respect to the first, second and third embodiments.

In some variations of all of the embodiments of FIG. 6E and FIGS. 6F-6G, the respective friction members 400_a_, 400_a_' can include multiple friction members or brushes, such as, e.g., two, three or more friction members or brushes.

In some embodiments, components (e.g., the side wall members and the rods or shafts) of the embodiments of FIG. 6E and FIGS. 6F-6G can be made with metal (e.g., aluminum) or other rigid material. Additionally, in some embodiments, the roll 201_a_, 201_a_' of expandable slit sheet paper is mounted to freely rotate upon the support or frame. In some embodiments, the expansion system can be adapted to apply some resistance to the rotation of the roll 201*a*, 201*a*' similarly to that described above (such as, e.g., in relation to FIG. 5G). In the preferred embodiments, the expansion system does do not apply sufficient resistance to the rotation of the roll 201*a*, 201*a*' to cause the expandable slit sheet material to expand to create open cells if manually pulled by a user (e.g., pulled in a manner similar to that shown in FIG. 4). However, if desired, such a friction member can be added to reduce requirements of mechanisms (described below) downstream of the roll within the expansion system for imparting resistance required to expand the expandable slit sheet paper.

With reference to FIGS. 6E and 6F-6G, in the preferred implementation, a roll of expandable slit sheet material is supported on the expansion system such that a distal end of the expandable slit sheet paper is directed from the perimeter of the roll 201*a*, 201*a*' proximate the upper end of the roll, to extend around the rod or shaft 305*a*, 305*a*', and then to extend underneath the roll (i.e., preferably, without contacting a bottom surface of the roll), and then to extend underneath the friction member 400*a*, 400*a*' (such as, for example, underneath distal ends of bristles of a brush), such that upon a user manually pulling of the distal end of the expandable slit sheet paper, the expandable slit sheet paper will follow a path A3 shown in dotted lines in FIG. 6E and as also shown in FIG. 6G.

Although the path A3 of the expandable slit sheet paper, in which the expandable slit sheet paper first extends around the rod or shaft 305*a*, 305*a*' and then proceeds downstream beneath the friction member 400*a*, 400*a*', has substantial advantages and is employed in some preferred embodiments, in some alternative implementations a user can direct the expandable slit sheet paper along different paths from the perimeter of the roll 201*a*, 201*a*' beneath the friction member 400*a*, 400*a*'. For example, as shown in FIG. 6E, in some implementations, rather than having the expandable slit sheet paper extend around the rod or shaft 305*a*, 305*a*', the expandable slit sheet paper can be pulled directly from a lower end of the roll in the direction of the arrow A2 shown in FIG. 6E and beneath the friction member 400*a*, 400*a*'. In this alternative embodiment, the expandable slit sheet paper can, thus, be directed a shorter distance from the perimeter of the roll directly to beneath the friction member.

In the implementations in which the expandable slit sheet paper follows either the path of arrow A3 or the path of arrow A2, the direction of the rotation of the roll 201*a*, 201*a*' is the same (e.g., in either case in the example shown in FIG. 6E, the roll would rotate in a clockwise direction as seen at rightmost edge of the roll in FIG. 6E). In another alternative implementation, rather than having the expandable slit sheet paper extend around the rod or shaft 305*a*, 305*a*', the expandable slit sheet paper can be pulled directly from an upper or front end of the roll in the direction of the arrow A1 shown in FIG. 6E and beneath the friction member 400*a*, 400*a*' (e.g., in contrast to the arrows A2 and A3, in this case of the arrow A1, the roll would rotate in a counter-clockwise direction as seen at rightmost edge of the roll in FIG. 6E). In this alternative embodiment, the expandable slit sheet paper can, thus, similarly be directed a shorter distance from the perimeter of the roll directly to beneath the friction member. However, in this latter example, the expandable slit sheet paper would not proceed towards the friction member in a manner that is as parallel to the plane of the support surface (e.g., table top or the like) as in implementations in which the paper follows a path A2 or A3.

In the embodiments shown in FIG. 6E and FIGS. 6F-6G, the friction member 400*a*, 400*a*' operates to impart frictional resistance causing the expandable slit sheet paper to expand into open cells by having the distal end of the friction member (e.g., distal ends of bristles of a brush) in close proximity or in contact with a support surface (e.g., a table top or the like) upon which the expansion system ESa, ESa' is supported during use. In some alternative embodiments, the support or frame can include a bottom plate member or the like that extends beneath the friction member, such that the friction imparted by the friction member is not dependent on the structure of the support surface beneath the expansion system ESa, ESa'.

Although various illustrative manual expansion systems are described herein above, any-and-all of the embodiments described herein can be implemented within automated expansion systems. For example, rather than having a user manually grasp a distal end of the expandable slit sheet paper, any-and-all of the embodiments described herein can be implemented in an environment in which a distal end of the expandable slit sheet paper is engaged for expansion via one or more automated drive roller. For example, in some embodiments, systems and methods for pulling and advancing expandable slit sheet paper as described in any of the U.S. Patents and U.S. Patent Application publications described herein can be employed, and, in some embodiments, systems and methods for pulling and advancing expandable slit sheet paper as described in U.S. Pat. No. 11,691,374 can be employed. For example, in some embodiments, a distal end of the expandable slit sheet paper can be grasped between a plurality of rollers, wherein the rollers have friction elements configured to engage the expandable slit sheet paper, such as, e.g., hooks (e.g., Velcro hooks), rubber pips or projections, or other friction members configured to engage the slits of the expandable slit sheet paper.

Further Discussion of Illustrative Expandable Slit Sheet Papers Employed in Various Illustrative Embodiments In some of the preferred embodiments, the expandable slit sheet paper employed can be made from any type of paper sheet, such as, e.g., a paper made with fibers, such as, e.g., natural fibers, plant-based fibers, cellulose fibers, or the like. In some embodiments, the paper 1 is a Kraft paper. In some embodiments, the paper 1 is an extensible paper, such as, e.g., any of the extensible papers describe in U.S. Pat. No. 10,669,086, the entire disclosure of which is incorporated herein by reference as if recited herein in full. In the preferred embodiments, the paper 1 is made of a recyclable paper material. In some embodiments, the paper 1 can be made entirely from recycled paper. In some embodiments, the paper 1 can be made entirely from virgin, non-recycled, paper. In some embodiments, the paper 1 can be made with a combination of recycled paper and virgin paper. In some embodiments, the paper is a paper that weighs greater than 25 pounds (lbs.) per 3,000 square feet (i.e., 25 #paper). In some embodiments, the paper is a paper that weighs greater than 30 pounds per 3,000 square feet (i.e., 30 #paper). In some embodiments, the paper is a paper that weighs greater than 40 pounds per 3,000 square feet (i.e., 40 #paper). In some embodiments, the paper is a paper that weighs greater than 40 pounds per 3,000 square feet (i.e., 40 #paper). In some embodiments, the paper is a paper that weighs greater than 50 pounds per 3,000 square feet (i.e., 50 #paper). In some embodiments, the paper is a paper that weighs greater than 60 pounds per 3,000 square feet (i.e., 60 #paper). In some embodiments, the paper is a paper that weighs greater than 70 pounds per 3,000 square feet (i.e., 70 #paper). In some embodiments, the paper is a paper that weighs between about 30 pounds per 3,000 square feet to 70 pounds per 3,000 square feet. In some embodiments, the paper is a paper that weighs between about 40 pounds per 3,000 square feet to 60 pounds per 3,000 square feet. In some embodiments, the paper is a paper that weighs between about 35 pounds per 3,000 square feet to 55 pounds per 3,000 square feet. In some embodiments, the paper is a paper that weighs between about 45 pounds per 3,000 square feet to 55 pounds per 3,000 square feet. In some embodiments, the paper is a paper that weighs between about 30 pounds per 3,000 square feet to 70 pounds per 3,000 square feet. In some embodiments, the paper is a paper that weighs between about 50 pounds per 3,000 square feet to 60 pounds per 3,000 square feet.

In the background art, paper employed for formation of expandable slit sheet paper has been formed as elongated sheets of paper that are wrapped into cylindrical paper rolls. In some examples, such cylindrical paper rolls have been formed with an axial length of about 15¼ inches.

In some embodiments, the initial sheet of paper 1 can be made with a width of greater than 20 inches, or, more preferably, equal to or greater than 25 inches, or, more preferably, equal to or greater than 30 inches, or, more preferably, equal to or greater than 35 inches, or, more preferably, equal to or greater than 35 inches, or, more preferably, equal to or greater than 40 inches, or, more preferably, equal to or greater than 45 inches, or, more preferably, equal to or greater than 50 inches, or, more preferably, equal to or greater than 55 inches, or, more preferably, equal to or greater than 60 inches, or, more preferably, equal to or greater than 70 inches, or, more preferably, equal to or greater than 80 inches, or, more preferably, equal to or greater than 90 inches, or, more preferably, equal to or greater than 100 inches.

In some preferred embodiments, the elongated paper sheet 1 has a width of between about 20 to 60 inches. In some preferred embodiments, the elongated paper sheet has a width of between about 25 to 55 inches. In some preferred embodiments, the elongated paper sheet has a width of between about 30 to 50 inches. In some preferred embodiments, the elongated paper sheet has a width of about 35 to 45 inches. In some preferred embodiments, the elongated paper sheet has a width of about 40 inches.

In some illustrative embodiments, the slit pattern imparted to the expandable slit sheet paper can be similar to the patterns and/or slit dimensions as discussed in said Application No. 63/430,499, including, e.g., that, "Although embodiments of the present invention can be applied within various expandable slit sheet papers having various patterns of slits, in some preferred embodiments, the dimensions of the expandable slit sheet paper are proportionally reduced from an expandable slit sheet paper having a 0.5" slit length, a ⅛" (0.125 inch) spacing between rows, and a spacing between slits within the same row (i.e., land length) of 3⁄16" (0.1875 inch) as follows: a) the row spacing is proportionally reduced by a ratio SL(new)/0.5 and b) the slit spacing is set at SL(new) multiplied divided by 2.6667. For example, some preferred embodiments include dimensions as set forth below Table A:

| | Slit Length (SL) | Slit Spacing (SS) | Row Spacing (RS) |
|---|---|---|---|
| Example A | 0.45 inches | 0.1687 inches | 0.1125 inches |
| Example B | 0.425 inches | 0.1594 inches | 0.1063 inches |
| Example C | 0.40 inches | 0.1500 inches | 0.1000 inches |
| Example D | 0.375 inches | 0.1406 inches | 0.09375 inches |
| Example E | 0.35 inches | 0.13125 inches | 0.0875 inches |
| Example F | 0.325 inches | 0.1219 inches | 0.0813 inches |
| Example G | 0.30 inches | 0.1125 inches | 0.0750 inches |
| Example H | 0.275 inches | 0.1031 inches | 0.0688 inches |
| Example I | 0.25 inches | 0.09375 inches | 0.0625 inches |

In some other embodiments, the slit lengths can be greater than 0.5 inches, while in some other embodiments, the slit lengths can be smaller than 0.25 inches. Similarly, in some embodiments, the slit spacing (i.e., distance between slits within a same row of slits) can be greater than 0.1687 inches, while in some other embodiments, the slit spacing can be less than 0.09375 inches. Similarly, in some embodiments, the slit row spacing (i.e., distance between slits in adjacent rows of slits) can be greater than 0.1125 inches, while in some other embodiments, the row spacing can be less than 0.0625 inches."

In some of the most preferred embodiments of the present invention, an extensible paper is employed, such as, e.g., an of the extensible papers described herein below. Among other things, extensible papers can have great advantages and lead to the development of highly improved and advantageous expandable slit sheet papers.

In some most preferred embodiments, extensible papers as set forth in the above-referenced U.S. Pat. No. 10,669,086 are employed. Towards that end, the following paragraphs (in quotations) under this section, quoted from the '086 patent, set forth details of extensible papers according to some preferred embodiments that can be employed in preferred embodiments of the present invention.

"For the purposes of the present invention, the term "extensible" as applied to paper sheets, means a paper sheet that is able to stretch in a longitudinal direction of the paper sheet upon applying a force in the longitudinal direction of the paper sheet. Illustrative extensible sheets are disclosed in U.S. Pat. No. 3,908,071, U.S. patent application Ser. No. 14/901,997 (U.S. Pat. No. 9,945,077), International Application No. WO 1984002936, U.S. Publication Nos. 2002/0060034, 2007/0240841 (U.S. Pat. No. 7,918,966), and U.S. Pat. Nos. 3,104,197, 3,220,116, 3,266,972, 3,269,393, 3,908,071, 6,024,832, 6,458,447, and 6,712,930, the entire disclosures of which are incorporated by reference herein, as though recited in full. It should be understood that the stretching of an extensible paper is measured in an unslit sheet of paper (i.e., the %'s of extensibility or ranges or extents of extensibility defined herein are based on unslit paper). As disclosed in U.S. Pat. No. 3,266,972, the test and characterization procedures employed in measuring elongation (extensibility) properties can be in accordance with standard TAPPI test Elongation T457. In addition, as disclosed in U.S. Pat. No. 3,266,972, the expression "extensible papers" means a paper having an increasable elongation in the machine direction as compared to standard, non-extensible Kraft paper."

"In some preferred embodiments, extensible paper can be produced by varying the accumulation of paper fibers by essentially slowing the paper feeding process during the drying method to trap extra fibers that make the paper appear to have microscopically sized rows of paper that you would see if one were to pleat the paper. The difference is that extensible paper's microscopic rows are adhered to each other through the use of binders and other types of adhesives in conjunction with the drying process. Reference is made to patent U.S. Application No. 2007/0240841 (U.S. Pat. No. 7,918,966) where the purpose is to create a non-creped extensible paper that does not easily disconnect from itself. In addition, the surface of the extensible paper is still fairly flat."

"In the preferred embodiments of the present invention, the extensible paper that is employed has low extensible properties as compared to other types of extensible papers. In this regard, an optimal extensible paper enables a smooth transition from an unexpanded to the expanded slit sheet by providing a small amount of stretching at the very start of expansion of the extensible slit sheet paper material."

"In some exemplary constructions, during expansion of a slit sheet, the force required to initiate expansion is substantially higher than the force required to continue expansion. For example, once the paper initially starts to bend at the slits, the expansion continues more easily during continued bending at the slits. The force required to continue the expansion of the slit sheet during this continued bending is dramatically reduced beyond the above-noted initial expansion. In some preferred embodiments, the extensible slit sheet paper substantially reduces the force required to initiate expansion. On the other hand, in some preferred embodiments, during the above-noted continued expansion, the extensible paper does not substantially stretch simultaneously with the process of expanding the slit sheet paper; otherwise, the expanded sheet might not optimally be made into a cushioning wrap."

"It should be noted that in this application, all theories related to functioning of the invention are provided to facilitate appreciation of concepts of the invention, rather than by way of limitation. Extensible paper, as designed, stretches as part of an increase in paper strength. In some embodiments, the functioning of the invention involves that the extensible slit sheet paper substantially utilizes the extensible property to ease the rotating the cells into the stretched shape and to resist tearing of the slit sheet during the expansion step. This means that at the initial point at which the cell rotates (i.e., initiating rotation between legs 38*a* and 38*b* on each side of the slit and land 20) the extensible slit sheet paper is substantially enhanced by the extensible paper's ability to stretch. In some embodiments, the functioning of the invention, thus, involves that extensible papers' properties are substantially utilized at this initial point and substantially finished as soon as the cell begins to rotate into its three-dimensional shape (i.e., after this initial point, the reliance on the extensible nature of the paper may be less substantial or even non-existent). After that initial point, the slit pattern properties, regardless of paper type, opens with greater ease to the point at which it forms a hexagon. Accordingly, in some embodiments, the extensible property substantially merely comes into play at the initial moment of expansion. In some other embodiments, while the extensible features of the paper comes into play most substantially at this initial point of rotation, the extensible features of the paper can have some affect during further expansion of the paper, whereby the initial point of expansion can be substantially facilitated due to extensibility and further expansion can also be, at least, somewhat facilitated due to extensibility."

"In some of the preferred embodiments, preferable extensible papers that can be employed include extensible papers where the purpose of the extensible nature is to provide the type of stretching found for the use of multi-wall bags for heavy weight items like cement, or seed and the like. U.S. Patent Publication No. 2016/0355985 (U.S. application Ser. No. 14/901,997) and U.S. Pat. Nos. 3,104,197 and 3,266,972 teach the manufacture and properties of this form of extensible paper. Further teachings can be found in "Understanding sheet extensibility", R. S. Seth, Pulp & Paper Canada T31, 106:2 (2005) III, pages 33-40 (T31-T38). The disclosures of the foregoing patents, patent publication, and printed publication are incorporated herein by reference, as though recited in full."

"The prior expanded slit sheet art (See, e.g., U.S. Pat. Nos. 5,538,778, 5,667,871, 5,688,578, and 5,782,735) focused on paper strength to inhibit tearing during the expansion process and Kraft paper was satisfactory because the strength required coincided with the thickness required to make a satisfactory wrapping product. The increased strength of an expandable sheet does not contribute to or increase the value/performance of the expansion of the slit sheet material. It has now been found by the present inventor that an expandable slit sheet paper can be substantially improved by the use of an extensible sheet. In the preferred embodiments, this use of an extensible slit sheet paper advantageously provides a reduction in force required to open the slit sheet and therefore provides a faster and easier expanding process for the user of the expanded slit sheet. The unexpected benefit resulting from the reduction in force at the very start of the expansion of the slit sheet provides an unexpected improvement to the slit sheet packaging product and renders the employment of the extensible paper highly unique. Notably, the prior expanded slit sheet paper persisted in and was widely used in the marketplace for decades without the contemplation of the present invention or the potential advantages therefrom."

"As set forth in this application, the present inventor has discovered that the force needed to expand an expandable slit sheet paper is far greater than the force required to expand an extensible slit sheet paper. By way of example, a 50 pound Kraft paper expandable slit sheet that is 15" wide prior to expansion requires approximately 4-6 pounds or 0.4 pounds per inch, whereas the force required to expand an extensible slit sheet of the same paper weight is 0.15-0.22 pounds per inch. This is a marked difference between the papers. Kraft paper has the strength to provide an acceptable expandable slit sheet. However, unexpectedly, the extensible slit sheet imparts an ease of expansion that greatly reduces the force required to expand the slit sheet, not based on the main purpose for extensible paper which is to increase its tensile strength but, rather, its capability to stretch. Since extensible paper is higher in cost and Kraft paper was strong enough, it was not previously known that extensible paper could be of benefit for making slit paper sheets of the types found in, e.g., U.S. Pat. Nos. 5,538,778, 5,667,871, 5,688,578, and 5,782,735, and U.S. Non-Provisional application Ser. No. 15/428,144. For example, it was not appreciated that an extensible slit sheet could have provided an equivalent strength to light weight, thin papers that previously had no applicability as a wrapping product. Light weight Kraft paper tears more easily than heavier weights of Kraft paper. It has now been found that the extensible paper enables the use of the lighter weight expanded slit-sheet papers that also advantageously provide gentler cushioning required by fragile items when a slit sheet is expanded, in contrast to the more rigid cushioning provided by heavier weight expanded slit-sheet papers."

"Reference is particularly made to the graph of Table 1 on page 5 of U.S. Patent Publication No. 2016/0355985 (now U.S. Pat. No. 9,945,077) as if recited in full, that describes paper strength based on certain manufacturing techniques.

Within the graph is a column describing elongation at the point of paper break (or tearing of fibers) separated into two sub columns of the machine direction (MD) and cross direction (CD), also referred to as transverse direction. The elongation percentage of Table 1 ranges from 5.3% to 7.1% in the cross direction (CD) and 3.3% to 10.6% in the machine direction (MD)."

"Reference is also made to U.S. Pat. No. 3,266,972 within Table Ill of column 5 which references elongation in the percentage range from 3.7% to 4.6% in the CD or cross direction and 9.7% to 11.1% in the machine direction."

"In both '985 and '972, the variations are based on the manufacturing process that places an emphasis on tensile strength and stretch in either the cross direction or machine direction accordingly."

"The present inventor has discovered that for the purposes of expanding an extensible slit sheet paper for use as a packaging wrap and/or void fill, machine direction extensible ranges from 1%-9% provide an adequate extensibility, with 1% to 6% preferred, and 1% to 4% most highly preferred. The lower the extensibility coincides with lower costs of the paper per square foot. As indicated above, it should be understood that extensibility is measured on unslit paper."

"In some alternative embodiments, machine direction extensibility ranges of the extendible slit sheet paper can have ranges of:

a) from 1.5%-9%, or more preferably from 1.5% to 6% preferred, or even more preferably from 1.5% to 4%; or
b) from 2%-9%, or more preferably from 2% to 6% preferred, or even more preferably from 2% to 4%; or
c) from 3%-9%, or more preferably from 3% to 6% preferred, or even more preferably from 3% to 4%."

"For the purposes of expanding the slit sheet paper for use as a packaging wrap and/or void fill, it has been found that cross direction extensible ranges from 1%-5% provides an adequate extensibility with 1% to 4% preferred, and 1% to 3% most highly preferred."

"In some alternative embodiments, cross direction extensibility ranges of the extendible slit sheet paper can have ranges of: a) from 1.5%-5%, or more preferably from 1.5% to 4%, or even more preferably from 1.5% to 3%; or b) from 2%-5%, or more preferably from 2% to 4%, or even more preferably from 2% to 3%."

"In combination with the extensible paper, a smaller, lighter weight, and recyclable version of an expander can be employed (such as, e.g., made entirely or substantially entirely with recyclable cardboard in some illustrative embodiments). This expands the market to customers that use a very small amount of wrap as compared to the industrial market. It also provides for a less expensive expansion device to be employed for expanding the slit paper. Additionally, it enhances the ease of use by the packer by providing for less ripping during the wrapping process that occurs when the tension is not properly set. This occurs as the roll, during its continued use, becomes smaller and lighter in weight. As the roll of expanded slit sheet becomes lighter the tension required increases. Thus, there need for a varying tensioning method. With the use of the extensible paper, the tension required is significantly decreased and the strength of the paper is increased. Both benefit the person wrapping by making the tensioning required much less precise to the point at which, a single tension setting can be used with little or no adjustment. If the tension is set higher than necessary, the increase in strength from the extensible paper keeps the product from tearing and therefore makes it easier for the packer to use. Therefore, the packer can make fewer adjustments as the slit sheet roll becomes smaller and smaller."

"The reduction in the force required to expand the slit paper enables a new product to be created using lighter weight papers. In the past, expanded slit sheet paper is primarily used as a wrapping product whereas its use as a void fill would be in limited circumstances due to void fill being typically the cheapest, that is, the lowest cost of all packaging products. The increased strength of the extensible sheet enables the use of a thinner and lighter weight slit sheet paper as a void fill product. If the expanded slit sheet is not being used as a wrap, then the thicker 0.005", 50 pounds per 3,000 square feet paper and above is not required and a lighter weight 0.003-0.0045" thick, 30-40 pounds per 3,000 square feet paper can be used as void fill. It can also be used to provide cushioning that other paper void fill products have not been able to provide. It has now been found that even though the extensible paper has a 10% higher price, the use of a thinner paper provides much more square footage per ton and more than compensates for the increased cost of the extensible paper as compared to Kraft paper."

Of the various ranges of extensibility that may be employed, in some most preferred embodiments, the ranges of extensibility employed are greater than 4% in the machine direction, or, more preferably, greater than 5% in the machine direction, or, more preferably, greater than 6% in the machine direction. In some embodiments, these ranges of extensibility are up to 20% in the machine direction. In some other embodiments, these ranges of extensibility are up to 15% in the machine direction. In some other embodiments, these ranges of extensibility are up to 10% in the machine direction. In some other embodiments, these ranges of extensibility are up to 9% in the machine direction.

The following pages under this section describe other illustrative extensible slit sheet papers in the art from other publications and patents that can be employed within some embodiments of the present invention. Towards that end, it should be understood and appreciated that some embodiments of the present invention can employ expandable slit sheet paper using any-and-all of extensible papers as described in the following pages, including ranges of extensibility and other aspects.

Detailed Descriptions of Technologies Employed in the Present Invention Quoted from Disclosures that are Incorporated by Reference "The Following are Citations from Clupak's paper patent (U.S. Pat. No. 9,945,077):"

Example 1

Heavy-duty Clupak paper having a basis weight of 84.9 g/m2 was made using a gap-former paper-making machine equipped with a Clupak system, at a paper-making speed of 480 m/min and using, as material, 100% unbleached softwood Kraft pulp that had been beaten at high concentration of 28%. The negative draw on the Clupak was set to −4.5%."

Example 2

Heavy-duty Clupak paper was made in the same manner as in Example 1, except that the paper had a basis weight of 76.1 g/m2 and the negative draw on the Clupak was set to −6.0%."

Example 3

Heavy-duty Clupak paper was made in the same manner as in Example 1, except that the paper had a basis weight of 73.4 g/m2 and the negative draw on the Clupak was set to −4.0%."

Example 4

Heavy-duty Clupak paper was made in the same manner as in Example 1, except that the paper had a basis weight of 85.0 g/m2, the negative draw on the Clupak was set to −4.0%, and the pulp blend consisted of 90% unbleached softwood Kraft pulp and 10% unbleached hardwood Kraft pulp."

Comparative Example 1

Heavy-duty Clupak paper was made in the same manner as in Example 1, except that the paper had a basis weight of 71.9 g/m2 and the negative draw on the Clupak was set to −10.0%."

Comparative Example 2

Heavy-duty Clupak paper was made in the same manner as in Example 1, except that the paper had a basis weight of 85.4 g/m2 and the negative draw on the Clupak was set to −1.0%."

Comparative Example 3

Heavy-duty Kraft paper was made in the same manner as in Example 1, except that the paper had a basis weight of 76.0 g/m2 and the Clupak process was not performed."

Evaluation Methods (Measurement of Tensile Energy Absorption Index)
Measured by the method specified in JIS P8113: 2006.
(Measurement of Breaking Elongation)
Measured by the method specified in JIS P8113: 2006.
(Measurement of Tear Index)
Measured by the method specified in JIS P8116: 2000.
(Measurement of Burst Index)
Measured by the method specified in JIS P8112: 2008.
(Measurement of Tensile Stiffness Index)
Measured by the method specified in ISO/DIS 1924-3.
(Measurement of Freeness after Disintegration)
Measured by the method specified in JIS P8220: 1998 and JIS P8121: 1995."

"Looking at the properties of the Clupak papers in Examples 1 to 4 and Comparative Examples 1 and 2 as well as those of the Kraft paper in Comparative Example 3, as shown in Table 1, the Clupak papers described in Examples 1 to 4 exhibit a good balance of various strengths and elongation and have excellent strength overall; on the other hand, the Clupak papers described in Comparative Examples 1 and 2 and Kraft paper described in Comparative Example 3 exhibit a poor balance of various strengths and elongation and cannot be said to have excellent strength overall."

"The Following are Citations from "Understanding Sheet Extensibility", R. S. Seth, (Pulp and Paper Research Institute of Canada 3800 Wesbrook Mall Vancouver, BC, Canada V6S 2L9) Pulp & Paper Canada T31, 106:2 (2005) III, Pages 33-40 (T31-T38):

Tensile strength and extensibility or stretch are two important failure properties of paper. They are defined by the end-point of the sheet's load-elongation curve (FIG. 1). Individually and together, they are important for many product performance properties. For example, TEA, the tensile energy absorbed by the sheet before failure is proportional to the area under the load-elongation curve. Thus, it depends on both the tensile strength and extensibility of

TABLE 1

| | | Clupak negative draw | Basis weight | Paper thickness | Density | Air resistance | Tensile index Nm/g | | Elongation at break % | |
|---|---|---|---|---|---|---|---|---|---|---|
| | | % | g/m$^2$ | μm | g/cm$^3$ | sec | MD | CD | MD | CD |
| Examples | 1 | −4.5 | 84.9 | 121 | 0.70 | 14 | 88.1 | 31.3 | 7.0 | 7.1 |
| | 2 | −6.0 | 76.1 | 118 | 0.65 | 12 | 69.5 | 33.0 | 8.1 | 5.8 |
| | 3 | −4.0 | 73.4 | 110 | 0.67 | 13 | 72.5 | 30.1 | 6.0 | 6.0 |
| | 4 | −4.0 | 85.0 | 129 | 0.66 | 13 | 83.3 | 39.4 | 7.4 | 6.3 |
| Comparative | 1 | −10.0 | 71.9 | 112 | 0.64 | 12 | 52.0 | 28.0 | 10.6 | 5.3 |
| Examples | 2 | −1.0 | 85.4 | 130 | 0.66 | 15 | 85.0 | 32.1 | 3.7 | 6.7 |
| | 3 | Not used | 76.0 | 119 | 0.64 | 18 | 92.1 | 35.5 | 3.3 | 5.4 |

| | | TEA index J/g | | Tensile stiffness index kNm/g | | Tear index mN · m$^2$/g | | | Breaking after processsed into heavy- |
|---|---|---|---|---|---|---|---|---|---|
| | | MD | CD | MD | CD | MD | CD | Formation | duty sack |
| Examples | 1 | 3.55 | 1.55 | 5.62 | 3.64 | 12.8 | 28.9 | ○ | ○ |
| | 2 | 3.22 | 1.47 | 4.18 | 3.07 | 19.7 | 25.8 | ○ | ○ |
| | 3 | 2.60 | 1.17 | 4.95 | 3.43 | 14.9 | 20.3 | ○ | ○ |
| | 4 | 3.47 | 1.51 | 5.33 | 3.44 | 13.1 | 25.5 | ◎ | ○ |
| Comparative | 1 | 3.47 | 1.02 | 3.09 | 3.14 | 19.7 | 27.1 | ○ | X |
| Examples | 2 | 1.99 | 1.49 | 7.12 | 3.70 | 16.3 | 20.4 | ○ | X |
| | 3 | 1.89 | 1.49 | 8.92 | 3.85 | 19.1 | 24.9 | ○ | ○ |

the sheet. A high TEA is desired in sack papers [1]. The bursting strength of paper has been shown to be proportional to the product of tensile strength and the square-root of stretch [2]. The fracture toughness of paper has been found to depend strongly on the sheet's tensile strength and stretch [3, 4]. Sheet stretch has also been regarded as important for paper runnability both at the paper machine's dry-end and in the pressroom [5-8]. Papers with high stretch also seem to have a somewhat higher tearing resistance [9], and folding endurance; they are found to be more dimensionally unstable as well [10]. The factors that control sheet tensile strength are fairly well understood [4]. The tensile strength is high if fibres are strong, long, fine and thin-walled. The fibres should be conformable and have a high fibre-fibre bond strength. The sheet tensile strength is also high if fibres are straight, free from deformations and the sheets are well formed. Otherwise, the stress is unevenly distributed when the sheet is strained, leading to premature failure."

"This report deals with the factors that control sheet stretch."

"Factors that Control Sheet Stretch:

A specimen under tensile load extends more, the longer it is. Therefore, extensibility or stretch or strain at failure as a material property, is expressed as a percentage of the original specimen length (FIG. 1)."

"Role of Bonding:

Regardless of how bonding between the fibres is increased—by wet pressing, beating or refining, or additives, the sheet stretch of a furnish generally increases with increased fibre-fibre bonding. This is observed for almost all papermaking fibres—chemical, mechanical, wood, non-wood, or recycled. The reasons are as follows. Fibres have a certain "stretch-potential". However, this potential is realized in paper only when fibres form a bonded network. If the bonding is weak, the network fails before the stretch-potential is realized; the sheet stretch is low. As bonding in the network is increased, the stretch-potential of fibres is increasingly realized, the sheet stretch increases. Since increased inter-fibre bonding also increases sheet tensile strength, an increase in stretch with tensile strength is often observed for handsheets (FIG. 2). The stronger the sheet, the more the fibres' stretch-potential is utilized. Because of this relationship between tensile strength and stretch, factors such as sheet grammage or formation that tend to affect tensile strength also affect sheet stretch [11]. A comparison of handsheet stretch values at similar tensile strengths provides a meaningful comparison of the stretch-potential of various furnishes."

"The Following are Citations from Trani et al.'s Extensible Paper Patent (U.S. Pat. No. 7,918,966)[also, Published as U.S. Application No. 2007/0240841]:"

"Extensible paper is a known paper which, because of special treatment during its production, presents considerable extensibility both in the longitudinal direction (i.e. in the direction of its advancement along the production line) and in the transverse direction (i.e. in the direction perpendicular to the preceding). This treatment consists essentially of passing the paper web not yet formed and presenting a moisture content of about 35%/45% between two rollers rotating at different speeds. One of these rollers, generally the lower roller, is made of rubber and is rotated at lower speed, while the upper roller is made of steel and comprises in its cylindrical surface a continuous spiral-shaped groove. The different material nature and the different speed of the two rollers results in a sort of longitudinal accumulation of the paper forming material and prepares it for longitudinal extensibility, by an amount which can reach 15-20%. At the same time, the spiral groove performs a double function: on the one hand it causes a sort of transverse accumulation of the material forming the paper to prepare it for transverse extensibility. By an amount which can reach 10-15%. On the other band the spiral groove contributes to maintaining longitudinal advancement of the processed paper web along the machine."

"The Following are Citations from Cabell et al.'s Extensible Paper Web Patent (U.S. Pat. No. 6,458,447):"

"Tensile and Percent Stretch Test:

The tensile test is used for measuring force versus percent elongation properties. The tests are performed on a Thwing Albert Intellect II-STD Model No. 1451-24PGB, available from the Thwing-Albert Co. of Philadelphia, Pa."

"The samples used for this test are 1" wide×6" long with the long axis of the sample cut parallel to the direction of maximum extensibility of the sample. The sample should be cut With a sharp Exacto knife or some suitably sharp cutting device design to cut a precise 1" wide sample. (If there is more than one direction of extensibility of the material, samples should be taken parallel to representative direction of elongation). The sample should be cut so that an area representative of the symmetry of the overall pattern of the deformed region is represented. There will be cases (due to variations in either the size of the deformed portion or the relative geometries of regions 1 and 2) in which it will be necessary to cut either larger or smaller samples than is suggested herein. In this case, it is very important to note (along with any data reported) the size of the sample, which area of the deformed region it was taken from and preferably include a schematic of the representative area used for the sample. Three samples of a given material are tested."

"The Following are Citations from Cramer et al.'s Extensible Paper Patent (U.S. Pat. No. 3,266,972):"

"Test and Characterization Procedures:

The test and characterization procedures employed in measuring various properties reported herein are listed in Table I below. Unless otherwise indicated the code letter numerals indicate standard TAPPI tests."

"Elongation T457:

By the expression "extensible papers" is meant a paper having an increased elongation (generally a minimum of about 6%) in the machine direction.

In runs IA and IB of this example, rosin size (0.3% by weight based on the weight of pl up) is added at the beater and the pH is adjusted to 4.5 with alum. The stock, having a consistency of 3.6% is dropped to the beater chest and is then pumped to a second chest, passed through a Jordan and continuously diluted with "white water" at the Fourdrinier headbox to a consistency of 0.3%. Properties measured on the various papers is reported in Table III. Each paper has a basis weight of from 49.4 to 50.3 pounds per ream."

TABLE III

| Property | | 1A | 1B | 1C | 1D |
|---|---|---|---|---|---|
| Tensile (lbs/in.) | MD | 15.6 | 16.0 | 18.2 | 22.4 |
| | CD | 12.6 | 13.0 | 14.3 | 15.4 |
| Elongation (percent) | MD | 10.1 | 11.2 | 9.9 | 9.7 |
| | CD | 3.7 | 4.3 | 4.4 | 4.6 |
| Work-to-break | MD | 1.01 | 1.05 | 1.14 | 1.34 |
| (in.-lbs./in.$^2$) | CD | 0.34 | 0.41 | 0.47 | 0.50 |
| MIT Fold | MD | 380 | 398 | 496 | 1,021 |
| | CD | 106 | 94 | 132 | 167 |
| CSI Abrasion (cycles) | MD | 14 | | 20 | 25 |
| | CD | 7 | | 37 | 64 |

"The Following are Citations from Trani et al.'s Multilayer Paper Material Patent (U.S. Pat. No. 8,518,522):"

"These and other objects which will be apparent from the ensuing description are attained according to the invention by a multilayer papery material comprising at least one first three dimensional structure sheet exhibiting reliefs having maximum sizes which are lower than the width of the original sheet, said reliefs being obtained through localized stretching of said first sheet which has an original degree of extensibility of not less than 5% in all the directions, and at least one second sheet made of papery material coupled to said first structure sheet and defining empty spaces with the reliefs thereof."

"As it can be seen from the figures, in the embodiment shown in FIG. 1 the multilayer material of the invention consists of two layers 2, 4 of paper presenting extensibility characteristics of not less than 5% both in a longitudinal and in a transverse direction, and preferably not less than 15%."

U.S. Pat. No. 10,669,086:

Further details related to extensible papers that can be employed in some preferred embodiments are also quoted in the '086 patent as follows.

"The following is a direct quote of the paragraph on column 1, lines 4-19, of U.S. Pat. No. 3,908,071 incorporated by reference in the preceding paragraph: "Extensible (compacted) paper produced, for example, in accordance with the apparatus and process disclosed in U.S. Pat. No. 2,624,245 has certain well recognized advantages and commercial uses. Such paper is subjected, while in a partially moistened condition, to compressive compaction in the direction of web movement (machine direction or MD) between a pressure nip, thus compacting and forcing the fibers together to produce an inherent stretchability without creping. Compacted paper has improved tensile energy absorption (TEA) burst and tear characteristics which are highly desirable for such end uses as the manufacture of paper sacks." In addition, the following is a direct quote of the Abstract of U.S. Pat. No. 6,024,832 incorporated by reference in the preceding paragraph: "A method for producing extensible paper, comprising the following stages: feeding a mix of vegetable fibres to a kneader member, mixing the mix with water in the kneader, beating the fibres to obtain a pulp, transferring the beaten pulp into a flow chest, feeding the beaten pulp from the flow chest onto a paper web formation cloth with consequent reduction of the water percentage by gravity and vacuum, pressing the web, with consequent further reduction of its water content, initial drying of the paper web to a substantially constant moisture content of between 15% and 65%, compacting, final drying to a moisture content of between 15% and 4%, preferably 10%-8%, glazing, wherein: the beating stage is carried out by rubbing the fibres in a multistage unit to obtain a pulp having a degree of beating of at least 30. degree. SR, the compacting stage is carried out between at least a pair of rollers of which one is of hard material comprising circumferential surface ribs and driven at greater speed, and the other is of soft material with a smooth surface and driven at lesser speed." In addition, the following is a direct quote of the $2^{nd}$ paragraph of the Background section of U.S. Pat. No. 9,945,077 incorporated by reference in the preceding paragraph: "On the other hand, Clupak refers to equipment that inserts a paper web between a roll and an endless rubber blanket to compress the paper web with a nip bar and the rubber blanket, while at the same time the pre-stretched blanket shrinks to cause the paper web to also shrink and thereby increase its breaking elongation, and this equipment is used to provide increased breaking elongation to kraft paper used in heavy packaging applications as mentioned above." In addition, the following is a direct quote of the paragraph on column 2, lines 41-56 of U.S. Pat. No. 3,104,197 incorporated by reference in the preceding paragraph: "The use of rubber or rubberous material in conjunction with a hard surface in the manner described is known in the treatment of paper as well as fabrics but only in a general way and the present invention includes the use of rubber considerably softer and more elastic than previously used. Also of great importance in the production of an extensible paper by creping it in this manner is the differential in speeds at which the rolls are driven. If the proper combination of hard and soft surfaces is provided, a semi-dry paper web passing through the nip of the rolls will be carried by the contracting rubber against the direction of web travel toward the nip and over the surface of the hard roll. This creates a uniformly compressed crepe in the paper web giving toughness, pliability and extensibility."

"The following are direct quotes of paragraphs and of U.S. Patent Publication No. 2016/0355985 incorporated by reference in the preceding paragraph: (1) "[0003] On the other hand, Clupak refers to equipment that inserts a paper web between a roll and an endless rubber blanket to compress the paper web with a nip bar and the rubber blanket, while at the same time the pre-stretched blanket shrinks to cause the paper web to also shrink and thereby increase its breaking elongation, and this equipment is used to provide increased breaking elongation to kraft paper used in heavy packaging applications as mentioned above;" and "[0028] The manufacturing method using this Clupak system is such that a paper web is inserted between a roll and an endless rubber blanket to compress the paper web with a nip bar and the rubber blanket, while at the same time the pre-stretched blanket shrinks to cause the paper web to also shrink and thereby increase its breaking elongation. The Clupak system allows for adjustment of the breaking elongation of kraft paper in the longitudinal direction according to the ratio of the manufacturing speed on the inlet side of the Clupak system and manufacturing speed on the outlet side of the Clupak system, and also according to the pressurization force applied by the nip bar."

In some embodiments, extensible paper employed can involve one or more of the following Example features, as set forth in the '086 patent.

Example 1: An extensible slit sheet paper cushioning product, comprising: a roll of slit sheet paper having a slit pattern including a plurality of slits extending in a cross direction that forms a plurality of open cells upon expansion in a machine direction, said roll resisting pulling of a length of slit sheet paper along the machine direction to enable expansion of the length of slit sheet paper in the machine direction, said slit sheet paper being formed from a paper that is extensible in the machine direction and the cross direction prior to providing said slit pattern, said extensible paper having an extensible range of 3 to 20% in the machine direction prior to providing said slit pattern.

Example 2: The extensible slit sheet paper cushioning product of example 1, wherein said extensible range is not less than 5% in both the machine direction and cross direction.

Example 3: The extensible slit sheet paper cushioning product of example 1, wherein said extensible range is 3-15% in the machine direction; or, in some embodiments, wherein said extensible range is 3-9% in the machine direction.

Example 4: The extensible slit sheet paper cushioning product of example 1, wherein said slit sheet paper is configured such that expansion is performed by applying an expansion force of 0.15 to 0.22 pounds per inch to form said open cells.

Example 5: The extensible slit sheet paper cushioning product of example 2, wherein said slit sheet paper is configured such that expansion is performed by applying an expansion force of 0.15 to 0.22 pounds per inch to form said open cells.

Example 6: The extensible slit sheet paper cushioning product of example 5, wherein said slit sheet paper has a weight, prior to expansion, from about 30 to 50 pounds per 3,000 sq. ft.

Example 7: The extensible slit sheet paper cushioning product of example 1, wherein said slit sheet paper has a weight, prior to expansion, from about 30 to 50 pounds per 3,000 sq. ft.

Example 8: A shipping package comprising: a wrapped object, said wrapped object being wrapped in at least two layers of an expanded slit sheet paper wrap having interlocking hexagonal cells, said slit sheet paper having a slit pattern including a plurality of slits extending in a cross direction that forms a plurality of hexagonal cells upon expansion in a machine direction and being expanded by applying an expansion force and wrapped to form said at least two layers of expanded slit sheet paper wrap having interlocking hexagonal cells, said slit sheet paper being formed from a paper that is extensible in the machine direction and the cross direction prior to providing said slit pattern, said extensible paper having an extensible range of 3 to 20% in the machine direction prior to providing said slit pattern.

Example 9: The shipping package of example 8, wherein said extensible range is not less than 5% in both the machine direction and cross direction.

Example 10: The shipping package of claim 8, wherein said extensible range is 3-15% in the machine direction.

Example 11: The shipping package of example 8, wherein said slit sheet paper is configured such that expansion is performed by applying an expansion force of 0.15 to 0.22 pounds per inch to form said hexagonal cells.

Example 12: The shipping package of example 11, wherein said slit sheet paper has a weight, prior to expansion, from about 30 to 50 pounds per 3,000 sq. ft.

Example 13: The shipping package of example 8, wherein said slit sheet paper has a weight, prior to expansion, from about 30 to 50 pounds per 3,000 sq. ft.

Example 14: A method of expanding and wrapping a slit sheet paper that upon expansion and wrapping forms two or more layers of interlocking hexagonal cells, comprising the steps of: providing said slit sheet paper having a slit pattern including a plurality of slits extending in a cross direction that forms a plurality of hexagonal cells upon expansion in a machine direction, wherein said slit sheet paper being formed from a paper that is extensible in the machine direction and the cross direction prior to providing said slit pattern, said extensible paper having an extensible range of 3 to 20% in the machine direction prior to providing said slit pattern, expanding said slit sheet paper, and wrapping said expanded slit sheet paper to form adjacent layers, said adjacent layers being in interlocking contact, whereby expanded layers resist contraction and tearing.

Example 15: The method of example 14, wherein said extensible range is not less than 5% in both the machine direction and cross direction.

Example 16: The method of example 14, wherein said extensible range is 3-15% in the machine direction.

Example 17: The method of example 14, wherein said step of expanding comprises applying an expansion force of 0.15 to 0.22 pounds per inch to form said hexagonal cells.

Example 18: The method of example 17, wherein said slit sheet paper has a weight, prior to expansion, from about 30 to 50 pounds per 3,000 sq. ft.

Example 19: The method of example 14, wherein said slit sheet paper has a weight, prior to expansion, from about 30 to 50 pounds per 3,000 sq. ft.

Example 20: The method of example 14, wherein the step of wrapping said slit sheet paper to form said adjacent layers, comprises: wrapping the expanded slit sheet paper around an object and forming said two or more layers of overlying interlocking hexagonal cells around said object, said overlying interlocking hexagonal cells being in direct contact substantially across the width of the layers.

Example 21: The method of example 20, wherein said extensible range is 3-15% in the machine direction and not less than 5% in the cross direction.

Example 22: The method of example 20, wherein said extensible range is 3-9% in the machine direction and not less than 5% in the cross direction.

Example 23: The method of example 20, wherein said step of expanding comprises applying an expansion force of 0.15 to 0.22 pounds per inch to form said hexagonal cells.

Example 24: The method of example 21, wherein said step of expanding comprises applying an expansion force of 0.15 to 0.22 pounds per inch to form said hexagonal cells.

Example 26: The method of above examples, wherein said extensible range is 3-15% in the machine direction and not less than 5% in the cross direction.

Example 27: The method of above examples, wherein said extensible range is 3-9% in the machine direction and not less than 5% in the cross direction.

Example 28: The method of above examples, wherein said step of expanding a length of said expandable sheet material comprises applying an expansion force of 0.15 to 0.22 pounds per inch.

Example 29: The method of example 26, wherein said step of expanding a length of said expandable sheet material comprises applying an expansion force of 0.15 to 0.22 pounds per inch.

Example 30: The method of above examples, wherein the slit extensible paper has a weight, prior to expansion, from about 30 to 50 pounds per 3,000 sq. ft.

Example 31: The method of example 28, wherein the slit extensible paper has a weight, prior to expansion, from about 30 to 50 pounds per 3,000 sq. ft.

Example 32: The extensible slit sheet paper cushioning product of example 1, wherein said extensible range is 3-11.1% in the machine direction.

Example 33: The shipping package of example 8, wherein said extensible range is 3-11.1% in the machine direction.

Example 34: The method of example 14, wherein said extensible range is 3-11.1% in the machine direction.

Example: 35: The method of above examples, wherein said extensible range is 3-11.1% in the machine direction.

Example 36: The extensible slit sheet paper cushioning product of example 1, wherein said extensible range is 3.3-10.6% in the machine direction.

Example 37: The shipping package of example 8, wherein said extensible range is 3.3-10.6% in the machine direction.

Example 38: The method of example 14, wherein said extensible range is 3.3-10.6% in the machine direction.

Example 39: The method of above examples, wherein said extensible range is 3.3-10.6% in the machine direction.

Example 40: The extensible slit sheet paper cushioning product of example 1, wherein said extensible range is 9.7-11.1% in the machine direction.

Example 41: The shipping package of example 8, wherein said extensible range is 9.7-11.1% in the machine direction.

Example 42: The method of example 14, wherein said extensible range is 9.7-11.1% in the machine direction.

Example 43: The method of above examples, wherein said extensible range is 9.7-11.1% in the machine direction.

Example 44: The extensible slit sheet paper cushioning product of example 1, wherein said extensible paper is formed by imparting a treatment prior to providing the slit pattern comprising inserting said paper between a roll and an endless pre-stretched blanket to compress the paper with a nip bar and the blanket (or otherwise compressing the paper between two different (e.g., differently moving) surfaces, such as between two different rollers).

Example 45: The shipping package of example 8, wherein said extensible paper is formed by imparting a treatment prior to providing the slit pattern comprising inserting said paper between a roll and an endless pre-stretched blanket to compress the paper with a nip bar and the blanket (or otherwise compressing the paper between two different (e.g., differently moving) surfaces, such as between two different rollers).

Example 46: The method of example 14, wherein said extensible paper is formed by imparting a treatment prior to providing the slit pattern comprising inserting said paper between a roll and an endless pre-stretched blanket to compress the paper with a nip bar and the blanket (or otherwise compressing the paper between two different (e.g., differently moving) surfaces, such as between two different rollers).

Example 47: The method of example 25, wherein said extensible paper is formed by imparting a treatment prior to providing the slits comprising inserting said paper between a roll and an endless pre-stretched blanket to compress the paper with a nip bar and the blanket (or otherwise compressing the paper between two different (e.g., differently moving) surfaces, such as between two different rollers).

Example 51: The extensible slit sheet paper cushioning product of example 1, wherein said extensible paper is a nonwoven fibrous material with fibre-to-fibre bonding that resists tearing upon 3-15% expansion in the machine direction as measured prior to providing the slit pattern.

Example 52: The shipping package of example 8, wherein said extensible paper is a nonwoven fibrous material with fibre-to-fibre bonding that resists tearing upon 3-15% expansion in the machine direction as measured prior to providing the slit pattern.

Example 53: The method of example 14, wherein said extensible paper is a nonwoven fibrous material with fibre-to-fibre bonding that resists tearing upon 3-15% expansion in the machine direction as measured prior to providing the slit pattern.

Example 54: The method of above examples, wherein said nonwoven fibrous material comprises fibre-to-fibre bonding that resists tearing upon 3-15% expansion in the machine direction as measured prior to providing the slits.

Example 55: The extensible slit sheet paper cushioning product of example 1, wherein said roll of slit sheet paper is wound on a cylindrical core, and said length of slit sheet paper extends from said roll of slit sheet paper.

Example 56: The extensible slit sheet paper cushioning product of example 1, wherein said extensible range is 5-15% in a cross-direction.

Example 57: The extensible slit sheet paper cushioning product of example 1, wherein said extensible range is 7.1-15% in a cross-direction.

Example 58: An extensible slit sheet paper cushioning product, comprising: a length of slit sheet paper having a slit pattern including a plurality of slits extending in a cross direction that forms a plurality of open cells upon expansion in a machine direction, said slit sheet paper being formed from a paper that is extensible in the machine direction and the cross direction prior to providing the slit pattern, said extensible paper having an extensible range of 3 to 20% in the machine direction prior to providing the slit pattern.

Example 59: The extensible slit sheet paper cushioning product of example 58, further including a resister that resists pulling of the length of slit sheet paper along the machine direction to enable expansion of the length of slit sheet paper in the machine direction.

Example 60: The extensible slit sheet paper cushioning product of example 59, wherein said resister is a roll of slit sheet paper from which said length of slit sheet paper extends.

Example 61: The extensible slit sheet paper cushioning product of example 58, wherein said extensible range is not less than 5% in both the machine direction and cross direction.

Example 62: The extensible slit sheet paper cushioning product of example 58, wherein said extensible range is 3-15% in the machine direction.

Example 63: The extensible slit sheet paper cushioning product of example 58, wherein said slit sheet paper is configured such that expansion is performed by applying an expansion force of 0.15 to 0.22 pounds per inch to form said open cells.

Example 64: The extensible slit sheet paper cushioning product of example 58, wherein said slit sheet paper has a weight, prior to expansion, from about 30 to 50 pounds per 3,000 sq. ft.

Example 69: The extensible slit sheet paper cushioning product of example 1, wherein said a slit pattern is configured to form a plurality of hexagonal cells upon expansion in a machine direction.

Example 70: The extensible slit sheet paper cushioning product of example 69, wherein said hexagonal cells are three-dimensional hexagonal cells with substantially rectangular land portions situated at an inclined angle transverse to an original plane of the slit sheet paper, and leg portions connecting the land portions.

Example 71: The extensible slit sheet paper cushioning product of example 58, wherein said a slit pattern is configured to form a plurality of hexagonal cells upon expansion in a machine direction.

Example 72: The extensible slit sheet paper cushioning product of example 71, wherein said hexagonal cells are three-dimensional hexagonal cells with substantially rectangular land portions situated at an inclined angle transverse to an original plane of the slit sheet paper, and leg portions connecting the land portions.

In various embodiments, extensibility can be determined employing various methods well known in the paper industry. As described herein-above, in some embodiments, extensibility % values can be determined according to Technical Association of the Pulp and Paper Industry (TAPPI) standards. With respect to the above-noted TAPPI T-457 standard, it should be appreciated that TAPPI 457 has since been combined into TAPPI T-404 by TAPPI. In some embodiments, extensibility %'s correspond to elongation % at rupture. For reference, tensile breaking strength is determined to be the maximum value of stress that occurs when the paper ruptures or tears. Elongation at rupture is the measure of the maximum percentage of stretch, or the maximum strain, that the paper can achieve before failure. Tensile strength can be described by stress-strain graphs and measured by TAPPI tests T-404 and T-494. Stress-strain curves provide a fundamental engineering description of the mechanical behavior of paper when subjected to tensile stress. TAPPI method T-404 measures tensile breaking strength end elongation of paper and paperboard using a pendulum-type tester, and T-494 measures tensile breaking properties of paper and paperboard using constant rate of elongation apparatus. TAPPI tensile strength tests of paper. TAPPI tests T-404 and T-494 are useful in evaluating the tensile properties of paper. TAPPI T-494 enables the simultaneous evaluation of three properties for the same test specimen: tensile breaking strength, stretch or elongation at break, and TEA (tensile energy absorption).

In some embodiments, extensibility can be determined according to ISO 1924 of the International Organization for Standardization (www.iso.org), which specifies a method for measuring the tensile strength, strain at break and tensile energy absorption of paper and board, using a testing machine operating at a constant rate of elongation (20 mm/min). This part of ISO 1924 also specifies equations for calculating the tensile index, the tensile energy absorption index and the modulus of elasticity. According to some embodiments, the %'s of extensibility in various embodiments described herein correspond to extensibility values as determined under one or more of the TAPPI tests. According to some embodiments, the %'s of extensibility in various embodiments described herein correspond to extensibility values as determined under one or more of the ISO tests. Although a variety of paper materials can be employed in various embodiments, in some embodiments, an extensible paper is provided that is formed with or from hemp in view of hemp's natural extensibility. Hemp paper can be made exclusively or with a significant amount of pulp obtained from fibers of industrial hemp. Hemp fibers can be substantially longer than wood pulp fibers, and have a higher tear resistance and tensile strength. See Wikipedia, Hemp Paper. Additionally, hemp fibers have significant resistance to decomposition, are highly recyclable, and is advantageously a fast crop to yield. In some embodiments, extensible papers can be made with virgin fibers, such as, e.g., virgin wood fibers, such as, e.g., virgin fibers from Pine and/or Spruce or other woods. In some embodiments, extensible papers can be made with recycled fibers. In some embodiments, an extensible paper can be a single layer or a multi-layer paper, such as, e.g., with 2, 3 or 4 layers, or even more layers. In some embodiments, an extensible paper can be made from unbleached softwood kraft pulp. In some examples, during manufacture a stock preparation system and paper machine are adapted such that the stock preparation system includes a high consistency refining system and the paper machine includes a Clupak unit. In some illustrative implementations, pulp from an unbleached high-density storage tower is set to the paper machine where it is thickened (e.g., from around 6% consistency to about 32-35% in some examples). This can be done in a press (such as, e.g., a twin-wire, screw 103 press, roll press, etc.). After the press, the fiber is sent to the high consistency refiner. The refiner applies energy into the paper, without relevant changes in the fiber length, but adding many curls, kinds, and compressions in the fiber anatomy (such as, e.g., applying about 280-300 kWh/ton of energy to the paper in some examples). The structural changes in the fiber make them stronger and more flexible. At the paper machine, there is a unit, the Clupak unit, responsible to create micro-compressions in the paper to develop the stretch ability (e.g., extensibility). In some embodiments, the Clupak unit includes a chromium plated dryer cylinder heated by steam to enable slipping of the paper, an endless rubber blanket with a circuit of guide and stretch rolls, a non-rotating nip bar with an approaching and separating pneumatic system and a blanket rectifier. In some embodiments, extensible papers employed in the packaging industry as extensible sack paper can be employed. By way of example, various extensible sack papers in the market related to one or more of the following companies can be employed in some illustrative embodiments: Segezha Group, Stora Poland S. A., Starkraft, KapStone Paper and Packaging Corporation, BillerudKorsnas, Swedpaper, Natron-Hayat d.o.o. Maglaj, WestRock, Nordicpaper, Horizon Pulp and Paper Ltd., Primo Tedesco.

BROAD SCOPE OF THE INVENTION

While illustrative embodiments of the invention have been described herein, the present invention is not limited to the various preferred embodiments described herein, but includes any-and-all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

The use of individual numerical values is stated as approximations as though the values were preceded by the word "about", "substantially", or "approximately." Similarly, the numerical values in the various ranges specified in this application, unless expressly indicated otherwise, are stated as approximations as though the minimum and maximum values within the stated ranges were both preceded by the word "about", "substantially", or "approximately." In this manner, variations above and below the stated ranges can be used to achieve substantially the same results as values within the ranges. As used herein, the terms "about", "substantially", and "approximately" when referring to a numerical value shall have their plain and ordinary meanings to a person of ordinary skill in the art to which the disclosed subject matter is most closely related or the art relevant to the range or element at issue. The amount of broadening from the strict numerical boundary depends upon many factors. For example, some of the factors which may be considered include the criticality of the element and/or the effect a given amount of variation will have on the performance of the claimed subject matter, as well as other considerations known to those of skill in the art. As used herein, the use of differing amounts of significant digits for different numerical values is not meant to limit how the use of the words "about", "substantially", or "approximately" will serve to broaden a particular numerical value or range. Thus, as a general matter, "about", "substantially", or "approximately" broaden the numerical value. Also, the disclosure of ranges is intended as a continuous range including every value between the minimum and maximum values plus the broadening of the range afforded by the use of the term "about", "substantially", or "approximately". Thus, recitation of ranges of values herein are merely intended to serve as a shorthand method of referring individually to each separate value falling within the range, unless otherwise indicated herein, and each separate value is incorporated into the specification as if it were individually recited herein. To the extent that determining a given amount of variation of some the factors such as the criticality of the slit patterns, paper width differential pre- and post-expansion, paper weights and type, as well as other considerations known to those of skill in the art to which the disclosed subject matter is most closely related or the art relevant to the range or element at issue will have on the performance of the claimed subject matter, is not considered to be within the ability of one of ordinary skill in the art, or is not explicitly stated in the claims, then the terms "about", "substantially", and "approximately" should be understood to mean the numerical value, plus or minus 15%.

It is to be understood that any ranges, ratios and ranges of ratios that can be formed by, or derived from, any of the data disclosed herein represent further embodiments of the present disclosure and are included as part of the disclosure as though they were explicitly set forth. This includes ranges that can be formed that do or do not include a finite upper and/or lower boundary. Accordingly, a person of ordinary skill in the art most closely related to a particular range, ratio or range of ratios will appreciate that such values are unambiguously derivable from the data presented herein.

What is claimed is:

1. An expansion system for expanding expandable slit sheet paper, comprising:

a roll of expandable slit sheet paper, said expandable slit sheet paper having an array of slits that expand into open cells upon pulling in a lengthwise direction;

a friction brush for applying friction along a lateral side of said expandable slit sheet paper;

said friction brush having a plurality of elongated bristles or fibers, said friction brush having a length configured to extend across a width of said roll of expandable slit sheet paper;

a planar surface opposing said friction brush such that distal ends of said elongated bristles or fibers contact a first side of the expandable slit sheet paper unrolled from said roll of expandable slit sheet paper and a second side of the expandable slit sheet paper opposite to said first side of the expandable slit sheet paper contacts and presses against said planar surface due to pressure applied by said friction brush; and whereby when said expandable slit sheet paper unrolled from said roll of expandable slit sheet paper is pulled between said friction brush and said planar surface, said expandable slit sheet paper is expanded into open cells.

2. The expansion system of claim 1, wherein said brush includes a plurality of elongated bristles or fibers.

3. The expansion system of claim 1, wherein said brush imparts sufficient resistance to said expandable slit sheet paper that is pulled past said brush such that said expandable slit sheet paper expands to form fully opened cells.

4. The expansion system of any of claim 1, wherein said brush imparts sufficient resistance to said expandable slit sheet paper that is pulled past said brush such that said expandable slit sheet paper expands to form fully opened cells in a region downstream from the brush.

5. The expansion system of claim 1, wherein said expansion system further includes a guide upstream of said brush.

6. The expansion system of claim 5, wherein said guide includes a conveyor roller guide.

7. The expansion system of claim 5, wherein said guide includes at least one rod, shaft or roller guide.

8. The expansion system of claim 7, wherein said guide includes a rod or shaft that is non-rotatable mounted on said expansion system.

9. The expansion system of claim 8, wherein said brush is located at a first side of said roll, and said guide includes a rod or shaft located at a second side of said roll.

10. The expansion system of claim 1, further including an adjuster for adjusting the position of the brush.

11. The expansion system of claim 10, wherein said adjuster is configured to adjust a distance of the brush from said opposing planar surface and/or the angular orientation of said brush.

12. The expansion system of claim 1, wherein said expansion system is a manual expansion system for manually expanding expandable slit sheet paper.

13. The expansion system of claim 1, wherein said expansion system is an automated system that automatedly expands expandable slit sheet paper.

14. A method of using the expansion system of claim 1, comprising:

expanding an expandable slit sheet paper with said brush applying a resistance against a lateral side of said expandable slit sheet paper.

15. The method of claim 14, further including said brush applying a sufficient resistance against the lateral side of said expandable slit sheet paper such that as said expandable slit sheet paper is pulled past said brush said expandable slit sheet paper expands to form fully opened cells.

16. The expansion system of claim 1, wherein said expandable slit sheet paper is made with a paper that weighs between about 35 pounds per 3,000 square feet to 60 pounds per 3,000 square feet.

17. The expansion system of claim 1, wherein said brush includes bristles having distal ends that extend to proximate said planar surface.

18. The expansion system of claim 1, wherein said brush includes bristles having distal ends that contact said planar surface.

19. The expansion system of claim 17 or 18, wherein said bristles extend at an angle to said planar surface.

20. The expansion system of claim 17 or 18, wherein said bristles extend substantially perpendicular to said planar surface.

21. The expansion system of claim 17 or 18, wherein said bristles extend at an angle to said planar surface with distal ends of said bristles further downstream in the conveying direction of the expandable slit sheet paper.

22. The expansion system of claim 1, wherein said planar surface is a support surface beneath the expansion system.

23. The expansion system of claim 1, wherein said planar surface is a surface of a support or frame of the expansion system.

* * * * *